United States Patent [19]

Miller et al.

[11] Patent Number: 5,930,231
[45] Date of Patent: Jul. 27, 1999

[54] BLOCK SPECTRUM RECEIVER FOR A BROADBAND COMMUNICATIONS SYSTEM

[75] Inventors: Kevin L. Miller; Ramin Borazjani, both of Lawrenceville, Ga.

[73] Assignee: Scientific-Atlanta, Inc., Norcross, Ga.

[21] Appl. No.: 08/625,399

[22] Filed: Mar. 27, 1996

Related U.S. Application Data

[63] Continuation-in-part of application No. 08/497,555, Jun. 30, 1995, Pat. No. 5,719,867.

[51] Int. Cl.[6] .................................. H04J 1/00; H04J 3/16
[52] U.S. Cl. .......................... 370/210; 370/442; 370/463; 370/480; 455/5.1
[58] Field of Search ..................................... 370/208, 210, 370/320, 335, 342, 343, 442, 480, 463, 485, 487, 488; 375/200, 205, 206, 207, 209, 210; 348/6, 12; 455/3.1, 5.1

[56] References Cited

U.S. PATENT DOCUMENTS

| | | |
|---|---|---|
| 3,992,589 | 11/1976 | Kuegler . |
| 4,709,418 | 11/1987 | Fox et al. . |
| 4,742,512 | 5/1988 | Akashi et al. . |
| 4,763,317 | 8/1988 | Lehman et al. . |
| 4,849,811 | 7/1989 | Kleinerman . |
| 5,029,333 | 7/1991 | Graves et al. . |
| 5,084,903 | 1/1992 | McNamara et al. . |
| 5,088,111 | 2/1992 | MaNamara et al. . |
| 5,125,100 | 6/1992 | Katznelson . |
| 5,140,613 | 8/1992 | Birgenheier et al. . |
| 5,153,763 | 10/1992 | Pidgeon . |
| 5,247,347 | 9/1993 | Litteral et al. . |
| 5,249,205 | 9/1993 | Chehnakeshu et al. . |
| 5,303,229 | 4/1994 | Withers et al. . |

(List continued on next page.)

FOREIGN PATENT DOCUMENTS

| | | |
|---|---|---|
| 0 550 146 A1 | 7/1993 | European Pat. Off. . |
| WO 94/28665 | 12/1994 | WIPO . |
| WO 95/08228 | 3/1995 | WIPO . |

OTHER PUBLICATIONS

Kurth, Carl F., "SSB/FDM Utilizing TDM Digital Filters", *IEEE Transactions on Communication Technology*, Feb. 1971, pp. 63–71.

Freeny, Stanley L., et al., "Design of Digital Filters for an All Digital Frequency Division Multiplex–Time Division Multiplex Translator", *IEEE Transactions on Circuit Theory*, Nov. 1971, pp. 702–711.

(List continued on next page.)

*Primary Examiner*—Alpus H. Hsu
*Assistant Examiner*—Ricky Q. Ngo
*Attorney, Agent, or Firm*—Kenneth M. Massaroni; Kelly A. Gardner; Hubert J. Barnhardt, III

[57] ABSTRACT

A communication system for coupling telephony or other signals to a broadband network such as a CATV network. The system transmits a multiplex of telephony signals in the forward band of the broadband network, with individual signals directed to an addressed subscriber. Telephony signals returning from subscribers upstream to a headend unit (HIU) are modulated onto the reverse band of the broadband network in a frequency division multiple access (FDMA) arrangement. The upstream modulated telephony signals are received at a telephony network interface at the HIU coupled to the broadband network. A group of reverse band modulated telephony signals are received at a group receiver or channelizer. The group receiver processes all upstream telephony signals within a selected spectral subband in the reverse band to apply a receiver matched filter with a weighted overlap and add circuit, and are then converted to baseband by an FFT circuit. The group receiver provides a serial data stream representing the baseband telephony signals. The baseband telephony signals are processed to derive demodulated telephony signals. The demodulated telephony signals are coupled to the telephony network.

8 Claims, 29 Drawing Sheets

U.S. PATENT DOCUMENTS

| | | | |
|---|---|---|---|
| 5,323,391 | 6/1994 | Harrison | 370/210 |
| 5,343,240 | 8/1994 | Yu . | |
| 5,347,304 | 9/1994 | Moura et al. . | |
| 5,351,234 | 9/1994 | Beierle et al. . | |
| 5,357,502 | 10/1994 | Castelain et al. | 370/210 |
| 5,376,894 | 12/1994 | Petranovich . | |
| 5,400,368 | 3/1995 | Cheng et al. . | |
| 5,412,352 | 5/1995 | Graham . | |
| 5,440,335 | 8/1995 | Beveridge . | |
| 5,469,495 | 11/1995 | Beveridge . | |
| 5,537,435 | 7/1996 | Carney et al. | 370/210 |
| 5,629,929 | 5/1997 | Blanchard et al. | 370/210 |

OTHER PUBLICATIONS

Freeny, Stanley L., et al., "Systems Analysis of a TDM–FDM Translator/Digital A–Type Channel Bank", *IEEE Transactions on Communication Technology*, Dec. 1971, pp. 1050–1059.

Bellanger, Maurice G., "TDM–FDM Transmultiplexer: Digital Polyphase and FFT", *IEEE Transactions on Communications*, Sep. 1974, pp. 1199–1205.

Crochiere, Ronald E. and Rabiner, Lawrence R, "Weighted Overlap—Add Structures for Efficient Realization of DFT Filter Banks", *Multirate Digital Signal Processing*, Prentice Hall, 1983, Sec. 7.2.5, pp. 313–326.

Harris, Frederic J., "Time Domain Signal Processing with the DFT", *Handbook of Digital Signal Processing Engineering Applications*, Academic Press, 1987, Chapter 8, pp. 633–666.

SPECTRAL ALLOCATION - ALTERNATIVE EMBODIMENT

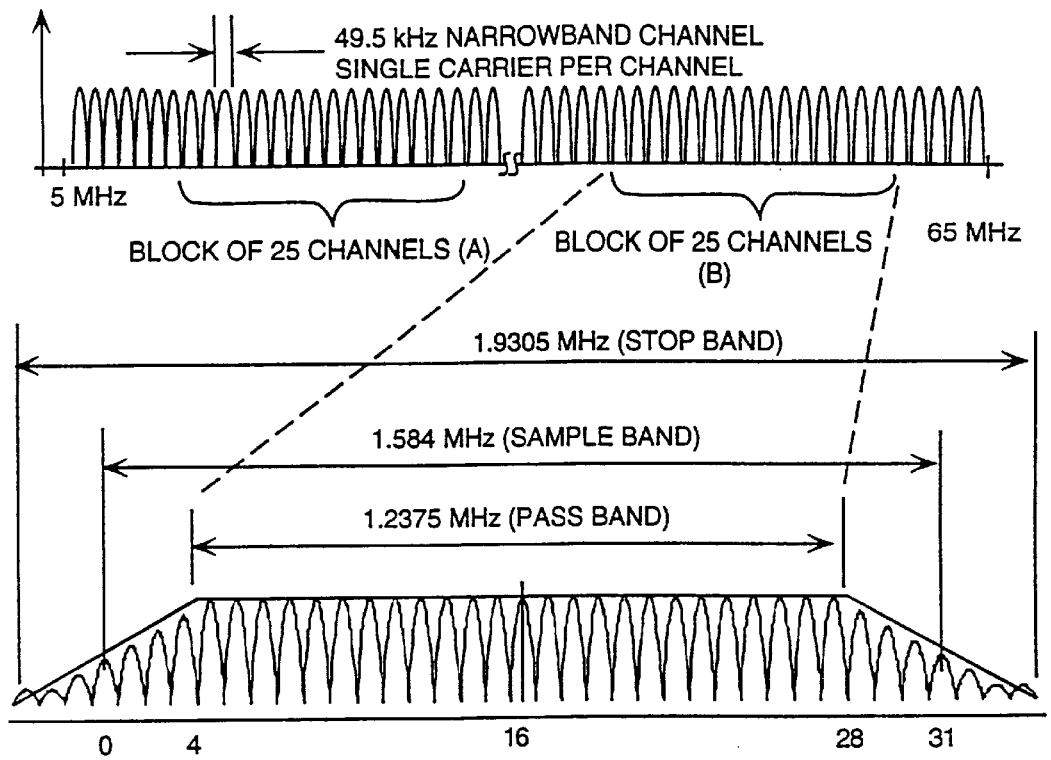
FIG. 3D SPECTRAL MASK PRIOR TO CONVERSION TO 1.584 MSAMPLE DATA RATE
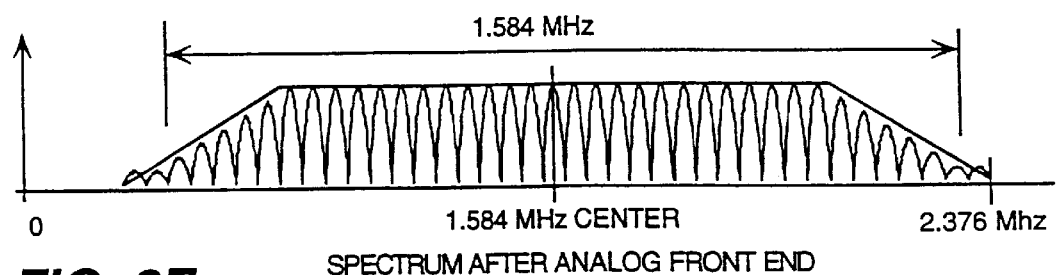
FIG. 3E SPECTRUM AFTER ANALOG FRONT END
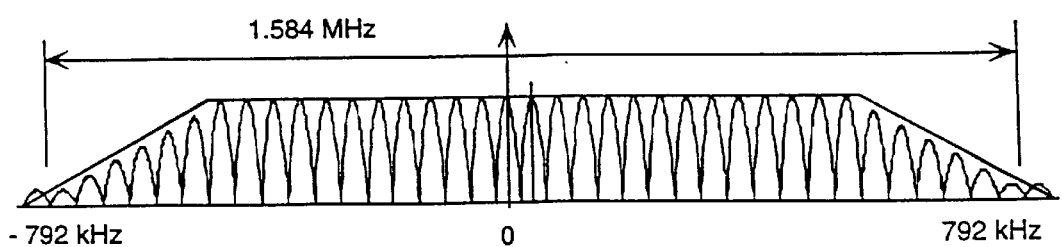
FIG. 3F SPECTRUM AFTER QDC

INPUT TELEPHONY-TO-CATV NETWORK INTERFACE

OUTPUT TELEPHONY-TO-CATV NETWORK INTERFACE

TELEPHONY TERMINAL OR CUSTOMER INTERFACE UNIT

FIG. 8  REVERSE PATH DEMODULATOR (REV DEMOD)

BLOCK RECEIVER

FIG. 10 ANALOG FRONT END, DIGITIZER, QUADRATURE DOWN CONVERSION

WEIGHTED OVERLAP AND ADD FILTER

| Index | Value | Index | Value | Index | Value | Index | Value |
|---|---|---|---|---|---|---|---|
|  | 0 |  | 0 |  | 0 |  | 0 |
| 0 | 0 | 40 | -2 | 80 | 9 | 120 | 2 |
| 1 | 0 | 41 | -1 | 81 | -1 | 121 | 27 |
| 2 | 0 | 42 | 0 | 82 | -7 | 122 | 53 |
| 3 | 0 | 43 | 1 | 83 | -16 | 123 | 81 |
| 4 | 0 | 44 | 2 | 84 | -25 | 124 | 109 |
| 5 | 0 | 45 | 4 | 85 | -35 | 125 | 139 |
| 6 | 0 | 46 | 6 | 86 | -43 | 126 | 169 |
| 7 | 0 | 47 | 7 | 87 | -53 | 127 | 201 |
| 8 | 0 | 48 | 10 | 88 | -63 | 128 | 233 |
| 9 | 0 | 49 | 12 | 89 | -74 | 129 | 265 |
| 10 | 0 | 50 | 16 | 90 | -84 | 130 | 299 |
| 11 | 0 | 51 | 19 | 91 | -94 | 131 | 334 |
| 12 | -1 | 52 | 22 | 92 | -104 | 132 | 367 |
| 13 | -1 | 53 | 25 | 93 | -114 | 133 | 402 |
| 14 | -1 | 54 | 29 | 94 | -123 | 134 | 438 |
| 15 | -2 | 55 | 32 | 95 | -131 | 135 | 472 |
| 16 | -4 | 56 | 36 | 96 | -139 | 136 | 507 |
| 17 | -4 | 57 | 40 | 97 | -1468 | 137 | 542 |
| 18 | -5 | 58 | 42 | 98 | -153 | 138 | 577 |
| 19 | -6 | 59 | 46 | 99 | -159 | 139 | 611 |
| 20 | -7 | 60 | 48 | 100 | -164 | 140 | 645 |
| 21 | -9 | 61 | 51 | 101 | -167 | 141 | 677 |
| 22 | -10 | 62 | 52 | 102 | -170 | 142 | 709 |
| 23 | -11 | 63 | 53 | 103 | -172 | 143 | 742 |
| 24 | -12 | 64 | 55 | 104 | -172 | 144 | 771 |
| 25 | -14 | 65 | 56 | 105 | -172 | 145 | 800 |
| 26 | -15 | 66 | 57 | 106 | -171 | 146 | 828 |
| 27 | -15 | 67 | 57 | 107 | -168 | 147 | 854 |
| 28 | -15 | 68 | 56 | 108 | -164 | 148 | 879 |
| 29 | -15 | 69 | 56 | 109 | -159 | 149 | 901 |
| 30 | -14 | 70 | 55 | 110 | -153 | 150 | 924 |
| 31 | -14 | 71 | 52 | 111 | -144 | 151 | 942 |
| 32 | -10 | 72 | 50 | 112 | -134 | 152 | 960 |
| 33 | -11 | 73 | 46 | 113 | -123 | 153 | 976 |
| 34 | -10 | 74 | 42 | 114 | -110 | 154 | 988 |
| 35 | -9 | 75 | 38 | 115 | -95 | 155 | 999 |
| 36 | -7 | 76 | 33 | 116 | -79 | 156 | 1009 |
| 37 | -6 | 77 | 29 | 117 | -62 | 157 | 1016 |
| 38 | -5 | 78 | 22 | 118 | -42 | 158 | 1020 |
| 39 | -4 | 79 | 16 | 119 | -21 | 159 | 1023 |

FIG. 15    WEIGHTING FUNCTION VALUES (INTEGRAL)

FIG. 17  BASEBAND PROCESSING DSP INTERFACE LOGIC

DSP FLOW CHART - INTERRUPT SERVICE ROUTINE (ISR)

FIG. 20  AGC - INPUT MULTIPLICATION

FIG. 21 AGC - AMPLITUDE DETECTION AND FILTERING

FIG. 22  VARIABLE GROUP DELAY FILTER

FIG. 23  DELAY INSERTION, VARIABLE GROUP DELAY FILTER, AND DOWNSAMPLING

FIG. 24  SYMBOL TIMING RECOVERY (STR)

FIG. 25 BASEBAND PHASE ROTATOR (BPR)

PHASE LOCK LOOP AND
CARRIER PHASE LOCK (CPL) DETECTION

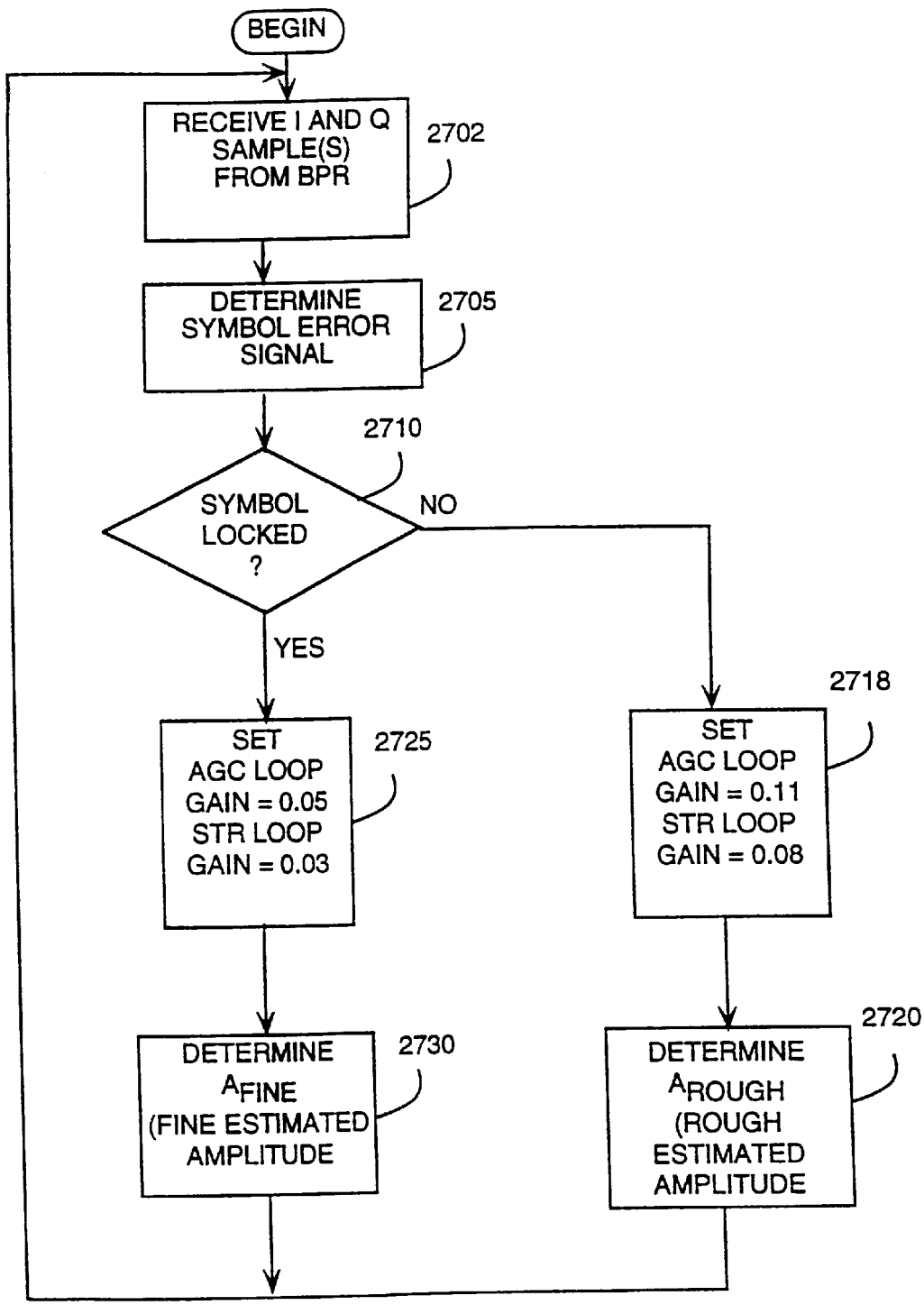
FIG. 27  DSP FLOW CHART - BACKGROUND PROCESSING

| SYMBOL CLOCK | OPERATION DESCRIPTION |
|---|---|
| n=1 | SHIFTER OUTPUTS 2 SAMPLES PER I OR Q<br>MULTIPLIER OUTPUTS 2 VALUES PER I OR Q<br>VARIABLE GROUP DELAY FILTER OUTPUTS 1 VALUE PER I OR Q<br>BPR OUTPUTS 1 VALUE PER I OR Q<br>PHASE LOCK LOOP OUTPUTS 1 PI VALUE<br>STR STARTS AVERAGING BY ACCUMULATING THE ERROR<br>    VALUES AT OUTPUT OF CORRELATOR<br>DECODE AND FORMAT BLOCK OUTPUTS ONE 3 BIT WORD |
| n=2...5 | REPEAT n=1 OPERATION 4 TIMES |
| n=6 | SHIFTER OUTPUTS 2 SAMPLES PER I OR Q<br>MULTIPLIER OUTPUTS 2 VALUES PER I OR Q<br>VARIABLE GROUP DELAY FILTERS OUTPUTS 1 VALUE PER I OR Q<br>BPR OUTPUTS 1 VALUE PER I OR Q<br>PHASE LOCK LOOP OUTPUTS 1 PI VALUE<br>STR OUTPUTS COEFFICIENT b AND SAMPLE SELECT<br>    VALUES FOR VARIABLE GROUP DELAY FILTER<br>    (IIR FILTERING AND SAMPLE SELECT LOGIC)<br>DECODE AND FORMAT BLOCK OUTPUTS ONE 3 BIT WORD |
| n=7 | SHIFTER OUTPUTS 2 SAMPLES PER I OR Q<br>MULTIPLIER OUTPUTS 2 VALUES PER I OR Q<br>VARIABLE GROUP DELAY FILTERS OUTPUTS 1 VALUE PER I OR Q<br>BPR OUTPUTS 1 VALUE PER I OR Q<br>PHASE LOCK LOOP OUTPUTS 1 PI VALUE<br>AGC STARTS AVERAGING BY ACCUMULATING THE AMPLITUDE<br>    ERROR VALUES<br>DECODE AND FORMAT BLOCK OUTPUTS ONE 3 BIT WORD |
| n=8, 9 | REPEAT n=7 OPERATIONS 2 TIMES |
| n=10 | SHIFTER OUTPUTS 2 SAMPLES PER I OR Q<br>MULTIPLIER OUTPUTS 2 VALUES PER I OR Q<br>VARIABLE GROUP DELAY FILTER OUTPUTS 1 VALUE PER I OR Q<br>BPR OUTPUTS 1 VALUE PER I OR Q<br>PHASE LOCK LOOP OUTPUTS 1 PI VALUE<br>AGC OUTPUTS THE MULTIPLICATION FACTOR M FOR THE<br>    INPUT MULTIPLIER (IIR FILTERING AND SATURATION)<br>DECODE AND FORMAT BLOCK OUTPUTS ONE 3 BIT WORD |
| SUBSEQUENT OPERATIONS | REPEAT (n=1 TO n=10 OPERATIONS) |

*FIG. 28*

BLOCK SPECTRUM RECEIVER FOR A BROADBAND COMMUNICATIONS SYSTEM

CROSS REFERENCE TO RELATED APPLICATIONS

This application is a continuation in part of application Ser. No. 08/497,555, filed Jun. 30, 1995, entitled "Plural Telephony Channel Baseband Signal Demodulator for a Broadband Communications System" now U.S. Pat. No. 5,719,867; and is related to application Ser. No. 08/219,848, filed Mar. 30, 1994, entitled "Frequency Agile Broadband Communications System", now U.S. Pat. No. 5,594,726, which is a continuation-in-part of application Ser. No. 08/123,363, filed Sep. 17, 1993, entitled "Broadband Communications System", now U.S. Pat. No. 5,499,241, the disclosures of which are incorporated herein by reference and made a part hereof.

FIELD OF THE INVENTION

The present invention pertains generally to communicating telephony signals, and other or similar signals, over CATV and equivalent networks, and is more particularly related to processing of telephony signals transmitted in the reverse path of a CATV network.

BACKGROUND OF THE INVENTION

In order to introduce the present invention and the problems that it solves, it is useful to overview a conventional CATV broadband communication system, and then examine certain prior approaches to problems encountered when attempting to introduce telephony signals into the broadband environment.

Conventional Cable Television Systems (CATV)

Cable television systems, sometimes referred to as community-antenna television (CATV) systems, are broadband communications networks of coaxial cable and optical fiber that distribute television, audio, and data signals to subscriber homes or businesses. In a typical CATV system, a single advantageously located antenna array feeding a cable network supplies each individual subscriber with a usable television signal. It is estimated that CATV networks currently pass approximately 90% of the population in the United States, with approximately 60–65% of all households actually being connected.

A typical CATV system comprises four main elements: a headend, a trunk system, a distribution system, and subscriber drops.

The "headend" is a signal reception and processing center that collects, organizes and distributes signals. The headend receives satellite-delivered video and audio programming, over-the-air broadcast TV station signals, and network feeds delivered by terrestrial microwave and other communication systems. In addition, headends may inject local broadcasting into the package of signals sent to subscribers such as commercials and live programming created in a studio.

The headend contains signal-processing equipment that controls the output level of the signals, regulates the signal-to-noise ratio, and suppresses undesired out-of-band signals. Typical signal-processing equipment includes a heterodyne processor or a demodulator-modulator pair. The headend then modulates received signals onto separate radio frequency (RF) carriers and combines them for transmission over the cable system.

The "trunk system" is the main artery of the CATV network that carries the signals from the headend to a number of distribution points in the community. A modern trunk system typically comprises of a combination of coaxial cable and optical fibers with trunk amplifiers periodically spaced to compensate for attenuation of the signals along the line. Such modern trunk systems utilizing fiber optics and coaxial cable are often referred to as "fiber/coax" systems.

The "distribution systems" utilize a combination of optical fibers and coaxial cable to deliver signals from the trunk system into individual neighborhoods for distribution to subscribers. In order to compensate for various losses and distortions inherent in the transmission of signals along the cable network, line-extender amplifiers are placed at certain intervals along the length of the cable. Each amplifier is given just enough gain to overcome the attenuation loss of the section of the cable that precedes it. A distribution network is also called the "feeder".

There is a strong desire in the CATV and telecommunications industry to push optical fiber as deeply as possible into communities, since optical fiber communications can carry more signals than conventional networks. Due to technological and economic limitations, it has not yet proved feasible to provide fiber to the subscriber's home. Present day "fiber deep" CATV distribution systems including optical fibers and coaxial cable are often called "Fiber-To-the-Serving-Area" or "FTSA" systems.

"Subscriber drops" are taps in the distribution system that feed individual 75 Ω coaxial cable lines into subscribers' television sets or subscriber terminals, often referred to as "subscriber premises equipment" or "customer premises equipment" ("CPE"). Since the tap is the final service point immediately prior to the subscriber premises, channel authorization circuitry is often placed in the tap to control access to scrambled or premium programming.

Cable distribution systems were originally designed to distribute television and radio signals in the "downstream" direction only (i.e., from a central headend location to multiple subscriber locations, also referred to as the "forward" path). Therefore, the component equipment of many older cable systems, which includes amplifiers and compensation networks, is typically adapted to deliver signals in the forward direction only. For downstream transmissions, typical CATV systems provide a series of video channels, each 6 MHz in bandwidth, which are frequency division multiplexed across the forward band, in the 50 MHz to 550 MHz region of the frequency spectrum. As fiber is moved more deeply into the serving areas in fiber/coax and FTSA configurations, the bandwidth of the coax portion is expected to increase to over 1 GHz.

The advent of pay-per-view services and other interactive television applications has fueled the development of bidirectional or "two-way" cable systems that also provide for the transmission of signals from the subscriber locations back to the headend. This is often referred to as the "upstream" direction or the "reverse" path. This technology has allowed cable operators to provide many new interactive subscriber services on the network, such as impulse-pay-per-view (IPPV). In many CATV systems in the United States, the band of signals from 5 MHz to 30 MHz is used for reverse path signals. Other CATV systems, especially in Europe, employ a 5–65 MHz reverse path band.

However, the topology of a typical CATV system, which looks like a "tree and branch" with the headend at the base and branching outwardly to the subscriber's, creates technical difficulties in transmitting signals in the upstream direction back to the headend. In the traditional tree and branch cable network, a common set of downstream signals are distributed to every subscriber home in the network. Upstream signals flowing from a single subscriber toward the headend pass by all the other upstream subscriber homes on the segment of distribution cable that serves the neighborhood.

The standard tree and branch topology has not proven to be well suited for sending signals from each subscriber location back to the headend, as is required for bidirectional communication services. Tree and branch cable distribution systems are the most efficient in terms of cable and distribution usage when signals have to be distributed in only the downstream direction. A cable distribution system is generally a very noisy environment, especially in the reverse path. Interfering signals may originate from a number of common sources, such as airplanes passing overhead or from Citizens Band (CB) radios that operate at a common frequency of 27 MHz, which is within the typical reverse channel bandwidth of CATV networks. Since the reverse direction of a tree and branch configuration appears as an inverted tree, noise is propagated from multiple distribution points to a single point, the headend. Therefore, all of the individual noise contributions collectively add together to produce a very noisy environment and a communications problem at the headend.

Present day FTSA systems facilitate the communication of signals in the reverse direction by dividing the subscriber base of a cable network into manageable serving areas of approximately 400–2500 subscribers. This allows for the reuse of limited reverse band frequency ranges for smaller groups of subscribers. The headend serves as the central hub of a star configuration to which each serving area is coupled by an optical communications path ending in a fiber node. The fiber node is connected to the serving area subscribers over a coaxial cable distribution sub-network of feeders and drops in each serving area. In the FTSA configuration, some of the signals in the forward direction (e.g., television program signals) are identical for each serving area so that the same subscriber service is provided to all subscribers. In the reverse direction, the configuration provides an independent spectrum of frequencies confined to the particular serving area. The FTSA architecture thus provides the advantage of multiplying the bandwidth of the reverse portions of the frequency spectrum times the number of serving areas.

The Desire for Telephony Service

The ever-expanding deployment of fiber optic technology in CATV systems across the country has cable operators looking to provide a whole new range of interactive services on the cable network. One area that is of particular interest is telephony service. Because of recent advances in technology as well as the loosening of regulations, the once distinct lines between the cable television network and the telephone network have blurred considerably. Currently there is a great demand for a broadband communication system that can efficiently provide telephone service over the existing cable distribution network.

Moreover, there is substantial interest expressed by telephone system operating companies in the idea of increased bandwidth for provision of new services to telephone subscribers, such as television; interactive computing, shopping, and entertainment; videoconferencing, etc. Present day "copper" based telephony service (so called because of the use of copper wires for telephone lines) is very bandwidth limited—about 3 kHz—and cannot provide for such enhanced services by the telephone companies without massive changes to the telephone networks infrastructure.

Existing communications systems, however, have not proven to be well suited for the transmission of telephony signals on the cable network. A system for transmitting telephony signals must be configured to allow single point to single point distribution (i.e., from a single subscriber to a single subscriber). However, unlike the telephone companies with their well-established national two-way networks, the cable industry is fragmented into thousands of individual systems that are generally incapable of communicating with one another. The cable network is instead ideally configured for single point to multiple point signal transmission (i.e., from a single headend downstream to multiple subscriber locations).

Moreover, CATV systems do not have the switching capabilities necessary to provide point to point communications. A communications system for the transmission of telephone signals must therefore be compatible with the public switched telephone networks ("PSTN") operated by the telephone operating companies. To be useful in the carriage of telephony signals, a CATV network must be able to seamlessly interface to a telephony network at a point where it is commercially viable to carry telephony signals. It must also provide signals that can pass to other parts of the interconnected telephone systems without extensive modulation or protocol changes to thereby become part of the international telephone system.

Telephony on Broadband Network

One approach taken to provide a bidirectional broadband communications system is shown in the above-referenced related U.S. patents which are owned by the assignee of the present invention. These patents describe broadband communication systems that utilize two different modulation schemes for communicating information between a central headend and a plurality of subscriber nodes. For downstream communications from the headend, telephony signals are transmitted in a plurality of 3 MHz bandwidth channels utilizing QPR modulation, with each 3 MHz band carrying the equivalent of 96 DS0 telephony channels. For upstream communications, one system uses a frequency division multiple access (FDMA) arrangement with a frequency-agile quadrature phase shift keyed (QPSK) modulation scheme that transmits each subscriber's outgoing DS0 telephony channel in one of 1880 separate 49.5 kHz bands in the 5–30 MHz reverse band.

Telephony signals that are carried on the broadband network are coupled to the telephony network at various points, such as the headend unit (HIU) or at separate network interface connection points. In a distributed architecture where a limited number of telephony signals are carried in the broadband domain, it is important that the telephony network interface be inexpensive, compact, and structurally simple. Nonetheless, each network interface should be structured so as to provide connection to the telephony network in a customarily accepted format such as in DS1 or T1, DS2, SONET, or similar multiple telephony channel formats.

The need for efficient signal processing of the upstream telephony channels is most acute in the upstream channel, since a given voice channel originating with a subscriber can appear anywhere in the 5–30 MHz spectrum (or 5–65 MHz spectrum in other systems), at different frequencies at different times, as a result of the operation of the frequency reassignment scheme used when the communication environment becomes noisy.

One known approach to the upstream communication problem simply utilizes time division multiple access (TDMA), with a single receiver that receives multiple signals in time division multiplexed manner. The signals are processed by selecting signals in an appropriate time slot and reconstructing the appropriate baseband signal for a selected channel. A significant problem with this approach is that of latency. A TDMA system introduces significant delay in the voice circuits because data must be stored up until a given transmitter in the upstream path is permitted to transmit its signal.

Furthermore, a TDMA approach typically utilizes substantial amounts of upstream cable bandwidth. If interference occurs any where in the band, the entire group of signals modulated with the affected carrier are likely to be unrecoverable. It would be preferable to have a system wherein interference, especially ingress noise which is typically narrow band, would only affect a single channel, and the system is sufficiently frequency agile to be able to move the signal around in the band upon detection of excessive noise or interference in the channel. For these reasons, a TDMA approach is not believed by the present inventors to be satisfactory for upstream telephony communications.

An alternative approach to processing a plurality of modulated telephony channels in the upstream direction would be to implement a frequency division multiple access (FDMA) arrangement and utilize a discrete approach to the frequency demultiplexing. A conventional receiving system for multiple channels in a FDMA system would employ a separate mixer, a signal source for each mixer, and a low pass filter for each channel, so as to derive or "channelize" each individual signal. However, such an approach is extraordinarily expensive in terms of hardware.

One possible approach to the channelization problem is a discrete multitone (DMT) scheme. The DMT approach to channelizing, however, is best suited for applications involving the need to transmit large amounts of data at high speed in a limited frequency band. A DMT scheme would involve individual carriers which are block received and processed. However, in a conventional DMT system all signals originate at a common point and all signals are demodulated at a common point. Examples of such systems are satellite communication systems and spread spectrum data transmission systems. A DMT system encodes a large volume of data by parsing it out to individual carriers and sending a composite signal. The receiver strips the data off the carriers and reconstitutes the large volume of data.

A particular problem with use of a DMT scheme in a broadband cable environment is that the transmitter is not a single transmitter at which the individual channels can be collected prior to transmission. Rather, each subscriber generates a separate signal for upstream transmission, from a separate location. This implies that the signals in the upstream channels cannot rely upon an independent internal clock at the transmitter to handle phase variations. A broadband cable system must compensate for time delays resulting from the fact that upstream signals originate at different locations.

More recent approaches to the channelization problem reduce the amount of processing necessary and the required hardware by employing regularly spaced carrier frequencies and identical low pass filters. It is known that this filter bank can be converted to a single weighting function followed by a fast Fourier transform (FFT). This approach is referred to as a "transmultiplexer", which classically takes an FDMA signal and transforms it into a time division multiplex access (TDMA) signal by FFT methods.

However, there are still difficulties in this approach because of the large computational requirements of the FFT, especially when many channels are involved. With sampling frequency at the required rate under the Nyquist theorem, separate filters and FFT processors are required order to perform at speeds acceptable for telephony applications, which involve large numbers of channels.

Accordingly, there is a need for an FDMA to TDMA transmultiplexer approach that is more efficient in terms of hardware requirements and is usable in a broadband communications environment where individual signals originate at different locations in the network. It would be advantageous if a single block process could be employed to apply the characteristics of a filter function for each channel in a block manner to all received channels simultaneously, as well as an FFT down conversion process. If the sampling rate could be reduced sufficiently to allow construction of a block receiver to form telephony baseband signals, then efficiencies in terms of processing speed and hardware utilization requirements could be achieved.

Furthermore, with present day technologies it is not cost-effective to handle QPSK signals digitally at the carrier frequency. On the other hand, if the telephony channel could be converted to the relatively low frequency baseband (such as approximately 50 kHz for QPSK), then it is possible for plural DS0s to be handled by a single digital signal processor.

Therefore, there is a need for a broadband communications system that is compatible with the existing public switched telephone networks and that is not sensitive to noise or other interference issues, particularly in the reverse path.

There is also a need for a broadband communications system that is bandwidth efficient and provides a higher spectral efficiency than present systems, thereby increasing the number of subscribers that may be served by each broadband network with telephony and enhanced services offered by CATV system operators, telephone company operating companies, and others.

There is also a need for a telephony network/broadband communication network interface that allows handling of plural telephony channels in an upstream communication path in an efficient and cost-effective manner.

There is also a need for a digital signal processing scheme that allows the processing power of a digital signal processor to operate upon plural telephony channels, which are typically bandwidth limited to about 8 kHz, to obtain a savings in density, cost and space.

There is also a need for a broadband communication system telephony system network interface that allows efficient retrieval of plural telephony channels assigned to predetermined and variable frequency assignments because of frequency agile operation, that efficiently collects and multiplexes plural telephony channels into a predetermined telephony signal format for communication on the telephony network.

That the present invention achieves these objects and fulfills the needs described hereinabove will be appreciated from the detailed description to follow and the appended drawings.

SUMMARY OF THE INVENTION

The present invention includes methods and apparatus for providing broadband communications, including bidirectional telephony communications, over a cable distribution network. In particular, the present invention provides an integrated CATV/telephony system that is compatible with today's public switched telephone networks and can also deliver video, data, security monitoring, and other services without affecting current in-home wiring or equipment.

Briefly described, the present invention provides a system for coupling telephony signals communicated from a subscriber via a broadband communication network to a telephony network interface. The system includes a block receiver that receives a group of modulated telephony signals communicated in a predetermined spectral subband selected within the upstream signal path in a broadband communication system, and provides individual modulated digital telephony signal outputs that are coupled to the telephony network.

The system includes a tuner for tuning to and selecting the predetermined spectral subband. A digitizer provides a plurality of digital samples of the selected spectral subband. A block lowpass filter is provided that is operative to lowpass filter the digital signal samples of the entire group of signals in the selected spectral subband. A block fast Fourier transform (FFT) stage responsive to filtered signals from the block lowpass filter frequency translates each of the telephony signals into separate baseband modulated digital information output signals.

The tuner in the disclosed system is operative for tuning to the center frequency of the predetermined spectral subband and downconverting the subband to narrower subband at a lower center frequency. The spectral width of an individual channel carrying one of the modulated telephony signals is 49.5 kHz, the center frequency of the predetermined spectral subband is 1.584 MHz, and the width of said predetermined spectral subband is 1.584 MHz.

The preferred system further includes a digital quadrature down conversion (QDC) stage coupled to the digitizer for shifting the downconverted spectral subband to DC. The digital quadrature down conversion stage effects a decimation by four of the digital samples from the digitizer and provides real and imaginary data values of the spectral subband. The QDC stage allows a lower ultimate sampling rate, which facilitates the block processing of the digital samples of the signal in the selected spectral subband.

In the disclosed system, the spectral width of an individual channel carrying one of the modulated telephony signals is 49.5 kHz. A contiguous group of at least 24 of the channels comprise the predetermined spectral subband, and the digitizer samples the predetermined spectral subband at 6.336 megasamples per second. The digital quadrature down conversion stage provides the real and imaginary data values of 1.584 megasamples per second.

The block lowpass filter comprises a digital weighted overlap and add filter. The preferred filter comprises a low pass filter having a channel edge of 24.75 kHz, and operates on an information signal centered at DC having a channel width of about 49.5 kHz.

The preferred system further comprises a baseband demodulator coupled to the block receiver for demodulating each one of the plurality of modulated digital information signals and provides a plurality of demodulated signal outputs. These demodulated signal outputs are coupled to the telephony network.

In a preferred embodiment, the receiver is coupled to a broadband communication system, and the modulated digital information signal comprises telephony signals provided by subscribers coupled to the broadband communication system. In an exemplary system, the predetermined spectral band comprises the 5–65 MHz region of a broadband communication system. The predetermined spectral subband comprises a 1.584 MHz region containing a plurality of QPSK modulated telephony signals in the upstream path of the broadband communication system. The modulated information signals comprise a plurality of single carrier per channel modulated signals in contiguous narrowband channels within the predetermined spectral subband. Each of the plurality of single carrier per channel modulated signals comprises a QPSK modulated telephony signal, and each of the contiguous narrowband channels comprises a 49.5 kHz channel. A group of 25 of the contiguous narrowband channels forms said predetermined spectral subband.

Still more particularly described, a system constructed in accordance with the present invention comprises a block receiver or channelizer for receiving a group of modulated information signals each communicated in a channel in a predetermined spectral subband selected within a predetermined spectral band of a broadband communication system such as a fiber to the serving area (FTSA) system or community antenna television (CATV) system, and providing modulated digital information signal outputs that are typically coupled to the telephony network. The output signals are channelized into baseband signals for demodulation and coupling to the telephony network.

The disclosed system includes an analog front end for tuning to the center frequency of the predetermined spectral subband and downconverting the subband to a lower center frequency. A digitizer provides digital samples of the downconverted spectral subband. A digital quadrature down conversion stage shifts the downconverted spectral subband to DC and provides real and imaginary digital values corresponding to the downconverted spectral subband. A digital weighted overlap and add filter filters the real and imaginary digital values with a half Nyquist filter matched to a half Nyquist filter at the subscriber terminals. A fast Fourier transform (FFT) stage responsive to the filtered real and imaginary digital values provides a plurality of modulated digital information signals at baseband as outputs. A baseband processor demodulates the modulated information signals and derives output signals that are coupled to the telephony network.

According to another aspect of the invention, an improved, multi-DS0 channel baseband processing demodulator is disclosed that can process a plurality (six in the disclosed embodiment) baseband DS0 channels with a single DSP. The system including the DSP includes an input port for receiving a serial data stream from the channelizer comprising a plurality of digital signal samples representing a plurality of QPSK-modulated DS0 telephony channels at baseband. The processing stages effected in the DSP include an automatic gain control (AGC) stage for adjusting the gain of the digital signal samples for each of the independent DS0 telephony channels. The DSP also carries out a symbol timing recovery (STR) stage for extracting timing information for each of the QPSK-modulated DS0 telephony channels from the digital signal samples and delaying the sampling of the digital signal samples at a decoding stage to a time such that the sampling will be at optimized symbol instants. Further, the DSP provides a carrier phase recovery stage for locking the demodulator to the frequency of the carrier for each of the QPSK-modulated DS0 telephony signals. Finally, the DSP carries out a symbol decoding and formatting stage for sampling the digital signal samples and providing a digital signal output corresponding to the each of the demodulated DS0 telephony channels.

In many of the disclosed systems, telephony signals are communicated from a telephony network to CATV subscribers in a forward band of the spectrum of the cable network and telephony signals are communicated from the CATV subscribers to the telephony network in a reverse band of the cable network. Further, the subscriber telephony signals to the telephony network are digitized and individually modulated on a carrier in the reverse band of the CATV system. The carriers for modulation are derived from a common clock transmitted from the head end unit (HIU), so that all upstream telephony signals are modulated on carriers that are coherently harmonically related. This facilitates the block filtering and FFT down conversion of the signals in the reverse band.

As an illustrated example, a subscriber DS0 telephony line is QPSK modulated into an approximately 50 kHz bandwidth signal (e.g. 49.5 kHz) and frequency division multiplexed on the reverse band of the CATV network. The individual telephony signals are multiplexed into a standard time-division multiplexed (TDM) telephony signal which can be adapted to couple directly into a SONET port or other standard telephony connection, such as a DS1, DS2, or DS3 format signal, of the telephony network.

Accordingly, it is an object of the present invention to provide a system for receiving and processing upstream telephony signals from subscribers in a broadband communication system with a block receiver that is operative simultaneously on all signals contained within a selected subband in the upstream frequency band.

It is another object of the present invention to provide a block receiver for receiving a group of modulated information signals each communicated in a channel in a predetermined spectral subband selected within a predetermined spectral band and providing modulated digital information signal outputs.

It is another object of the present invention to provide a block receiver that operates on a group of modulated information signals each communicated in a channel in a predetermined spectral subband selected within a predetermined spectral band of a broadband communication network, provides a block matched filtering process on all channels in the spectral subband, and provides a block FFT downconversion process on all channels in the spectral subband to provide output signals of each channel at baseband.

It is another object of the present invention to provide a flexible, digital design for handling baseband processing of plural DS0 telephony channels in a single programmable digital signal processor, to obtain improvements in density, cost, and space.

Advantageously, by translating a plurality of reverse channel telephony signals to baseband, a single digital signal processor can handle a significant number, six in the preferred embodiment, of DS0 telephony channels. This provides a low cost, compact demodulator that can be used in larger systems where a large number of telephony signals are coupled between the telephony network and the broadband network.

Furthermore, all the mathematical constants (sin and cosine values) required for QPSK demodulation can be stored within the memory of the DSP, providing a very memory-usage efficient demodulator that can handle a number of DS0 channels simultaneously.

Also, handling the AGC, STR, CPR, and symbol decoding functions digitally at the symbol rate rather than in the analog domain or with an oversampling approach results in a compact, efficient, multi-channel demodulator.

By using the reverse band of the CATV network in small increments of about 50 kHz, the flexibility of the reverse signaling band is not compromised. The system operator can still provide interactive TV services, IPPV services, and other reverse path signals while providing telephony service.

These and other objects, features and advantages of the invention will be better understood and more fully appreciated if a reading of the following detailed description is undertaken in conjunction with the appended drawings and claims.

BRIEF DESCRIPTION OF THE DRAWINGS

FIG. 3D is a pictorial representation showing selection of a block of 25 upstream channels in a frequency allocation scheme of a broadband communication system constructed in accordance with the preferred embodiment of the present invention.

FIG. 3E is a pictorial representation of the spectrum of the selected block of 25 upstream channels after downconversion by the analog front end in the preferred embodiment of the present invention.

FIG. 3F is a pictorial representation of the spectrum of the selected block of 25 upstream channels after the quadrature down conversion stage in the preferred embodiment of the present invention

FIG. 15 is a table of the weighting function values utilized in the 320/10 polyphase filter engine.

FIG. 27 is a flow chart illustrating the steps taken in the program for the DSP to carry out background processing in the baseband processing method of FIG. 18.

FIG. 28 is a chart of timing operations for programming the preferred digital signal processor.

DETAILED DESCRIPTION OF THE PREFERRED EMBODIMENTS

Figure 1:
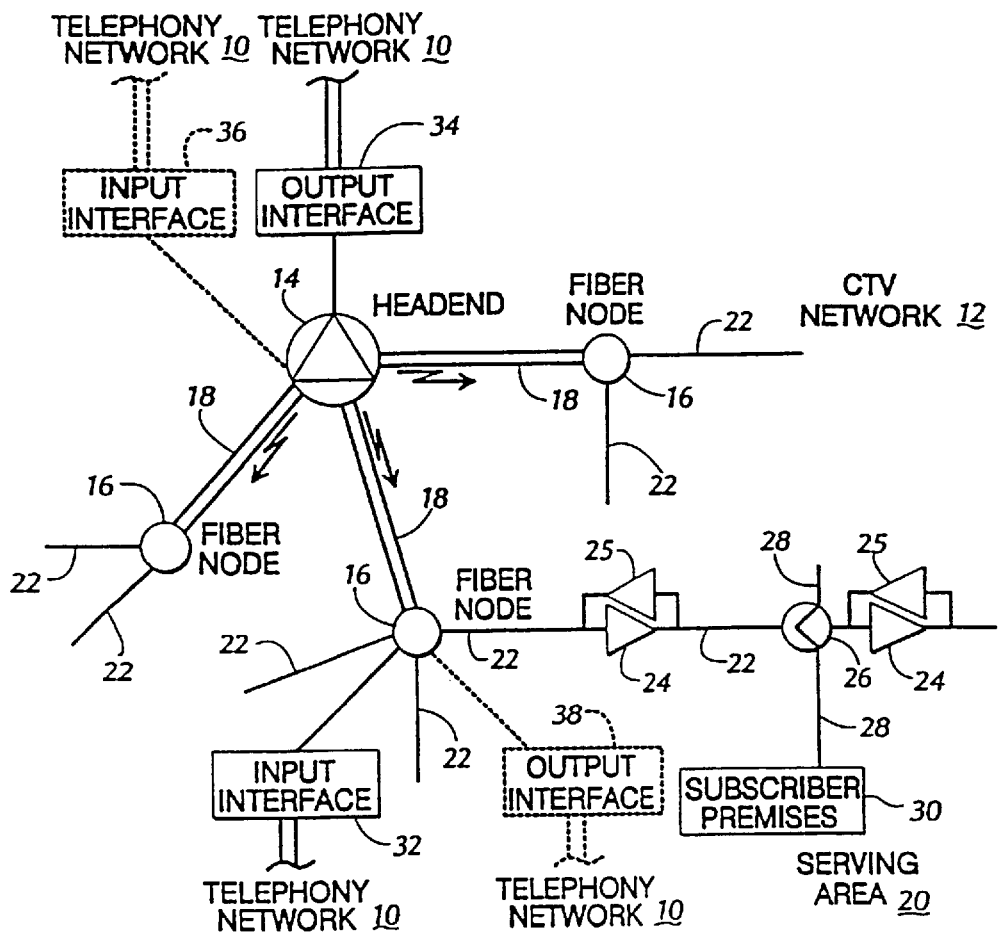
FIG. 1 is a system block diagram of a broadband telephony system in which the invention is utilized.

With respect now to FIG. 1, there is shown a broadband communications system in which the present invention is utilized The system will be described in connection with the communications of telephony signals, but it will be evident that other signals of similar or equivalent types can also be used. Further, while digital telephony signals are described, the system is also capable of communicating analog telephony signals or other types of digital signals. Telephony signals from the telephony network are coupled to the CATV network 12 and are communicated over the CATV network to an addressed subscriber premises 30. The addressed subscriber 30 communicates telephony signals back over the CATV network 12 which are then coupled to the telephony network 10. The system serves as an extension of the telephony network 10 where subscribers can call out to the telephony network 10 or receive calls from the telephony network. This service is in addition to the conventional video, audio, data and other services provided to each subscriber by the CATV network 12.

By "headend", we do not mean to be limited to a conventional coaxial CATV headend such as 14, but also consider that an optical fiber node such as 16 or other communication node that can serve the functions of receiving multiplexed communication signals from a source of signals, such as a telephony central office, and communicating such signals to subscribers in the broadband network. As will be seen in the following discussion, a CATV headend 16 is the preferred embodiment for effecting these functions.

A preferred implementation of the broadband communications system is illustrated in FIG. 1. The system includes the telephony network 10 which interfaces through an input interface 32 to the CATV network 12. The CATV network 12 further interfaces with the telephony network 10 through an output interface 34. Telephony signals are communicated to subscribers of the CATV network 12 through the input interface 32 to a subscriber premises 30. Telephony signals from the subscriber premises 30 of the CATV network 12 are communicated over the CATV network 12 and through the output interface 34 to the telephony network 10. The broadband communications system does no switching and thus takes advantage of the strength of the CATV network 12 for its broadband communications path and the strength of the telephony network 10 for its connection and switching capability.

The CATV network 12 is illustrated as having a fiber to the serving area (FTSA) architecture. A headend 14 provides CATV programming which is distributed via a distribution network to a plurality of subscribers at their subscriber premises 30. The distribution network serves a plurality of "serving areas", such as the one referenced at 20, which are groups of subscribers that are located proximate to one another. Each serving area is comprised of groups ranging in size from about 50 homes to about 2500 homes. The headend 14 is coupled to each serving area in a star configuration through an optical fiber 18 which ends in a fiber node 16. The CATV programming and telephony signals are converted from an RF broadband signal to light modulation at the headend 14, transmitted over the optical fiber 18, and then converted back to an RF broadband signal at the fiber node 16. Radiating from each of the fiber nodes 16 throughout its serving area 20 is a coaxial sub-network of feeders 22 having bidirectional amplifiers 24 and bidirectional line extenders 25 for boosting the signal.

The RF broadband signal is distributed to each of the subscriber premises 30 by tapping a portion of the signal from the nearest feeder 22 with a tap 26, which is then connected to the subscriber premises through a standard coaxial cable drop 28. The CATV network thus provides a broadband communications path from the headend 14 to each of the subscriber premises 30, which can number in the several hundreds of thousands.

While one preferred embodiment of the invention shows the input interface 32 coupled to the fiber node 16 and the output interface 34 coupled to the headend 14, it is evident that the insertion and extraction of the RF telephony signals need not be limited to this single architecture. Both the input interface 32 and an output interface 38 (shown in phantom) can be connected at the fiber node 16. Alternatively, both an input interface 36 (shown in phantom) and the output interface 34 can be coupled to the headend 14. Moreover, the input interface 36 can be coupled to the headend 14, while the output interface 38 can be coupled to the fiber node 16. For cable architectures which do not conform to a star configuration, it is generally most advantageous to insert the RF telephony signals at the headend and to extract them from the system at the headend.

The input and output interfaces 32 and 34 produce a facile method for inserting the telephony signals in one direction and extracting the telephony signals in the other. The telephony signals are transformed into compatible RF signals which can be inserted or extracted from the CATV network 12 in much the same manner as other programming at various points in the network. The compatibility of RF telephony signals with the previous RF signals on the CATV network 12 allows their transmission in a transparent manner over the network without interference to the other signals or special provision for their carriage.

Theoretically, the broadband communications path provided by the CATV network 12 is bidirectional so that information can be passed in each direction. However, because of convention and the single point to multipoint nature of most networks, the reverse path, i.e., communications originating from the subscriber premises 30 and communicated to the headend 14, is much more limited. Normally, the reverse amplifiers 25 are bandwidth limited and include diplexers which separate the CATV spectrum into forward and reverse paths based on frequency.

In summary, the described system provides for broadband communications including digital communications, telephony, and telephony-related services by utilizing a CATV system in an efficient manner, while not requiring extensive switching equipment and a redesign of such systems. The broadband communications system requires no switching in the normal context when connecting telephony based calls from a subscriber or to a subscriber. A multiplicity of calls can be placed through the system efficiently using the broad bandwidth of the CATV network to utilize its best features and having the switching for the connection of the calls performed by the telephony network to utilize its best features.

There are two types of telephony calls in the broadband communications system, where one is an incoming call and the other is a outgoing call. With combinations of these types of calls, all the necessary connections to or from another telephony set and to or from a CATV network subscriber can be made. The subscriber may call (or be called by) another subscriber within the CATV network system, may call (or be called by) a local telephone set within the local area of the telephone network, or may call (or be called by) the telephone network to interface to the long distance and international telephony systems.

An incoming call is directed to a particular subscriber of the CATV network by the telephony network recognizing that the call is directed to one of the group of subscribers belonging to the CATV network. The call is then switched by the telephony network to the OC-1 or other standard telephony signal coupled to the CATV network in the time slot assigned to that subscriber. The addressing and control system of the CATV network then decodes the multiplexed information and translates it into a frequency and time position in the forward multiplex that has been assigned to the particular subscriber. The addressing and control system further provides the necessary control for causing the subscriber equipment to ring or alert the subscriber of an incoming call.

The telephony network and CATV network maintain the connection until there is an indication of an "on hook" signal by one of the parties or another signal that indicates that the communication is complete, such as an end of message data pattern or the like. What is meant by maintaining the connection is that the telephony network continues to place the called party's data packets into the assigned DS0 position in the standard telephony signal and the broadband communications system continues to convert them to the location and frequency in the forward multiplex that is directed to the particular subscriber.

For outgoing calls, the telephony network recognizes from the DS0 position in the standard telephony signal which data packet belongs to a particular originating subscriber of the CATV network. This is an assigned position and the CATV system converts data on whatever carrier frequency is input to the demodulators to that assigned position in the reverse multiplex. Therefore, for outgoing calls the telephony network will consider the standard telephony signal as a group of individual DS0 signals, whose location in the reverse multiplex identifies the originating subscriber.

Figure 2:
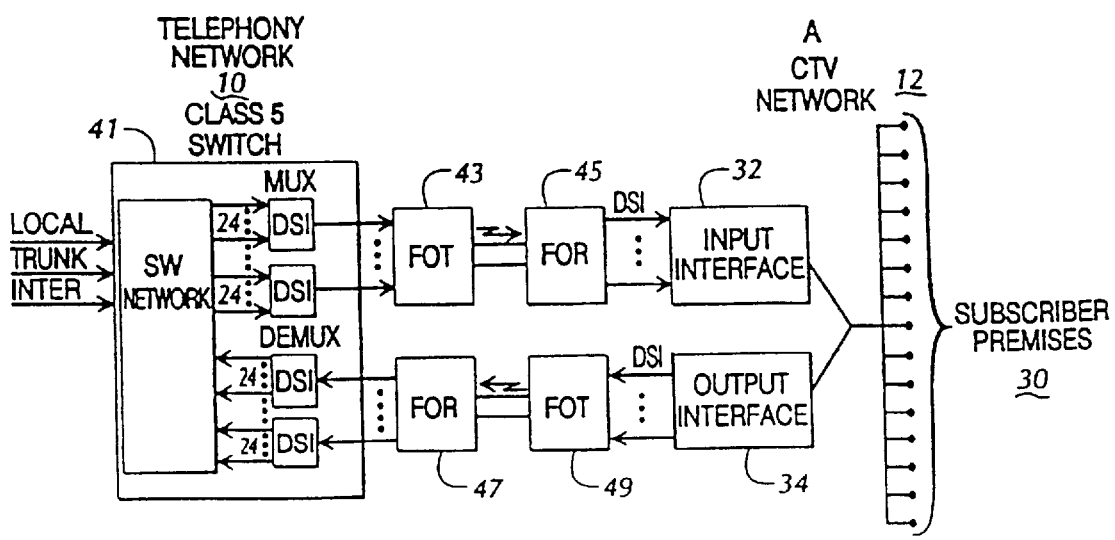
FIG. 2 is a system block diagram of one embodiment of the broadband communications system illustrated in FIG. 1 connected to a telephony network.

FIG. 2 illustrates a preferred implementation of the broadband communication system configured as an extension to a telephony network. For connection to the telephony network 10, a class 5 switch 41 is used. The switch 41 has suitable circuitry for handling conventional local, trunk and interconnect signals which integrate the switch into the local area, national and international calling grids. The switch 41 has a switching network of crosspoints which may switch any of a plurality of inputs to any plurality of outputs. Particularly, the switch 41 has equipment to provide DS1 format interfaces.

As known to those skilled in the art, a "DS0" signal is a standard telephony format corresponding to a 64 kb/s digital channel which can be used for voice, data, audio, etc. Thus a single DS0 telephony signal can be viewed as a single telephone conversation. Likewise, a "DS1" signal corresponds to a 1.544 Mb/s digital channel that contains 24 DS0 channels. For a summary of the bit rates of the standard digital telephony formats and their relationships to one another, see TABLE 1 below:

TABLE 1

| Digital Signal | Bit Rate | DS0 | DS1 | DS3 |
| --- | --- | --- | --- | --- |
| DS0 | 64 kb/s | 1 | 1/24 | 1/672 |
| DS1 (also T-1) | 1.544 Mb/s | 24 | 1 | 1/28 |
| DS1C | 3.152 Mb/s | 48 | 2 | 1/14 |
| DS2 | 6.312 Mb/s | 96 | 4 | 1/7 |
| DS3 | 44.736 Mb/s | 672 | 28 | 1 |
| OC-1 | 51.84 Mb/s | 672 | 28 | 1 |

Additionally, the switch 41 has means for demultiplexing DS1 signals into a plurality of DS0 signals which then can be routed to outgoing points. The system uses a forward path which receives a plurality of the DS1 channels at the input interface 32 and connects them over the CATV network 12 to the subscriber premises 30. The subscriber premises 30 transmits telephony signals over the CATV network 12 to the output interface 34 which converts them back into the same number of DS1 signal channels for transmission to the switch 41. If the switch 41 is located proximately to the input interface 32 and the output interface 34, then they can be coupled directly. Alternatively, as will be the most prevalent case, where a headend or fiber node is not located proximately to the class 5 switch, an optical fiber link can be used to connect the switch 41 and interfaces 32 and 34.

In the forward direction, a fiber optic transmitter (FOT) 43 converts the plurality of DS1 telephony signals into an optical signal which is transmitted to a fiber optic receiver (FOR) 45. The fiber optic receiver 45 converts the optical signal back into the DS1 format telephony signals. Likewise, the fiber optic transmitter 49 in the reverse path converts the outgoing DS1 telephony signals into an optical signal which is received by the fiber optic receiver 47 for conversion back into the DS1 telephony format signals.

The DS1 telephony signal format was chosen because it is a standard telephony format, and conventional optical links to do the conversion and transmission are readily available for the transmitters 43, 49 and for the optical receivers 45, 47.

The system uses this bidirectional mode of communication where each DS1 signal contains 24 DS0 channels, which can be considered groups of 64 kb/s digital data channels. The 64 kb/s channels can either be used for voice, data, audio (music, stored information), etc. In general, for telephony type signals, each DS0 channel derived from a connected DS1 link is addressed to and associated with a particular subscriber. The preferred embodiment provides transport from each DS0 signal in the connected DS1 link to the particular subscriber, by transmitting incoming telephony signals downstream in a selected DS0 downstream channel in the broadband system forward path, and has a corresponding DS0 upstream channel assigned to that subscriber in the broadband system reverse path for outgoing telephony signals. Received DS0 signals from subscribers are then routed to the corresponding DS0 time slot in the DS1 link for outgoing signals. This permits the switch 41 to connect any of the local, trunk or interconnect calling points to any of the DS0 channels in the forward path and its associated DS0 channel in the reverse path to the same local, trunk or interconnect points for completing the communications path. Each of the subscribers 30 appears as another DS0 subscriber connected directly to the class 5 switch 41. The distribution system of the CATV network 12 is transparent to the switch 41 and does not need any further communication, information or connection to the broadband communication system.

Figure 3A:
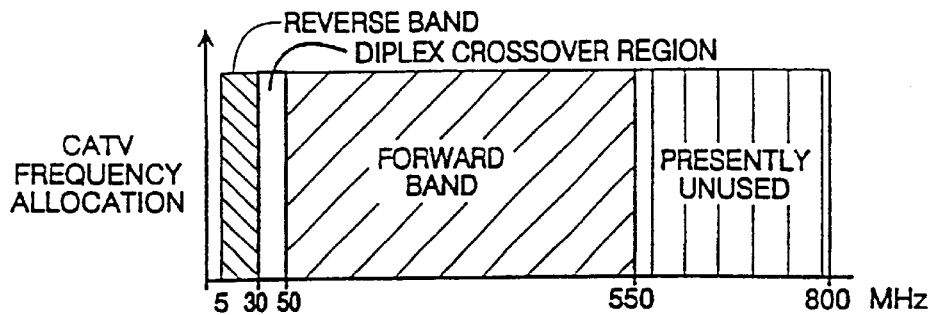
FIG. 3A is a pictorial representation of the frequency allocation of typical split CATV systems illustrating their forward and reverse signaling bands.

FIG. 3A illustrates a typical frequency allocation for many of the installed split band CATV networks in present use in the United States. The frequencies used for programming which generate the revenues for the system operator are carried in the forward band from 50 MHz to about 550 MHz. Although, the frequencies above 550 MHz are not presently used, there has been increased interest in providing additional services in this unused forward bandwidth, currently considered to extend to about 1 GHz. Conventionally, the forward band comprises a series of video channels, each 6 MHz in bandwidth, which are frequency division multiplexed across the forward band. Several areas are not used and each video channel has a 1.5 MHz guard band between other adjacent channels.

In combination with the forward band, the typical CATV spectrum includes a reverse band from about 5–30 MHz (in the U.S.). Other systems may have a reverse band of about 5–65 MHz. These frequencies have been allocated for signals returning from the subscriber to the headend. This band has traditionally been relatively narrow because of the high noise from the funneling effects of the multiplicity of the multipoint signals adding to a single point. Further, in the past bandwidth taken from the forward band has meant less revenues from other services. The present invention provides a solution to these problems by providing a system where the telephony signals to a subscriber premises are communicated in the forward band of the spectrum and the telephony signals from a subscriber premises are communicated in the reverse band of the CATV system.

Figure 3B:
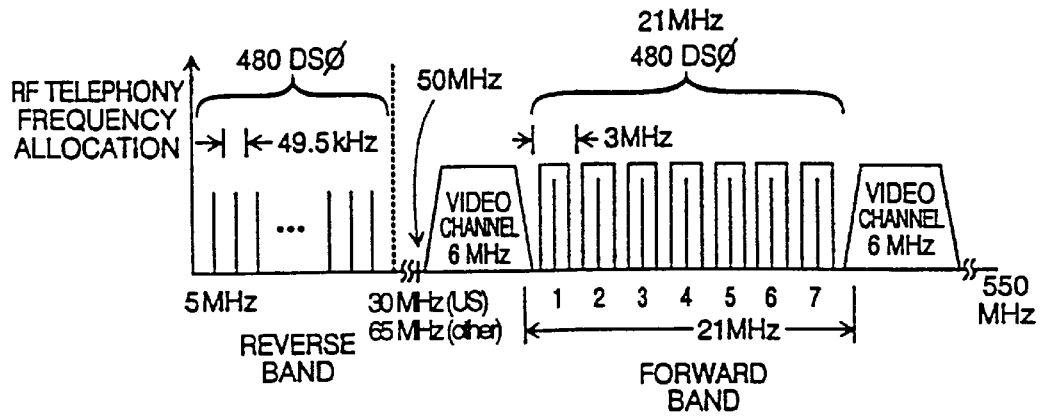
FIG. 3B is a pictorial representation of an exemplary frequency allocation of the broadband communications system illustrated in FIG. 2.

As seen in FIG. 3B, the broadband communications system utilizes a plurality of frequency division multiplexed carriers in the forward band to communicate the telephony signals to the subscribers. In the illustrated embodiment, seven (7) channels of approximately 3 MHz are used to carry incoming telephony signals from the telephony network 10. Each forward channel is a QPR modulated carrier, where the modulation occurs as a 6.312 Mb/s digital data stream in three DS1 telephony signals including 72 DS0 telephony signals. The carriage capacity of such a system is then at least 20 DS1 channels, or enough for at least 1880 DS0 voice channels.

Each of the reverse band signals are about 50 kHz in bandwidth (49.5 kHz in the presently preferred embodiment), which is narrow enough to be easily placed at different frequency division multiplexed positions in the frequency spectrum. The modulators are frequency agile and can reallocate frequencies based upon traffic over the system, noise, channel condition, and time of use. The 49.5 kHz wide carriers can be placed anywhere in the reverse band that there is space for them. Depending upon the CATV system, i.e., whether there is a reverse amplification path in the distribution network, they could also be allocated to frequencies normally reserved for forward band transmissions. Further, such system is expandable by bandwidth for other uses besides the individual telephony signals. For example, if a particular subscriber required a return path of a greater bandwidth than 49.5 kHz, then the bandwidth could be easily allocated to this use without a complete reconfiguration of the system. Such uses may include high speed data transmissions, trunk connections for small central offices, video services originating from the telephony network, and other uses requiring a nonstandard bandwidth.

There are a number of advantages with the broadband communications system as described. It uses the reverse band efficiently and uses only that portion of the forward band which is necessary. Digital QPR and QPSK modulation is used to permit digital and telephony services to the subscriber and provide a robust signaling method allowing the forward or reverse signals to be placed anywhere in the CATV band, either at high or low frequencies without signal to noise ratio concerns. Moreover, in the forward direction, the carrier signals are minimized so that carrier overloading does not occur and that the 3 MHz channels can be placed where space is found.

Figure 3C:
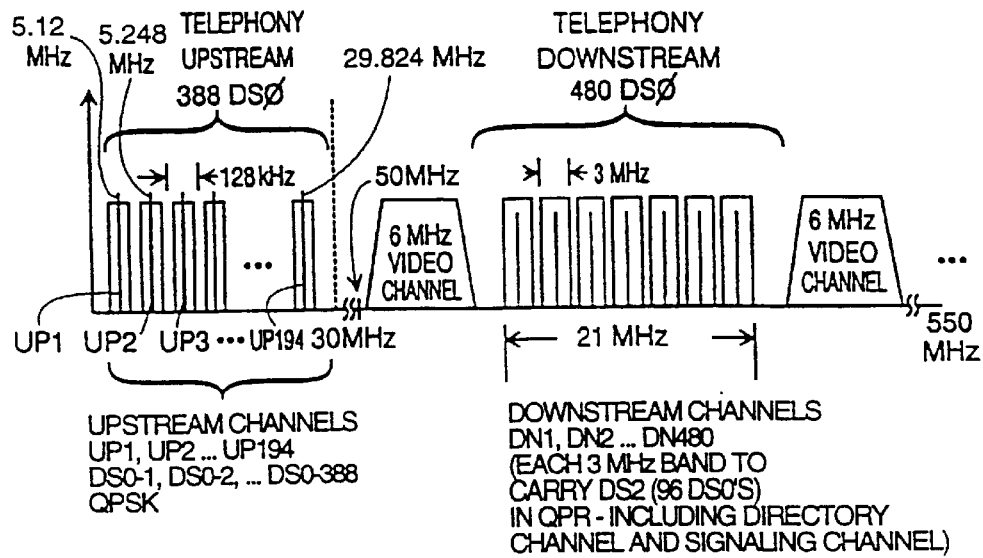
FIG. 3C is a pictorial representation of an alternative frequency allocation for a broadband communications system.

FIG. 3C illustrates an alternative frequency allocation for a split band CATV network. As in the other systems, the frequencies used for television programming that generate the revenues for the system operator are generated in the forward band from about 50 MHz and above (for a typical U.S. system). The spectrum in FIG. 3C includes the reverse band from about 5 MHz to about 30 MHz. Again, an alternative configuration where the reverse band is from about 5 MHz to about 65 MHz is contemplated and within the scope of the present invention.

In one embodiment, the 5–30 MHz band is used for upstream telephony signals in the form of 388 DS0's, combined to form DS0 pairs and QPSK modulated in 128 kHz upstream channels or subbands designated UP1, UP2, . . . UP194, where each upstream channel UPn carries 2 DS0's. In order to accommodate 388 DS0's, 194 QPSK carriers or channels are required. Each of the upstream channels UPn consumes 128 kHz bandwidth, comprising 108 kHz of modulated signal space and 20 kHz of guard band.

Those skilled in the art will appreciate that if the 5–65 MHz band is utilized, the number of upstream DS0's is commensurately greater. For example, an alternative embodiment of the present invention contemplates utilization of a single channel per carrier approach of 49.5 kHz with a carrier centered within this band. Carrier frequencies are chosen such that a plurality of channels, as many as about 1,200, can be accommodated in the upstream path. These channels will be located in a contiguous frequency space for block processing in the receiver in accordance with the present invention. In accordance with the invention, a single block receiver will digitize and process a 1.584 MHz wide spectrum. A spectrum of this width is sufficient to accommodate 24 usable channels at a QPSK modulation and 48 channels using 16-QAM.

Still referring to FIG. 3C, the downstream telephony is provided in downstream channels DN1, DN2, . . . DN480, each DN corresponding to a DS0. In one preferred alternative embodiment, a total of 21 MHz of bandwidth is provided in 3.168 MHz subbands, each 3.168 MHz subband carrying the equivalent of three DS1 telephony signals (72 DS0's), in QPR modulation.

FIG. 3D illustrates the preferred embodiment wherein a block of the spectrum in the 5–65 MHz range is selected and processed to pick out individual channels. As shown in FIG. 3D, a large number of channels at a spectrum width of 49.5 kHz, single carrier per channel, are provided in the band. In accordance with the invention, a block of 25 channels located anywhere within the range, in a contiguous 1.584 MHz range, are selected for processing by a block receiver. In order to select a 1.584 MHz spectrum, a band of 1.9305 MHz, when including the filter rolloff skirts down to 50 dB, is down converted to DC via an analog front end, as will be described. The 1.584 MHz band is sampled at 6.336 MHz.

The spectrum after down conversion is shown in FIG. 3E, showing a selected 1.584 MHz sample band centered at 792 kHz.

FIG. 3F illustrates the spectrum of FIG. 3E after quadrature down conversion to DC. The quadrature down conversion stage permits the sample rate to be lowered to an effective rate of 1.584 MHz for block processing.

After the operation of the channelizer as described below, an individual 49.5 kHz channel is translated to baseband and processed by the baseband processing stage, as describe below.

Figure 3G:
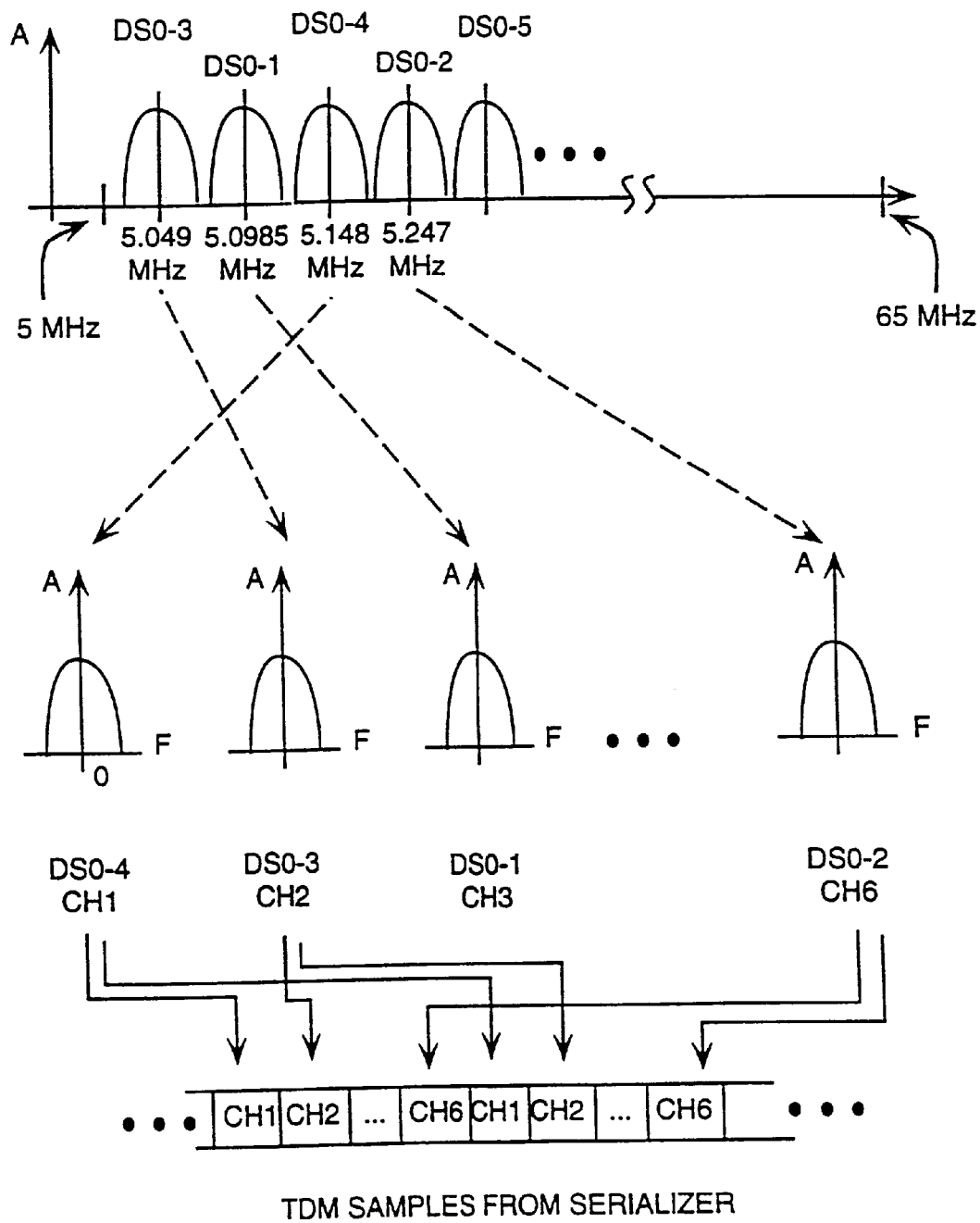
FIG. 3G is a pictorial frequency domain representation of the conversion of QPSK modulated DS0 telephony channels after the FFT stage to baseband DS0 channels for processing in the preferred embodiment of the present invention

FIG. 3G, which will be discussed in greater detail below, illustrates the frequency downconversion of the reverse band QPSK modulated DS0 telephony signals into baseband before processing. As will be discussed later, selected QPSK modulated DS0 telephony signals in the reverse band, e.g. DS0-1 at 5.0985 MHz, DS0-2 at 5.1975 MHz, etc. are converted to baseband signals, e.g. DS0-1 at CH3, DS0-2 at CH6, etc., before processing.

Figure 4:
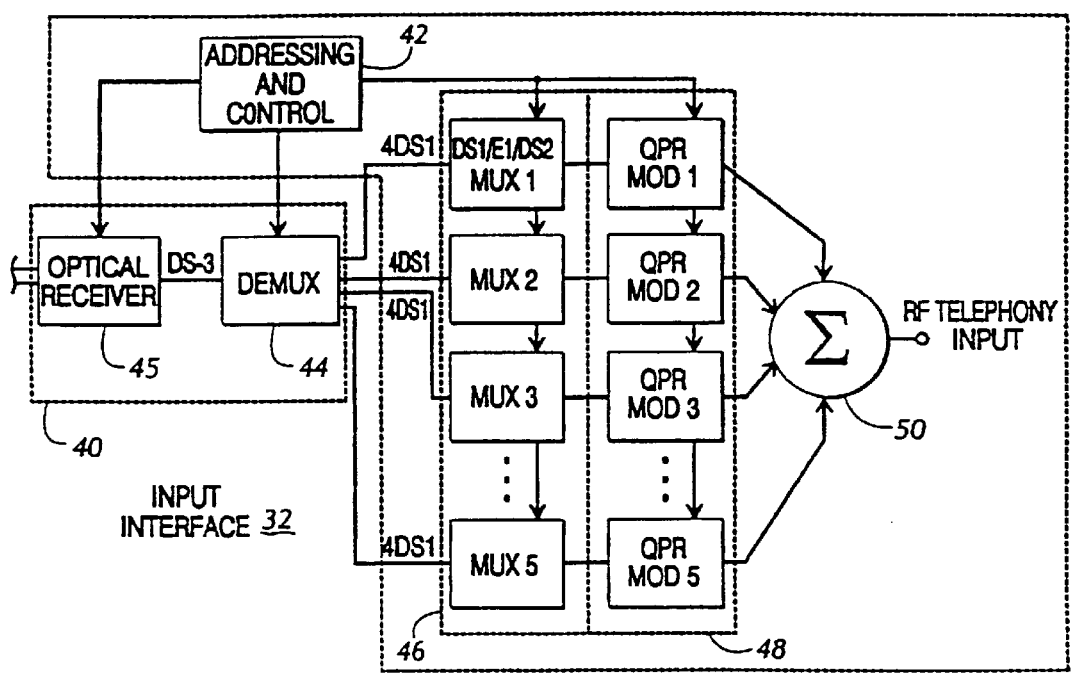
FIG. 4 is a detailed block diagram of the telephony network to the CATV network input interface of the system illustrated in FIG. 2.

A detailed block diagram of the input interface 32 is illustrated in FIG. 4. The function of the input interface 32 is to convert the 20 DS1 telephony signals into the seven QPR modulated RF signals which are sent to the subscribers in the forward band of the CATV system 12. The input interface 32 is connected to an optical interface 40, comprising a fiber optic receiver 45 and a demultiplexer 44. The fiber optic receiver 45 operates to convert the optical signal into an RF digital signal of a standard telephony format. The demultiplexer 44 receives the digital DS3 telephony signal and separates it into its 28 component DS 1 signals, where each DS1 signal comprises 24 DS0 signals. The optical interface 40 also allows an addressing and control unit 42 to decode and strip overhead and framing bits from the signal.

The input interface 32 comprises a series of five multiplexers 46, which each take four of the DS1 signals from the demultiplexer 44 and combine them with signaling and addressing bits from the addressing and control unit 42 to form a 6.312 Mb/sec serial digital signal. Each of the five digital signals is modulated on a selected carrier frequency by an associated QPR modulator 48. The five telephony channels from the outputs of the modulators 48 are frequency division multiplexed together in an RF combiner 50 before being inserted conventionally on the CATV network 12.

The output interface 34 will now be more fully described with reference to FIG. 5. In one embodiment, the output interface 34 functions to convert 1880 DS0 digital signals which are QPSK modulated on the reverse band carriers into the optical format for coupling to the telephony network 10. The output interface 34 extracts the reverse band signals in a conventional manner and fans them out with a signal divider 60 to a plurality of tuner/demodulators 62. Each of the tuner/demodulators 62 is adapted to tune one of the carrier frequencies of the reverse band signals and demodulate it into a DS0 format digital signal. The tuners of the tuner/demodulators 62 can be variable or fixed, or can be adapted to tune only certain bands of the reverse spectrum. The output of the tuner/demodulators 62 is 1880 DS0 signals which are concentrated into groups of DS1 signals by a group of multiplexers 64 under the control of addressing and control unit 66.

In accordance with the preferred embodiment of the present invention, the tuner/demodulators 62 are constructed with a block receiver and baseband processing stage to provide up to 24 DS0 signals as described herein. (Actually, 25 DS0's are demodulated by the block receiver, as will be described.) The construction of such an arrangement is described in greater detail below.

Each of the multiplexers 64 inputs 24 DS0 formatted signals and outputs one DS1 formatted signal to a fiber optic transmitter 49. At the fiber optic transmitter 49, the 20 DS1 signals are concentrated by a multiplexer 68 into a single DS3 digital signal which is input to the optical transmitter 70. The addressing and control unit 66 adds the necessary control information in the optical transmitter 70 before communicating the digital DS1 signals in an optical format. The optical transmitter 70 also converts the RF signal into light so the optical fiber of the telephony network can transmit it.

Figure 6:
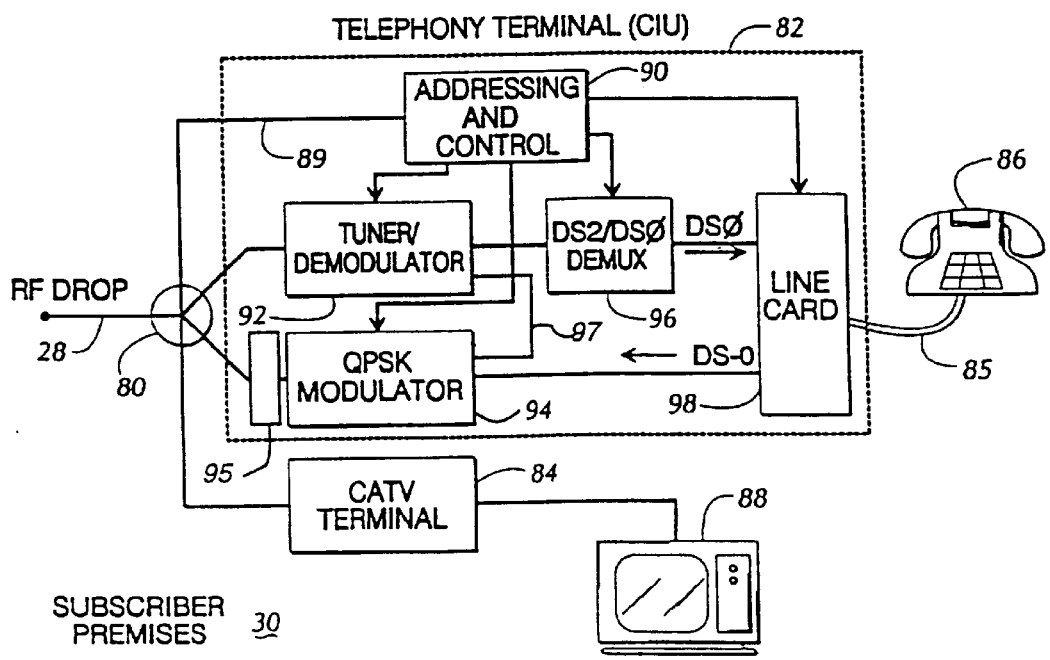
FIG. 6 is a detailed block diagram of a telephony terminal for receiving telephony signals from the telephony network through the CATV network and for transmitting telephony signals to the telephony network through the CATV network.

A detailed block diagram of the system equipment at the subscriber premises 30 is shown in FIG. 6. Generally, the subscriber will want to maintain CATV video or other services and has a CATV terminal 84 for this purpose connected between the CATV drop line 28 and a television receiver 88. The CATV terminal is connected to a splitter/ combiner/diplexer 80 coupled to the drop 28 from one of the CATV coaxial subnetwork feeders.

Because the presently described broadband communications system does not interfere with or displace the conventional CATV programming and frequency allocations, the CATV terminal 84 can generally be used with no modification or change in operation of the installed terminal base. The system operator does not need to change or reconfigure its distribution network operation and the new telephone service is compatible with its installed CATV subscriber terminal base.

The broadband communications service is provided by coupling a telephony terminal, also called a "customer interface unit" 82, between the splitter/combiner/diplexer 80 and the telephone equipment 86. The customer interface unit 82 converts the incoming telephony signals to a subscriber into analog signals which can be used by a standard telephone handset 86 over a pair of twisted wires 85. Further, the customer interface unit 82 converts the analog signals, representing outgoing telephony signals from the handset 86, into a QPSK modulation which is coupled to the CATV network. A standard telephone handset 86 is shown for the purpose of illustration but could in fact be any equipment normally connected to a telephone line for (analog or digital) communications purposes.

The telephony terminal 82 has two communication paths. The first path for incoming signals comprises a tuner/demodulator 92, demultiplexer 96, and a portion of a line card 98, and a second path for outgoing signals comprises a portion of the line card 98 and a modulator 94. The tuner/demodulator 92, modulator 94, demultiplexer 96, and line card 98 are under the control of an addressing and control unit (CPU) 90.

For incoming telephony signals which are received in the 3 MHz channels modulated on an FDM carrier, the control unit 90 causes the tuner/demodulator 92 to tune the carrier on which the particular call information directed to the subscriber is carried. The carrier defines one of the seven 3 MHz channels having 3 DS1 or 3 E-1 telephony signals QPR modulated thereon.

The telephony signals are demodulated by the tuner/demodulator 92 into a serial digital stream containing the 3 DS1 or 3 E-1 telephony signals before being input to the demultiplexer 96. The demultiplexer 96 selects the particular DS0 digital telephony channel assigned to the subscriber at the input rate of 64 kb/s and inputs the data to an input terminal of the line card 98. The control unit 90 determines which forward telephony channel to tune and which DS0 signal to select from that channel from the signal and addressing information it receives by its connection to the splitter/combiner/diplexer 80 via line 89.

The tuner/demodulator 92 further provides a clock signal on line 97 to the QPSK modulator 94 that is derived from signals transmitted on a downstream channel carrying a control data link. The clock signal on line 97 is used to derive a clock for QPSK modulating the upstream telephony signals. All CIU's 82 derive the carrier for QPSK modulation from this control data link, to ensure that all upstream telephony signals in the reverse band are coherently harmonically related. This facilitates the group receiver processing, as will be described.

The DS0 digital format provides a voice channel with sufficient bandwidth for voice quality communications. The DS0 format is a 64 kb/s data stream of bytes forming timed samples of an analog voice signal. This produces a voice signal quantized to 8-bits per sample (256 values) at a sampling rate of 8 kHz and with a bandwidth of 4 kHz.

The line card 98 receives the digital telephony signal in the DS0 format and converts it to the proper analog voltages and signals to drive the telephone handset 86. In addition, the line card 98 provides ringing current, terminal identification, and other standard functions under the direction of control unit 90. The line card 98 receives the analog telephony signals from the telephone handset 86 and converts them into a digital DS0 format. Dialing signals and other addressing and control signals from the handset 86 are also digitized by the line card 98. The digitized outgoing telephone signals are then combined and formatted by the line card 98 into a DS0 format at 64 kb/s and input to the modulator 94.

The modulator 94 under the regulation of the control unit 90 selects a carrier frequency in the reverse band and, according to a preferred embodiment, QPSK modulates the DS0 telephony signal thereon. The QPSK modulated carrier having a bandwidth of 49.5 kHz is coupled on the CATV network through a 1/2 Nyquist lowpass filter 95 and then to the splitter/combiner/diplexer 80. The Nyquist-filtered QPSK modulated outgoing telephony signal is then received at an output interface 34 (either on a stand-alone basis or associated with a headend unit 14) and demodulated into DS0 format for coupling to the telephony network.

The 1/2 Nyquist filter 95 is matched to a filter in the block receiver, described in greater detail below.

Before leaving FIG. 6, it will be understood that the nature of the telephony service that is provided at any given CIU 82 must be preidentified and prestored in memory in the HIU 14 or circuitry that is utilized as the telephony network interface, so as to enable provision of the selected service upon demand. In response to a request for service either originating with a subscriber at a selected CIU, or a request for incoming service to a subscriber originating externally to the network, status signals such as the subscriber going off hook, or a ringing condition on an incoming line, the system causes the selection and allocation of appropriate bandwidth, DS0 channels, reverse channels, carriers, etc., required to provide the selectably variable bandwidth commensurate with the selected service.

Incoming data from the broadband network is derived from the forward channel demodulator 92, which is operative to monitor a preassigned channel in the QPR-modulated forward channel utilized for incoming telephony signals. The preferred forward demodulator 92 demodulates a QPR modulated forward channel signal in the designated telephony downstream subband of 15.840 MHz, and monitors the predetermined directory channel and signaling channels provided as a part of the overhead data.

As described above, a common clock signal which is used for loop timing is transmitted in the downstream symbol frequency, recovered, and provided on line 97. The recovered symbol clock at the CIU 82 is then used to generate all other clocks which are used for the upstream direction. The disclosed upstream receiver has access to this common clock before it is transmitted to the CIU and in this manner all components of the downstream and upstream paths use a common clock. Thus, it will be understood that the upstream symbol clock is locked to or harmonically related to the downstream symbol clock.

Therefore, it will be understood that the predetermined directory channel and signaling channels provide clock data from the HIU 14 to each CIU 82 which is utilized to generate the carrier for QPSK modulation in the upstream path. For purposes of the present block receiver invention, the block processing scheme relies upon a common clock for derivation of the single carrier per channel upstream signals. Although phase differences are introduced as a function of the varying distances from the CIUs to the HIU, those skilled in the art will understand that employment of a common clock facilitates the block processing scheme described in greater detail below.

It will be understood that a plurality of reverse channel modulators 94 may be required to provide the appropriate bandwidth required for a given level of service. For example, if a selected service at a given CIU 82 entails the equivalent of four DS0's, then there is the need for four reverse channel modulators 94. Furthermore, it will be recalled that each modulator 94 is frequency agile and is not necessarily operating at a given fixed upstream carrier frequency, since upstream channels can be reassigned dynamically and in response to changing conditions such as noise level and reallocation of bandwidth in response to the subscriber's needs.

It will also be understood that the CIU 82 can be physically configured either as separate customer premises equipment located in or near a subscriber's telephony punch blocks, or as a CATV set top terminal including one or more RJ-11 or similar telephone connectors. Moreover, the CIU, since it includes a computer (as a part of the addressing and control unit 90) and associated circuitry can be used for conventional CATV signal management such as pay-per-view control, descrambling, etc. Therefore, the preferred CIU, whether settop or separate circuitry enclosure, preferably includes a control connection provided from the addressing and control unit 90 to a switch (not shown in FIG. 6) associated with the signal line between the splitter 80 and the subscriber's television 88. This allows the programming signals to be disconnected from a subscriber in the event of non-payment or election not to receive a certain programming.

Finally, each CIU 82 is associated with a unique predetermined serial number for identification purposes in the network. This serial number is preferably maintained internally in a read-only memory. Also, within a particular network configuration, each CIU is assigned a unique 16-bit address by the HIU. The address of the CIU is provided in the upstream channel to the HIU whenever the CIU requests service. The address information is utilized by the HIU to examine a service level table or data array, described below, to identify the subscriber associated with the address information and determine the appropriate and authorized level of service to be provided. For example, when a telephone connected to the CIU goes off hook, the address of the CIU is transmitted in association with the off hook status information in the upstream channel to the HIU (or network interface), where it is received and examined to determine the appropriate service level, DS0 assignments, frequency assignment, etc.

The service level table or data array stored by the comprises an array of data fields, suitable for storage in a database maintained by the HIU's CPU 308. Preferably, this table is maintained in RAM for rapid access. Furthermore, it is preferred that the table be indexed utilizing conventional database indexing methods so that the table may be rapidly search by subscriber name, subscriber address, telco DS0 number, upstream carrier frequency, etc. Use of indexed methodologies ensures rapid lookup of service level and minimized response time when a subscriber requests service.

From the foregoing, it will be understood and appreciated that the frequency agile CIU is operative for modulating telephony and other signals from a subscriber in a plurality of frequency subbands in the upstream band of a broadband subscription network so as to provide selectably variable bandwidth in the upstream band commensurate with a selected subscriber communication feature such as single voice line, multiple voice lines, ISDN, security monitoring services, and the like. In the preferred embodiment, the bandwidth is selectably allocated in discrete unit of DS0's, which will be understood can be combined to provide for higher capacity digital data channels in response to varying needs of subscribers.

Furthermore, it will be understood that the frequency agile CIU is operative to reassign signals in a selected subband, such as UP1 . . . UPn, to another subband at another frequency in response to a determination that the noise level in a particular selected subband exceeds a predetermined level.

Finally, there is provided one upstream data link for each carrier that is utilized by the CIU 82 to provide a general purpose data transport for alarm conditions, configuration information, etc. Each CIU 82 is normally assigned at least one upstream frequency (either the DS0-1 or the DS0-2 of the 128 kHz channel), which comprises a portion of the 1.333 kbps data channel that is combined with two 64 kbps data channels to form 72 kbps for each upstream frequency subband. The 1.333 kbps data link carries the subscriber's address as well as status information associated with a subscriber's address.

Figure 7:
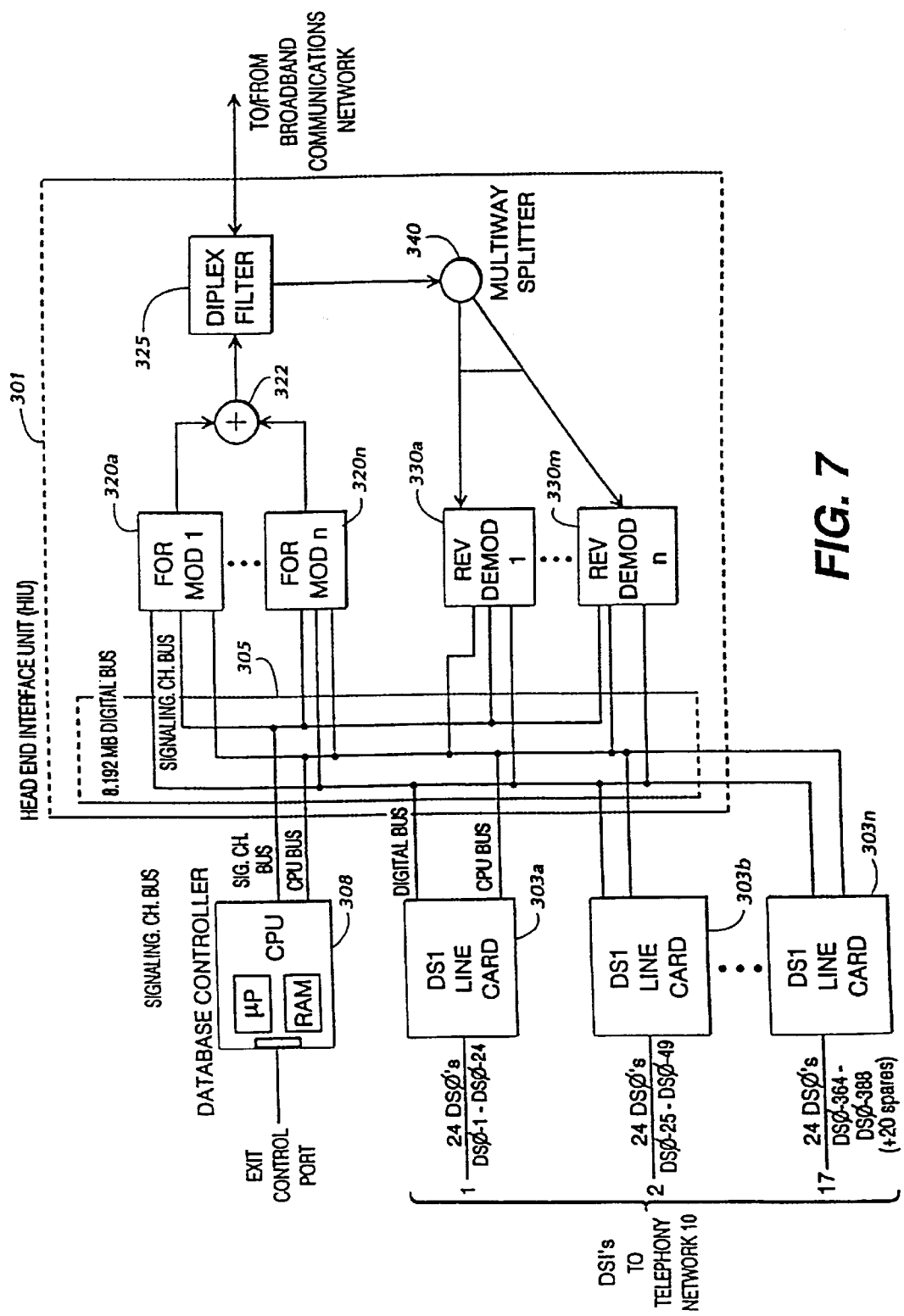
FIG. 7 is a block diagram of a headend interface unit (HIU) constructed in accordance with the preferred embodiment of the present invention.

Turning next to FIG. 7, the preferred embodiment of a headend interface unit (HIU) 301 constructed in accordance with the present invention will be described. A HIU constructed as shown in FIG. 7 may be utilized to carry out the invention as an alternative to providing a separate input interface 32 and output interface 34 as shown in FIG. 1. Stated in other words, a HIU 301 constructed as in FIG. 7 may be utilized to implement the combination of a headend 14, input interface 36, and output interface 34 shown in FIG. 1.

The HIU 301 is suitable for use either as equipment comprising the headend 14 or equipment comprising the fiber node 16 shown in FIG. 1, both of which are operative for receiving multiplexed digital telephony signals in a standard telephony format such as DS3, DS2, DS1, and coupling such signals to an input interface 32, 36 or an output interface 34, 38. Although the preferred embodiment is described in connection with a coaxial line HIU, it will be understood that the principles are applicable for an optical-fiber based HIU that employs methods for communicating broadband signals via amplitude modulation (AM) methods, such as described in U.S. Pat. No. 5,262,883, which is owned by the assignee of the present invention. Briefly described, the HIU 301 is operative for connecting to a telephone company (telco) standard multiplexed telephony signal, directing incoming telephony signals to subscribers downstream on the broadband network using QPR modulation in the forward path, and receiving outgoing telephony signals from subscribers upstream on the broadband network in one or more selected subbands within the reverse path spectrum, commensurate with service levels or features elected by subscribers.

Figure 5:
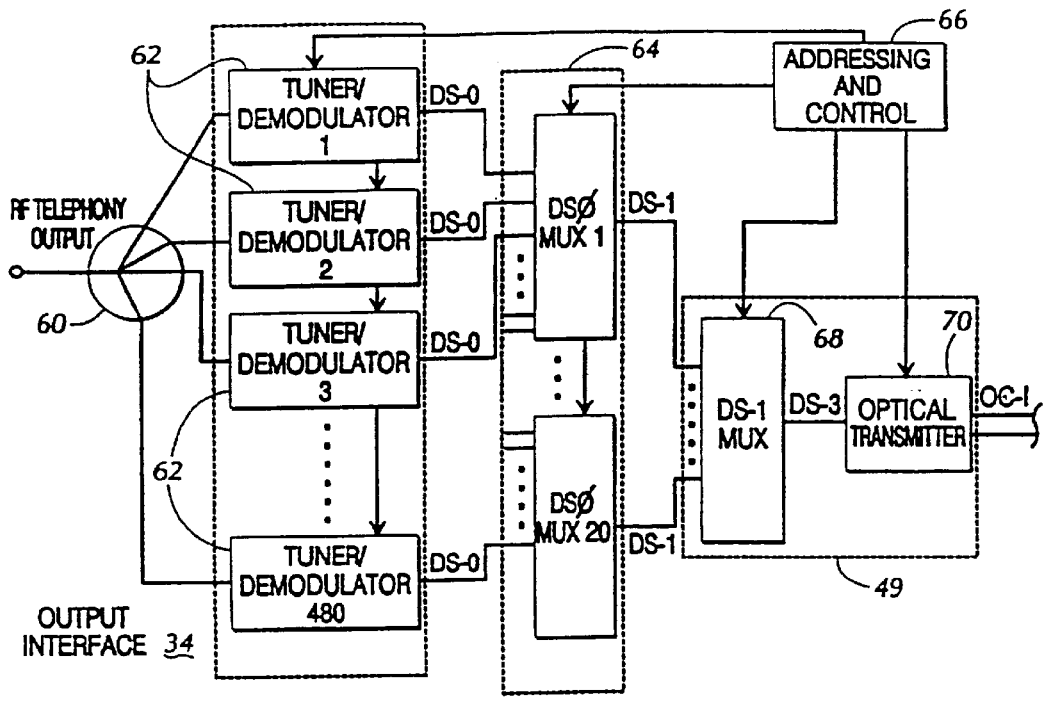
FIG. 5 is a detailed block diagram of the telephony network to the CATV network output interface of the system illustrated in FIG. 2.

The alternative HIU 301 shown in FIG. 7 is a presently preferred embodiment involving the use of digital line cards 303a, 303b, . . . 303n that provide digital signals to a digital bus or backplane 305, operating together with a central processing unit (CPU) 308 corresponding to the address and control unit 42 as shown in FIGS. 4 and 5.

The HIU 301 comprises a plurality of DS1 line cards 303a, 303b, . . . 303n, where n is 17 in the disclosed embodiment, for connection to the telephony network 10 or to a higher level multiplexer/demultiplexer capable of handling higher level multiplexing such as DS2 or DS3. It will be recalled that each DS1 corresponds to a T1 line, each T1 line comprises 24 DS0 standard telephony channels. For provision of 388 DS0's, therefore, slightly more than 16 DS1's must be accommodated. With 17 DS1 line cards 303, a number of lines are provided as spares.

Each DS1 line card 303 provides interfaces compatible with ANSI Doc. T1.403 (1989 version), which is incorporated herein by reference and made a part hereof. Each line card 303 provides a digital output signal that is coupled to the digital backplane 305. The backplane operates to connect all of the line cards 303 and route signals between the line cards and the forward and reverse path modulators, to be described. The backplane 305 preferably comprises up to five 8-bit serial digital busses each clocked at 8.192 MHz. Each bus thus provides an 8.192 Megabit per second (Mb/s) digital pathway that is operative to receive digital signals from each of the line cards in a time division multiple access (TDMA) format. It will be appreciated that five 8.192 Mb/s digital busses in parallel are sufficient to handle the 388 separate 64 kbps signals.

The backplane 305 further includes a CPU bus coupled between a CPU 308 utilized as a database controller and each of the line cards 303 The CPU 308 is operative to control the assigned relationships between particular telephony lines, ingoing and outgoing, with predetermined carrier assignments in the reverse path and in the forward path, monitor the noise level in the reverse path, and assign DS0 channels in the reverse path commensurate with subscriber features and the like. Further, the CPU 308 is operative to carry out steps of monitoring noise in the reverse pathway channels, dynamically allocating bandwidth, and to maintaining in memory a service level table that indicates the correspondence between reverse channel carrier frequencies, subscriber identification, service level, telco DS0 identification, signaling status, error count for noise monitoring, and the like.

The preferred CPU 308 is a Motorola 68360 32-bit microprocessor with built-in memory (DRAM) controller and is operatively connected to 2 MB of random access memory (RAM). Details of the preferred CPU are available in the literature supplied by the manufacturer. This processor 308 is also referred to herein as the "master control processor" or "MCP".

Still referring to FIG. 7, the backplane 305 further includes a signaling channel bus connected between the CPU 308 and each of a plurality of forward channel modulators 320 and reverse channel demodulators 330. The signaling channel bus communicates status information associated with a telephony line such as off hook, on hook, busy, ring, security status, and the like. Bits associated with particular status states of the subscriber's telephone and of the associated telco line are included and combined with digitized telephony signals and transmitted to the CIU's 82.

In the disclosed embodiment, the HIU 301 comprises a plurality of forward channel modulators 320a . . . 320n and a plurality of reverse channel demodulators 330a . . . 330m The forward modulators 320 couple outgoing telephony signals to the broadband network in the forward spectrum, while the reverse channel demodulators receive telephony signals from CIU's in the reverse spectrum via the broadband network. Each of the forward channel modulators 320 is connected to a combiner 322 that is operative to combine the RF signals from the forward channel modulator and provide an output to a diplex filter 325. The diplex filter 325 is preferably a bandpass filter that passes signals outward within the 15.840 MHz frequency forward spectrum provided in the alternative embodiment whose spectral allocation is shown in FIG. 3C. The output of the bandpass filter, whose frequency is centered at an appropriate location along the spectrum allocated for forward or downstream telephony signals, is then coupled to a multiway splitter 340 that is coupled to the broadband communication network.

It will be appreciated that the broadband communication network (not shown) connected to the multiway splitter can either be a coaxial cable network, or alternatively can be an additional fiber optic link that is amplitude modulated to carry the broadband signal in a manner known to those skilled in the art.

Still referring to FIG. 7, the HIU 301 further comprises a plurality of reverse channel demodulators 330a . . . 330m that are connected to receive signals from the multiway splitter 340. The reverse channel demodulators 330 are similarly constructed, as described in connection with FIG. 8. A separate reverse channel demodulator constructed as described herein is provided for each group of 24 DS0 telephony signals.

The multiway splitter 340 preferably includes at least one lowpass filter segment that isolates the signals in the 5–30 MHz range (or 5–65 MHz, as desired) designated in the alternative embodiment for reverse path telephony signals.

It will be recalled from the discussion above that the CPU 308 in the HIU stores a service level table or data array for associating frequency assignments with particular subscribers and other information required for system maintenance. The service level table or data array comprises an array of data fields, suitable for storage in a database maintained by the HIU's CPU 308. Preferably, this table is maintained in RAM for rapid access. Furthermore, it is preferred that the table be indexed utilizing conventional database indexing methods so that the table may be rapidly search by subscriber name, subscriber address, telco DS0 number, upstream carrier frequency, etc. Use of indexed methodologies ensures rapid lookup of service level and minimized response time when a subscriber requests service.

From the foregoing, it will be understood and appreciated that the frequency agile CIU is operative for modulating telephony and other signals from a subscriber in a plurality of frequency subbands in the upstream band of a broadband subscription network so as to provide selectably variable bandwidth in the upstream band commensurate with a selected subscriber communication feature such as single voice line, multiple voice lines, ISDN, security monitoring services, and the like. In the preferred embodiment, the bandwidth is selectably allocated in discrete unit of DS0's, which will be understood can be combined to provide for higher capacity digital data channels in response to varying needs of subscribers.

Reverse Path Demodulator

Figure 8:
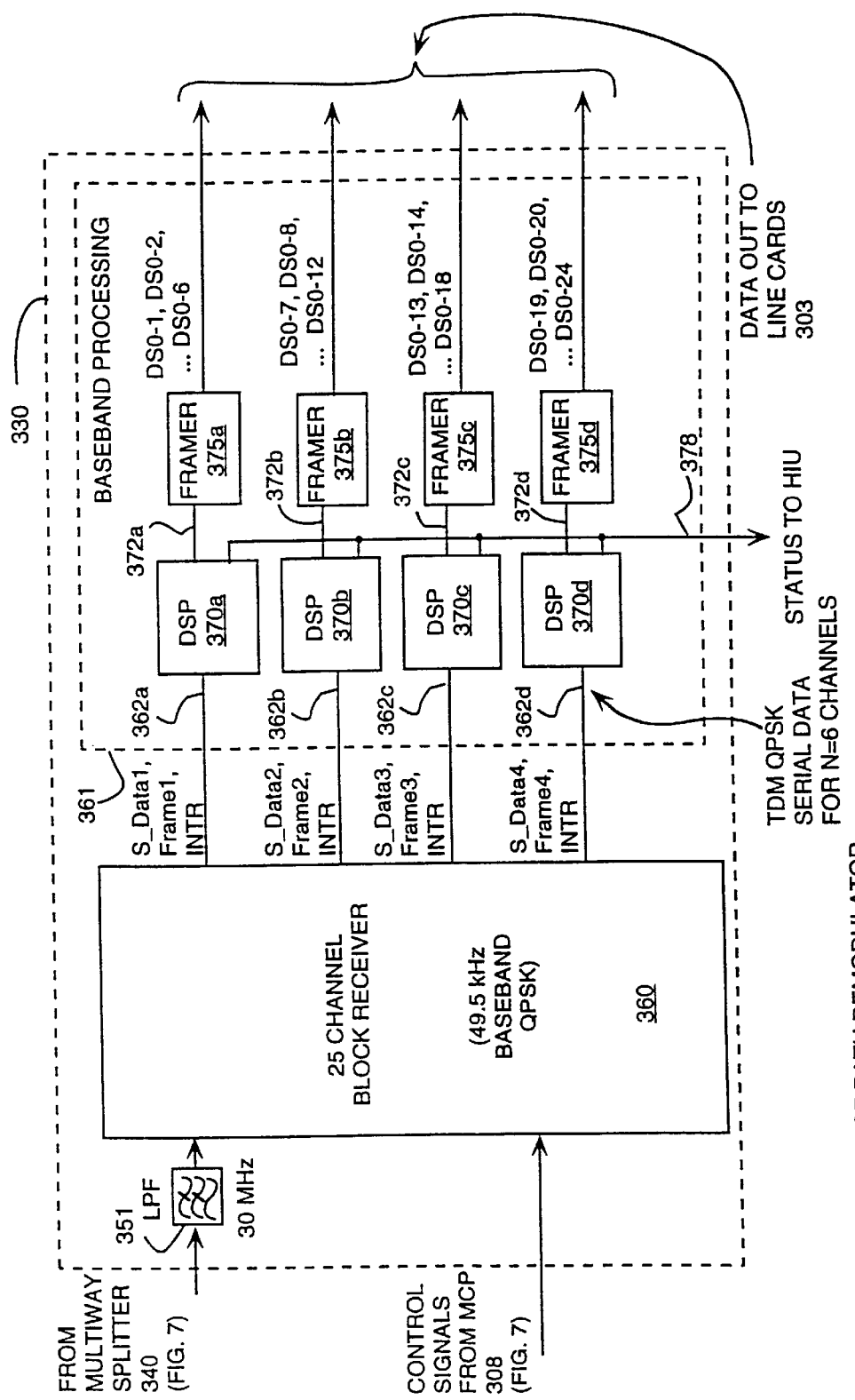
FIG. 8 is a block schematic diagram of the reverse path demodulator circuit including a block receiver and baseband processing stage employed in the HIU illustrated in FIG. 7.

Turning next to FIG. 8, a reverse path demodulator 330 (REV DEMOD) is operative to receive the filtered broadband signal from the multiway splitter 340 (FIG. 7), which can occur any where in the 5–30 MHz (or 5–65 MHz) band, downconvert the center of a 1.584 MHz band comprised of 24 useful DS0 channels to DC, channelize the composite signal into 24 useful DS0 channels each having a 49.5 kHz bandwidth by weighting and FFT methods, time multiplex a group of six channels into serial form for transmission to a digital signal processor's serial port for QPSK demodulation, derive demodulated DS0 telephony signals, provide time division multiplexed DS0 telephony signals to a framer for proper telephony signal formatting, and output the selected DS0 signals to the line cards 303 (FIG. 7).

The broadband signal from the multiway splitter 340 is first provided to a low pass filter 351, which removes signal components in excess of the 30 MHz band (or 65 MHz). The output of the low pass filter 351 is then provided to a 25 channel block receiver 360, which processes a "block" of spectrum (or a block of channels in the upstream path) as shown in FIG. 3D, 3E, and 3F, and "channelizes" each of the 25 channels to a digital QPSK modulated signal, time division multiplexed. The output of the channelizer 360 comprises baseband DS0 channels for demodulating by a baseband processing stage 361.

The block receiver 360 separates each of the 24 digitized DS0 signals within the 1.584 MHz subband into a separate baseband channel, CH1, CH2, . . . CH24. The block receiver provides a serialized time division multiplexed signals S_Data1, Frame1, S_Data2, Frame2, S_Data3, Frame3, S_Data4, Frame4 on one of lines 362 that are provided as the output of the block receiver to the digital signal processors (DSPs) of the baseband processing stage 361 constructed in accordance with the present invention.

FIG. 3, especially FIGS. 3D, 3E, 3F, and 3G, illustrates the operation of the block receiver 360 and baseband processing stage 361 in forming the baseband DS0 signals. Groups of 24 upstream signals will typically originate in a particular given location in the broadband network, e.g. a given neighborhood, for which it is convenient to handle them all as a unit. In other words, a contiguous block of spectrum with 24 DS0s provide a convenient grouping for a DS1 signal or a T1 line for further handling by central office equipment. Nonetheless, within a contiguous block of 1.2375 MHz for (25 channels), any particular DS0 may be associated with any particular position in T1 or DS1 arrangement.

It will be understood that a block of 24 DS0 signals can appear anywhere within the 5–30 MHz (or 5–65 MHz) reverse band. Typically, however, there is a logical grouping of signals in a contiguous region of the spectrum.

For example, and referring to FIG. 3G, a signal within a selected 1.584 MHz group band identified as DSO-1 may be modulated on a carrier at 5.0985 MHz, while DSO-2 may be modulated on a carrier at 5.1975 MHz, while DSO-3 may be modulated on a carrier at 5.049 MHz. The block receiver 360 and baseband processing stage 361 are operative to downconvert any given block or group of 24 channels to baseband and group six channels together for transmission to a DSP for further processing. As shown in the middle part of FIG. 3G, DS0-1 may be associated with any give channel, e.g. CH3, DSO-2 with CH6, etc., and the samples of the signals in the channels serialized and time division multiplexed for further processing.

Accordingly, it will be understood that the block receiver 360 is operative to multiplex six of the QPSK-modulated 49.5 kHz baseband signals to a single DSP. The output of the channelizer 360 is alternate samples of each of the six 49.5 kHz baseband signals successively in a time division multiple access (TDMA) fashion on each of lines 362a–362d (FIG. 8). Each serial data line 362 therefore provides sample TDMA digital data for demodulation of the QPSK signals at baseband.

Referring still to FIG. 8, each of the serial data lines 362, four total, is provided to a separate digital signal processing (DSP) circuit 370 within the baseband processing stage 361; therefore, four separate DSPs 370a–370d are provided to handle 24 channels. The operation of the DSPs 370 is described in greater detail below. The output of the DSPs 370 is a TDM serial stream of data provided on line 372a–372d to framer circuits 375a–375d, respectively.

Each framer circuit 375 is operative to separate the TDMA demodulated DS0 telephony data, combine it with appropriate formatting bits, check bits, etc. required for the standard DS0 telephony format, and provide serial digital signal to a connected line card 303 (FIG. 7), where the signals are coupled to the telephony network, or to such other telephony equipment as is required for further digital multiplexing and/or combination into other digital telephony formats such as DS1, DS2, etc. Thus, each framer 375 provides collects six separate DS0 signals, for example, the framer 375a collects the signals DS0-1, DS0-2, . . . DS0-6 and frames the data up for communication via the HIU bus 305 (FIG. 7) to a line card. Each framer handles six DS0s, so four framer circuits 375a–375d are provided in the demodulator 330 to handle 24 total DS0s.

The preferred DSPs 370 are ADSP2171, manufactured by Analog Devices, Inc., Norwood, Massachusetts. Details of the preferred DSP chips are found in the literature supplied by the manufacturer. Each DSP 370 also provides a 16-bit host interface port shown on line 378 which is used to communicate signals to the database controller 308 associated with the HIU. The two asynchronous serial ports (SPORT0 and SPORT1) provided in the preferred DSPs are used to receive input data from the block receiver 360 and output data to the framer 375, respectively. In addition, an external interrupt INTR from the block receiver is provided to the IRQ2 input of the ADSP2171 to provide synchronization to the channelizer input.

The block receiver 360 is preferably constructed with a field programmable gate arrays (FPGA) to provide a migration path to custom application specific integrated circuitry (ASIC), and provides 16-bit input data to the DSP 370 to serial port SPORT0. The serial data clock and transmit frame synchronization signals are configured for external sourcing from the channelizer. The frame synchronization signals for SPORT0 are preferably configured for active high signals and alternate framing mode. In addition, the serial port SPORT0 is preferably configured to automatically buffer sixteen values from the serial port in a data memory circular buffer.

The DSPs 370 output data to the framers 375 in a 24 word time-division multiplexed serial bitstream. The output serial port SPORT1 is configured for multichannel operation on all DSPs. A 2.592 MHz clock for the multichannel serial bitstream from the DSP is preferably generated externally by the channelizer FPGA 360. A Receive Frame Synchronization (RFS) signal is generated by the first DSP 370a, and the remaining DSPs 370b, 370c, and 370d are initialized for external sourcing of the RFS signal from the first DSP 370a. The RFS signal is configured to be active high and for a multichannel frame delay of zero. Each DSP is configured to source data for six of the 24 channels, and provide 3-bit output data consisting of 2 data bits and one status bit.

Still referring to FIG. 8, the host interface port 378 of each DSP 370 is used to boot the DSP and to send channel status information to the HIU database controller 308 (FIG. 7). To receive channel status information, the database controller 308 writes a request into a data register HDR0 within the DSP and waits for a response from the DSP. The DSP firmware responds to a request at most once per 36 kHz cycle. The response will consist of channel status information written to DSP data registers HDR0 through HDR5.

At least three sources of interrupts are used on the DSPs 370: SPORT0 Receive Buffer Full, SPORT1 Transmit Buffer Empty, and IRQ2. As mentioned, the IRQ2 interrupt is used to synchronize the input data with the channelizer.

Details of Block Receiver

A cable telephony system with which the preferred block receiver 360 will function utilizes a single channel per carrier frequency division multiple access scheme to coordinate the spatially diverse transmitters. The basic data rate on each of the channels is 72 Kbit which will allow a single DS0 with 8 Kbit of overhead. The symbol rate using QPSK will be 36 Ksym/sec, and with an alternative modulation scheme of 16-QAM it will be 18 Ksym/sec. All RF carriers preferably lie on a frequency grid with incremental spacing of 1.375 times the symbol rate. This translates to 49.5 kHz for QPSK and 24.75 kHz for 16-QAM.

Carrier frequencies are preferably chosen such that many channels will be located in a contiguous frequency space allowing block processing in the receiver. As described, a single block receiver 360 will digitize and process a 1.584 MHz wide spectrum. This is wide enough to accommodate 24 usable channels at QPSK and 48 channels at 16-QAM.

Those skilled in the art will understand that all of the various elements in the communications link between reverse path transmitter in a CIU and a reverse receiver add noise, errors, and distortions. These non-ideal characteristics must be small enough such that when all combined they do not impact the performance of the channel significantly. The error sources are assumed to be Gaussian in their distributions both amplitude and frequency. Distortions or intermodulation products show a high correlation with the data and also concentrate their energy in narrow bands. Since the distributions of distortions are so different from that of other error terms, they cannot be combined into a summation of error terms but must be accounted for separately.

In the preferred receiver 370, after digitization of a block of channels, the processing is completely digital. The error terms which occur during the processing are caused by finite precision arithmetic and truncation and rounding of the numbers which represent both the data and coefficients along the data path. The individual error terms are modeled in the disclosed embodiment as having a Gaussian distribution in amplitude and generating no significant intermodulation products. As such, these error terms can be combined into an equivalent Gaussian distribution whose variance is equal to the sum total variance of all of the error sources which had the same shape distribution.

As described, the upstream traffic utilizes frequency division multiple access to allow each of the CIU's to transmit onto a common cable. Since the minimum traffic is a single DS0 from a given CIU, the individual carriers are modulated with a bit rate to accommodate 64 Kbit plus overhead (72 Kbit total). If higher data rates are desired to be transmitted from a single CIU, it will use multiple carriers all with a bit rate of 72 Kbit. These carriers will be placed on a frequency grid with incremental spacing of 49.5 kHz for QPSK and 24.75 kHz for 16 QAM. Loop frequency control which includes both the HIU and the CIU allows for excellent coordination in the frequency domain between the carriers generated by the many CIU's. This fact allows a single channel to occupy the entire frequency grid spacing for a single channel without the threat of interfering with adjacent channels (no guard band is believed necessary in the preferred embodiment).

Figure 9:
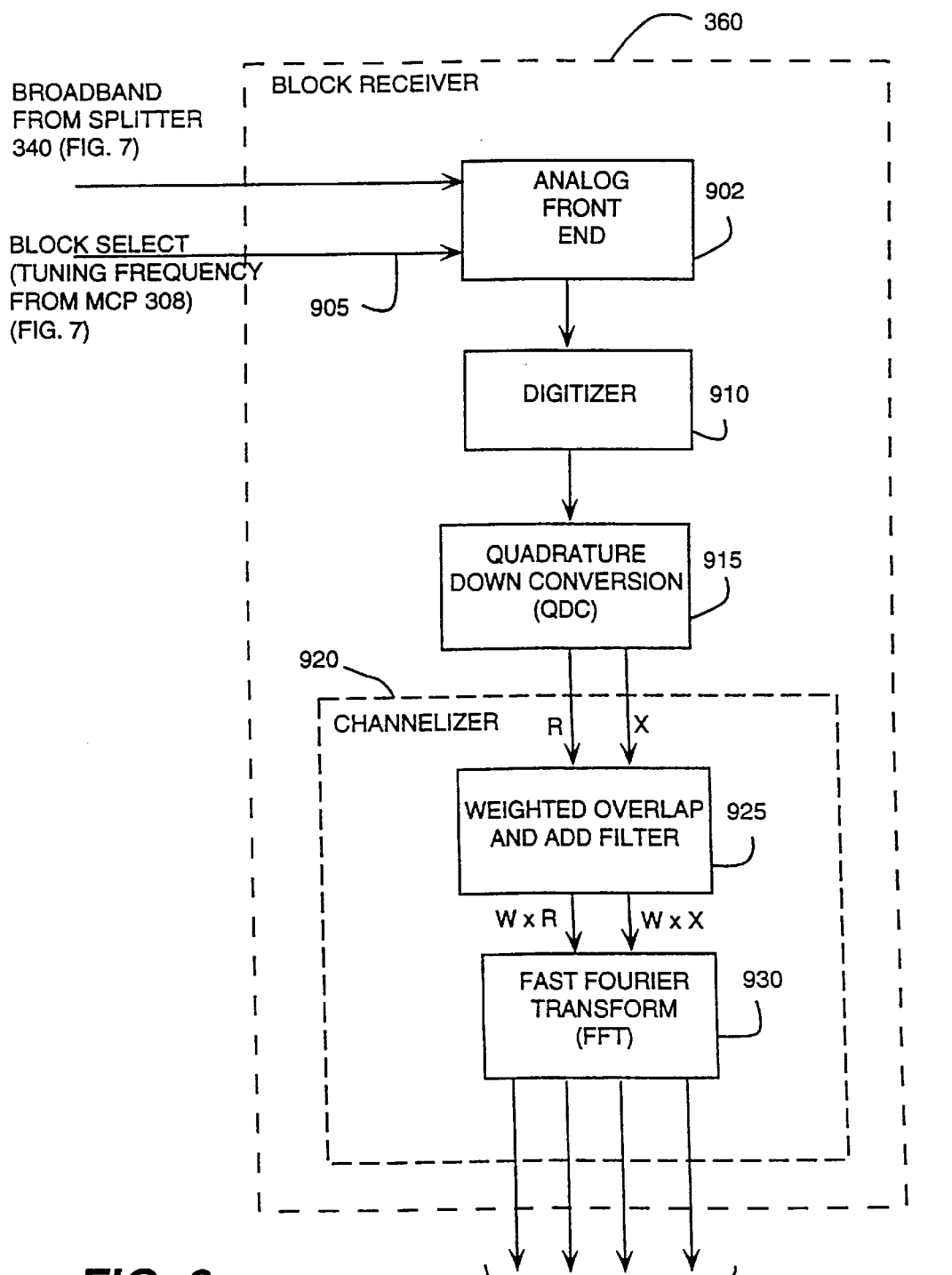
FIG. 9 is a block schematic diagram of the preferred block receiver.

FIG. 9 illustrates the components of the preferred block receiver 360 constructed in accordance with the preferred embodiment of the present invention. The overall structure is designed to maximize the efficiencies gained by processing many signals as a group. An analog front end 902 performs of the analog signal processing tasks of amplification, filtering, and initial down-conversion. The analog front end 902 is connected to the broadband cable from the splitter 340 (FIG. 7), and receives a tuning frequency on line 905 from the master control processor 308 (FIG. 7) as one of the signals on the backplane 305.

The output of the analog front end 902 has a spectrum corresponding to that shown in FIG. 3D, prior to digitization. The digitizer samples the analog signal at 6.336 megasamples/sec, and provides digital signals at this rate to a quadrature down conversion (QDC) stage 915. The QDC stage 915 shifts the spectrum to a 1.584 MHz band centered at DC, as shown in FIG. 3F. As will be known to those skilled in the art, the effect of the quadrature down conversion process are digital, real and imaginary values R, X. The R and X values are provided from the QDC 915 to a channelizer 920, which comprises a weighted overlap and stage 925 and a fast Fourier transform (FFT) stage 930. The output of the FFT stage 930 are the signals designated S_Data, Frame to the baseband processing stage 361.

All processing up to and including the channelizer 920 handles the composite signal comprised of many channels, 25 in the disclosed embodiment. Accordingly, it will be understood that adjustments typically made in a front end processing stage such as carrier phase recovery, symbol timing correction, and demodulation are carried out in the baseband processing stage 361. In this way, the tuner employed in the analog front end 902 is simplified to operate open loop on its down conversion. Likewise, the digitization carried out by the digitizer 910 is also open loop.

The output of the QDC stage 915 is a spectrum centered at DC representing the numerous individual channels. Isolation between the channels at the negative frequency at another channel as achieved by cancellation of terms involved with the quadrature down conversion. The degree of cancellation is affected by the amplitude and phase balance. In the disclosed embodiment, the quadrature down conversion is performed digitally because of the requirement for tight constraints on amplitude and phase balance of the two arms of the quadrature operation.

The channelizer 920 takes the composite signal, in real and imaginary values R, X, and forms the individual signals containing a single channel each, in TDMA fashion.

As will be known to those skilled in the art, FDMA systems are known in the art. However, the conventional method for converting a signal modulated on a carrier at a point on a spectrum involves a tuner and lowpass filter per channel. Whether analog or digital, this conventional approach is expensive and bulky. One key to reducing the processing task is to utilize regularly spaced carrier frequencies and low pass filters with identical characteristics. The regularly spaced carrier frequencies in the preferred scheme are ensured by employment of a clock signal originating at the HIU which is provided downstream to each CIU; the CIU uses this "master" clock to derive the carriers for the upstream channels.

In the preferred embodiment, the low pass filter stage can be converted into a single weighting function followed by an FFT. Although a basic transformation for implementing a digital filter with a weighting function is known in the art, see, e.g. Crochiere and Rabiner, MULTIRATE DIGITAL SIGNAL PROCESSING, Sec. 7.2.5, "Weighted Overlap-Add Structures for Efficient Realization of DFT Filter Banks", (Prentice Hall 1983), the employment of such a technique to implement a block receiver in a broadband communication system is believed novel.

The channelization processing is reduced in two ways via the weighted overlap and add transform approach. First, the low-pass filter is applied on all channels simultaneously by one block process instead of individually in many parallel processes. Second, the heterodyne operation is much more efficiently accomplished by an FFT instead of "N" individual mixers and oscillators.

The sampling rate and number of channels processed by the channelizer 920 is largely driven by the fact that FFT's are most efficient when the number of inputs and outputs are a power of 2. In addition, 1–2 MHz of spectrum is a good compromise between efficiency of processing and versatility in usage of the reverse spectrum. Larger spectral processing blocks would prevent utilization of smaller blocks sandwiched between large ingress tones. Keeping these constraints in mind, an FFT size of 32 points was chosen where each of the outputs represents a single 72 Kbit channel. For QPSK the channel bandwidth is 49.5 kHz so the total processing bandwidth is 32×49.5 kHz=1.584 MHz. A guard band is provided on either side of the usable channels such that the center 25 channels will be passed off to the baseband processing stage and the remaining 7 ignored. The bandwidth and number of processed channels defines a filter which must precede the decimation to the final sample rate of 1.584 megasamples/sec. This filter must meet a mask as shown in FIG. 3D. This mask allows limited aliasing of energy at the band edges (outside of the 1.2375 MHz pass-band).

The preferred transform-based channelizer 920 processes information in blocks instead of in a convolutional mode as a conventional discrete channelizer does. A single block process of weighting, folding, and transforming produces a single data point for each of the output channels. These block processes must be repeated at a rate high enough to support the spectra of the individual channels. Since the QPSK channels extend +/−24.75 kHz from their centers, the sample rate must be at least 49.5 Ksamples. The baseband processing stage 361 that follows is most easily performed if the sample rate is set to some multiple of the symbol rate (36 Ksymbol). The lowest frequency which satisfies the two criterion is twice the symbol rate or 72 Ksamples/sec.

Once the channelizer 920 has broken up the composite signal into individual 72 Kbit signals sampled at twice the symbol rate, it hands the signals off to the baseband processor 361. This processor converts the baseband QPSK (or 16 QAM, as may be implemented) modulated waveform into recovered bits.

Figure 10:
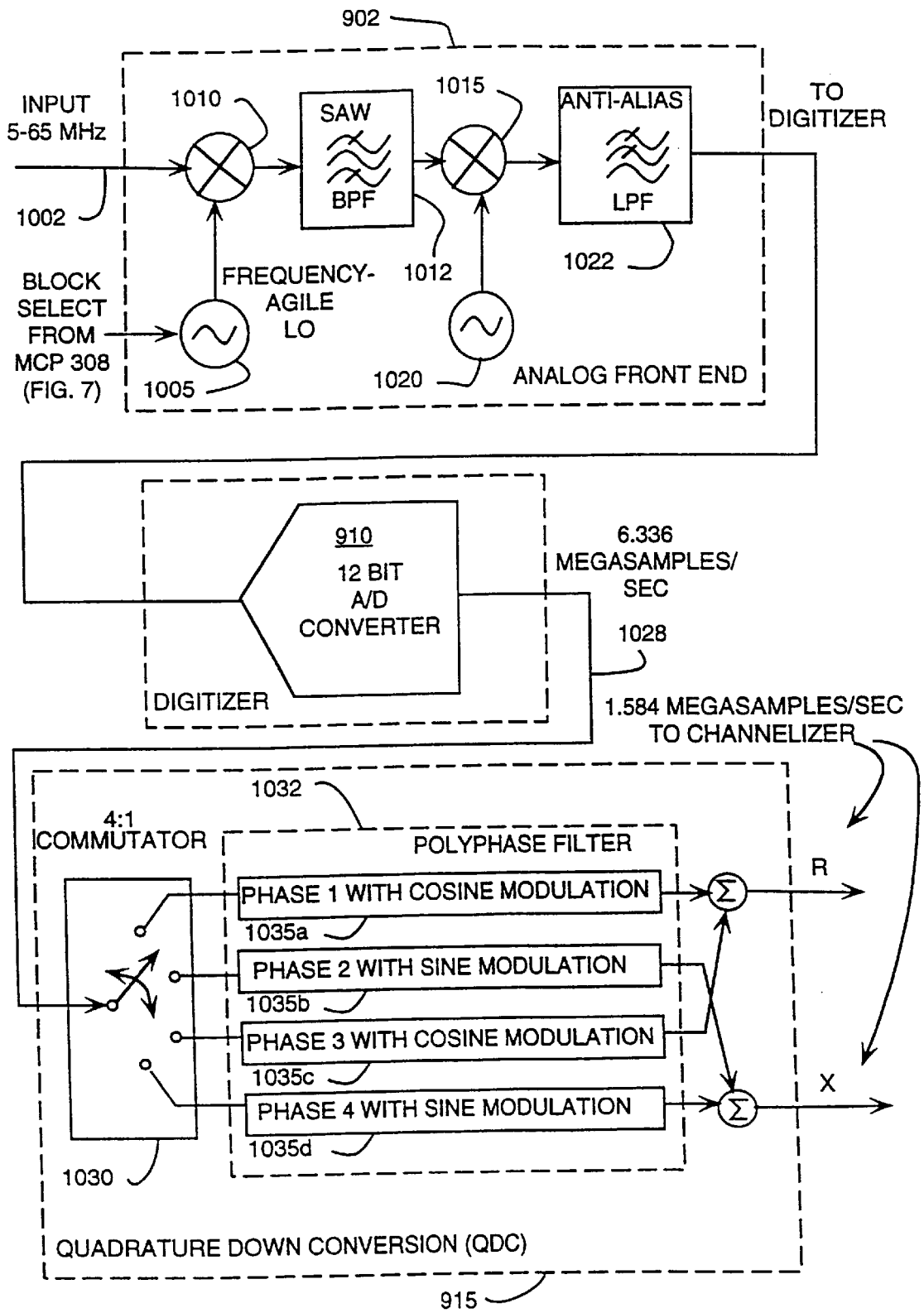
FIG. 10 is a block schematic diagram of the analog front end, the digitizer, and the quadrature down conversion stages in the preferred block receiver of FIG. 9.

Referring now to FIG. 10, next will be described the analog front end or tuner 902, the digitizer 910, and the quadrature down conversion (QDC) stage 915 of the preferred block receiver 360. The analog front end 902 is the interface between the reverse cable plant and the block receiver, and is basically a frequency agile tuner. It is tasked with down-conversion, amplification, and filtering. Following the tuner 902 is the digitizer 910 which has requirements on amplitude and frequency content.

The input signal on line 1002 comes from the reverse cable plant where all of the signals are contained within the 5–65 MHz band and will be a composite of data and video carriers of various modulation formats and power spectral densities. The tuner 902 will need to pick out a 1.2375 MHz portion of the spectrum and down-convert it to an acceptable center frequency for the digitizer 910. The acceptable center frequencies are related to the sampling frequency of the A/D converter. The center frequency prior to down conversion is:

$$f_{center} = n \times 49.5 \text{ kHz, for } 102 \leq n \leq 1313$$

It will be understood that in the disclosed embodiment, the selected portion of the spectrum can be located anywhere within the 5–65 MHz reverse band.

The center frequency is denominated Block Select in FIG. 10. The center frequency of the block of signals prior to down conversion is controlled by the master control processor 308 (FIG. 7) in steps of 49.5 kHz through the limits of the reverse band (5–65 MHz).

Thus, the analog front-end 902 comprises a frequency agile local oscillator (LO) 1005 that receives the Block Select center frequency signal, and provides an appropriate frequency to a mixer 1010 which upconverts the input signal on line 1002 to an intermediate frequency. The output of the mixer 1010 is provided to a bandpass filter 1012 which selects out the portion of the harmonic containing the desired signal in the known manner, and a mixer 1015 that beats the signal from an IF oscillator 1020 for downconversion. The output of the mixer 1015 is provided to an anti-alias low pass filter 1022 to provide the result of signal centered at 1.584 MHz. The preferred antialiasing filter 1022 has a passband of 1.2375 MHz, with a 0.5 dB ripple. The filter provides a stop band at 965.25 kHz from the center and provides at least 50 dB suppression.

The output of the analog front end 902 is provided to the digitizer 910, which is a 12 bit A/D converter in the preferred embodiment. The signal presented to the A/D converter 910 preferably has sufficient amplitude to utilize all of its dynamic range in order to minimize quantization noise. Full scale is 1 volt peak or 2 volts peak to peak. Fine amplitude adjustments may be provided within the digital signal processing stages.

The pass-band preferably needs to be enough to cover 25 channels of the QPSK 36 ksym traffic (25×49.5 kHz) which turns out to be 1.2375 MHz. Within the passband the amplitude ripple is preferably kept below 0.5 dB peak to peak within a single channel. The stopband for the A/D input spectrum starts at 965.25 kHz off from center and is defined by the aliasing caused by a digitization rate of 6.336 Msample. Leakage in the stopband should be less than 50 dB below the intended signal in the pass-band.

Still referring to FIG. 10, and as has been described, the preferred QDC stage 915 is completely digital. If the analog to digital conversion stage 910 were positioned after the quadrature down conversion, then two separate A/D converters would be necessary, one for the in-phase and one for the quadrature channel. By providing quadrature down conversion digitally, fewer components are required.

The preferred A/D converter 910 is a 12 bit converter that can provide sample rates below 10 Msample/sec. for example, the model AD9220 manufactured by Analog Devices, Inc. The preferred converter allow digitizing without saturation of an ingress voltage spike approximately 250 times larger in amplitude than the largest symbol value (48 dB).

Sampling will occur at a sampling rate of $f_{sample}$=6.336 Msample/sec, the clock for which is supplied by the channelizer. The resulting samples are then made available to the quadrature down-converter on line 1028.

Still referring to FIG. 10, digital techniques for quadrature down-conversion are preferably utilized in the QDC stage 915 to achieve good balance between quadrature arms in the down-conversion stage. The balance necessary to attain contributions from this error source (e.g. balance) below the 40 dB level are beyond what is achievable with analog quadrature down-converters. As shown in FIG. 10, the QDC stage comprises a 4:1 commutator 1030 and a polyphase filter 1032. The incoming signal on line 1028 from the digitizer 910 arrives at 6.336 megasamples (Ms) per second, real data only. This data passes through the commutator 1030 which sends it along to one of four phases 1035*a*, 1035*b*, 1035*c*, 1035*d* of the polyphase filter 1032. In this manner, the sample rate going into each of the filter phases is 6.336 Ms/4=1.584 Ms.

Each of the preferred filters 1035 in the polyphase filter 1032 is a convolutional filter and provides an output rate at 1.584 Ms. The filter phases are derived from a prototype low pass filter which is then quadrature modulated by cos ($\pi/2 \cdot n$)+j sin ($\pi/2 \cdot n$), where n is the tap number. The modulating waveform therefore cycles between the four states: 1+j0, 0+j1, −1+j0, and 0−j1. These four successive states, when multiplied by purely real filter coefficients, results in either purely real or purely imaginary coefficients. The coefficients resulting from multiplication by 1+j0 are designated Phase 1, while those resulting from 0+j1 are designated Phase 2, etc. Summing the cosine modulated phase results 1035*a*, 1035*c* together gives the real output R that is passed along to the weighting function. Summing the sine modulated phase results 1035*b*, 1035*d* together gives the imaginary output X that is passed along to the weighting function. The output results from the quadrature down-converter section 915, a real value R and an imaginary value X, are made available to the channelizer 920 at a sample rate of 1.584 Ms for both real and imaginary values.

Referring back momentarily to FIG. 9, the channelizer 920 is responsible for taking in a signal which is a composite of many channels, frequency division multiplexed, and converting this to one per channel signals. The two functions which predominate in the channelizer are a weighted overlap and add filter 925 and an FFT 930. These two functions can be implemented in different manners utilizing either programmable DSP's or a field programmable gate array (FPGA). In the preferred embodiment, an SRAM type FPGA was utilized, with RAM available on chip, so as to provide acceptable performance and provide a migration path to ASIC.

The weighting function, as will be detailed later, performs 320 complex weights at a rate of 72 kHz. This equates to 46.08 million multiplies/accumulates per second. Addressing, memory access, and looping overhead result in computational performance on the order of 60 MIP's. The preferred FFT is a 32 point with 80 butterflies which need to be performed at the same 72 kHz. Known FFT algorithms average 8 instructions per butterfly (4 real multiplications and 6 real additions). This requires 8×80×72 kHz=46 MIP's for the FFT section. A programmable DSP capable of 33 MIP's would probably require 4–5 parts once I/O is accounted for, but such an implementation is considered structurally equivalent.

Preferably, these two functions are accommodated in two FPGAs with 1024 configurable logic blocks, such as a Xilinx type XC4025, and a small external RAM (24 wide× 320 deep).

Figure 11:
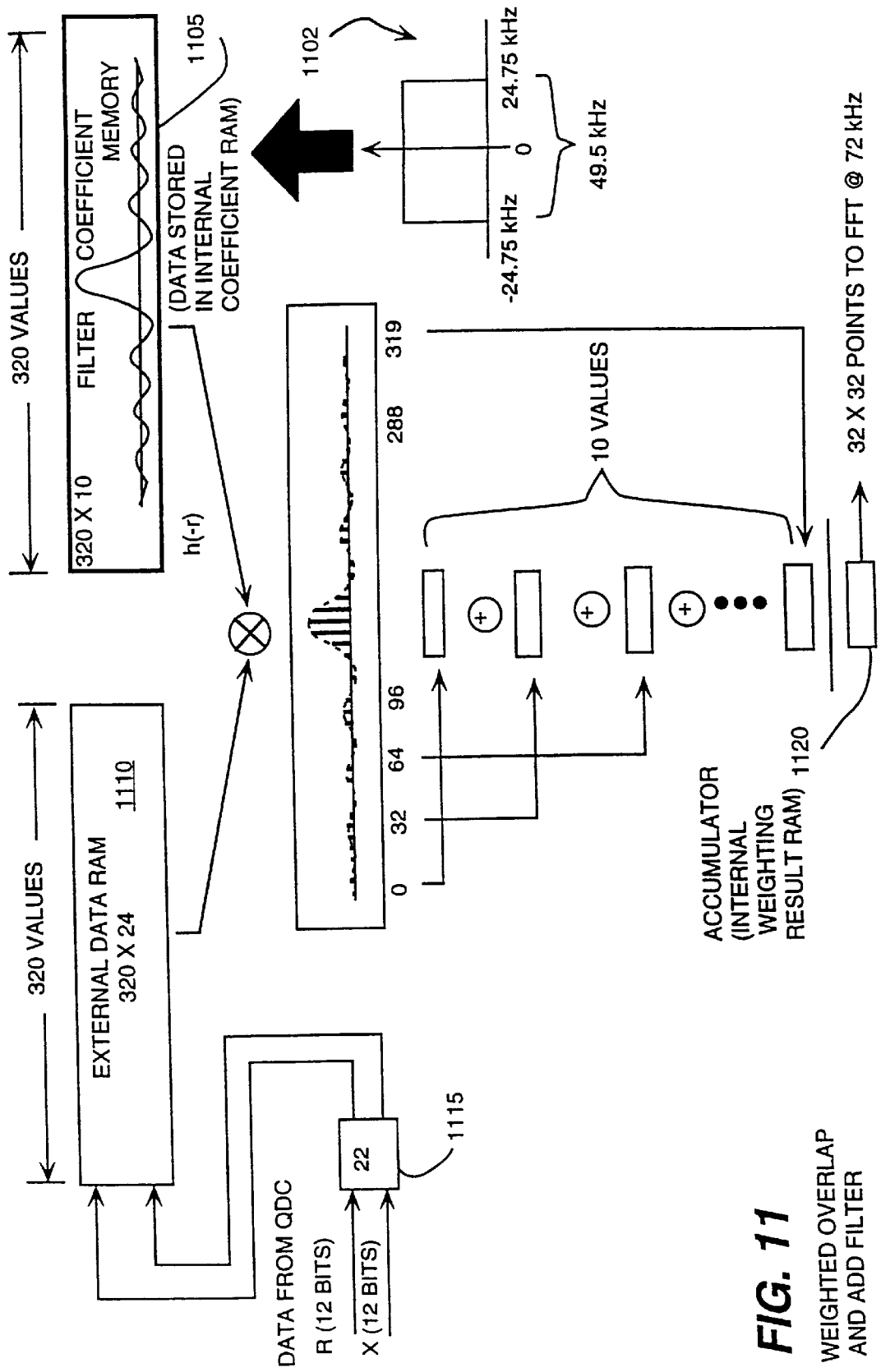
FIG. 11 illustrates the operational principles of the polyphase filter engine utilized to provide a weighted overlap and add filter operation in the channelizer stage of the preferred block receiver of FIG. 9.

FIG. 11 illustrates the concepts underlying the weighted overlap and add function utilized to implement one half of a Nyquist filter in the preferred block receiver, matched to one half Nyquist filter at each CIU. The weighted overlap and add function is carried out in the block 925 of the channelizer 920, as shown in FIG. 9. Basically, the weighted overlap and add implements one-half of a low pass Nyquist filter having a passband of 24.75 kHz (the upper edge of the 49.5 kHz channel as centered at baseband) that is matched to a filter at each transmitter side. The filter is implemented by applying in the time domain the impulse function of the desired filter characteristics, as shown in FIG. 11, to cause the desired filter response in the frequency domain.

Conceptually, the desired frequency response is shown at 1102, and the corresponding impulse response is shown at 1105. The desired time domain response values are stored in a memory and applied in a "sliding window" fashion to the real and imaginary data values R, X. Since the data being supplied represents the entire spectrum being blocked processed, 10 values, representing every 32nd value, are selected from the external data RAM 1110 utilized to store the data from the quadrature down converter and summed to obtained a net filtered value in an accumulator at 1120.

Those skilled in the art will appreciate that an alternative approach to the present invention is to provide the FFT stage to create the separate channels at 49.5 kHz, and then to apply the 1/2 Nyquist matched filter function, but this would require additional computational resources for the baseband processing stage. By providing the filtering function on the entire group of channels in the selected subband prior to the FFT channel separation, the present invention provides for significant efficiencies in computational resource and reduction in system cost. Furthermore, it will be appreciated that the weighted overlap and add function effectively creates a desirable comb filter effect, by providing a matched filter shape that effectively repeats itself at the channel carrier intervals (which, it will be understood, are harmonically related, thereby making this group channel processing possible).

A first process is the computation of the weighted results where 320 data values stored in the external data RAM 1110 are multiplied by 320 coefficient values stored in a coefficient memory 1105. The results of the multiplications are then folded or accumulated with the result going to an internal weighting result RAM 1120. While this first process is occurring, incoming data from the QDC stage is collecting in an internal temporary data storage RAM 1115 (22 values).

During a second process, the contents of the internal data RAM 1115 are transferred to the external data RAM 1110 and written into the locations which had stored the oldest (in time) data. Address pointers for the external RAM are generated modulo 320 such that a circular buffer is formed. This transfer is supervised by a controller which has control of the addressing of both RAM's during this phase. While data is being transferred from internal to external data RAM's, results are being transferred between the weighting result RAM and the FFT RAM. The second transfer is controlled by a memory transfer controller which takes over the addressing of both the weighting result RAM and the FFT RAM.

The weighting process and memory transfer process are repeated at 72 kHz intervals which is indicated by a PROCESS/XFER control signal (to be discussed below).

As described, the time domain of the weighting function is the impulse response of the channel filter implemented. Those skilled in the art will understand that the preferred upstream communication pathway involves use of a matched filter arrangement—with a filter at each CIU transmitter and a counterpart filter with identical characteristics at the block receiver 360 implemented with the weighted overlap and add function. The transmit filter at the CIU cascaded with the block receiver's filter satisfy the Nyquist criterion for zero intersymbol interference. Another requirement for this filter is to suppress adjacent channels enough such that large differences in amplitude (such as large narrowband ingress tones) do not impact reception of the desired channels.

Figure 29:
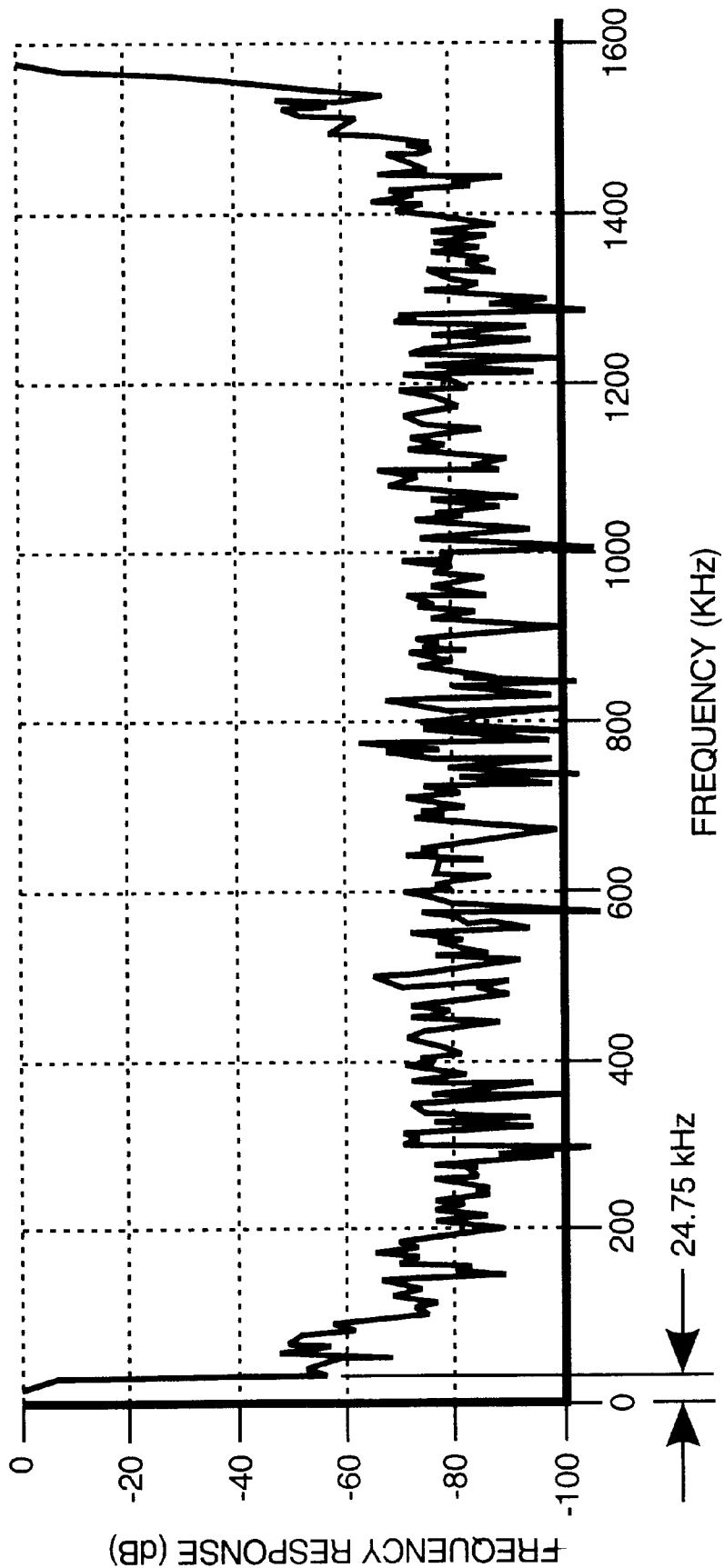
FIG. 29 is a graph showing an exemplary preferred filter frequency response.

The preferred filter possesses good pass-band response in the time domain and good stop band rejection in the frequency domain. An exemplary preferred filter frequency response is shown in FIG. 29, where the noise floor in the stop-band is defined by quantizing to 11 bits. This filter is selecting a single 49.5 kHz wide channel from the spectrum presented to it.

Further details of the implementation of the preferred weighted overlap and add function are provided below.

Figure 12:
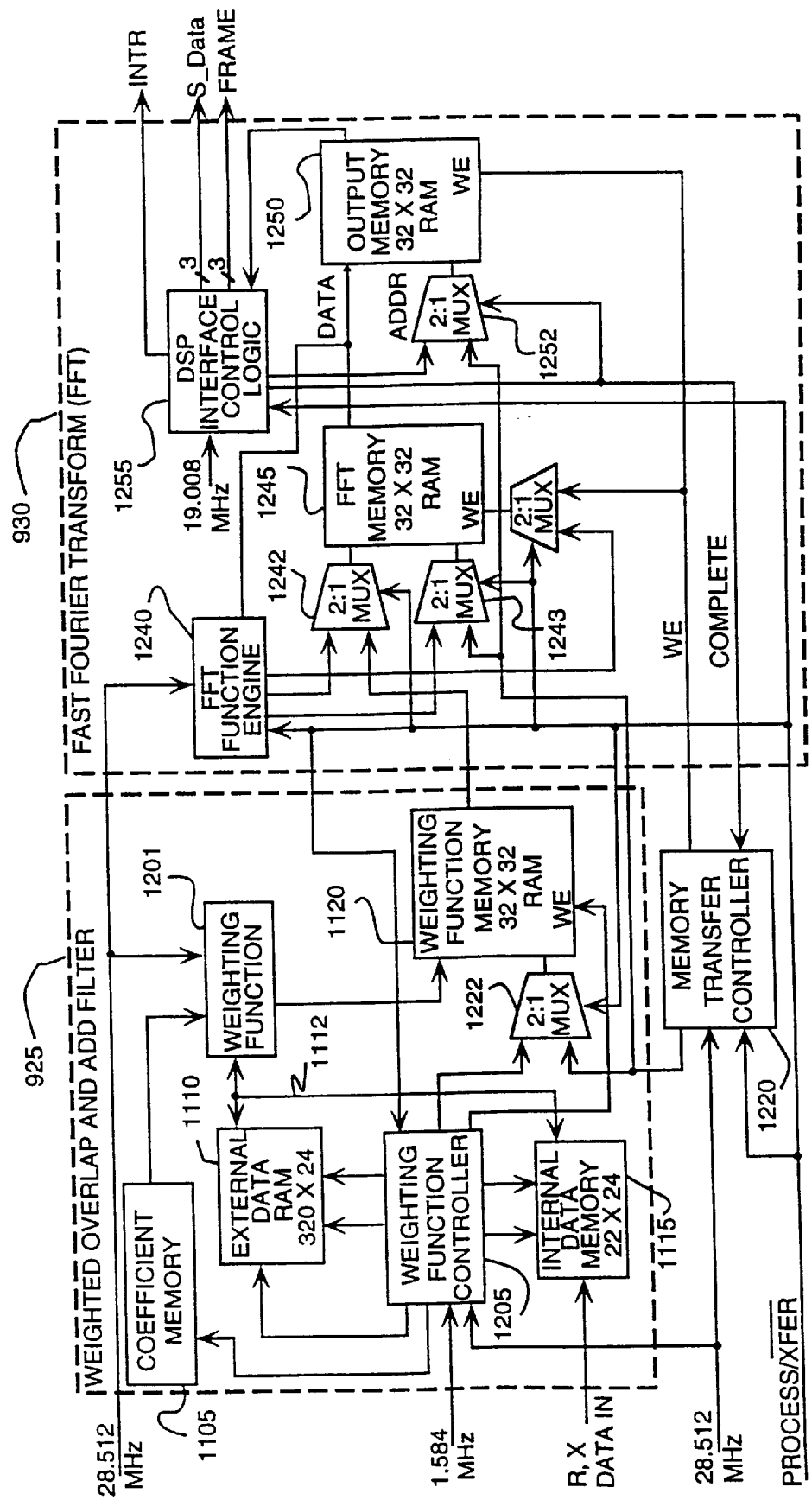
FIG. 12 is a detailed block schematic diagram of the weighted overlap and add filter stage and the fast Fourier transform (FFT) stage in the channelizer of the preferred block receiver of FIG. 9.

FIG. 12 illustrates the circuit components of the preferred weighted overlap and add function 925 and the fast Fourier transform 930 of the channelizer 920, shown generally in FIG. 9. As discussed above, data from the QDC stage 915 is provided as real and imaginary values R, X data to an internal data memory 1115, which stores 22 values of 12× 2 (R and X)=24 bits each. A weighting function controller 1205 is coupled to the internal data memory 1115 and transfers data into an external data RAM 1110 via lines 1112. The weighting function logic is contained within block 1210, which receives the coefficient value from an internal coefficient memory 1105 and the external data RAM 1110.

The weighting function values are accumulated in a weighting function memory 1120. The addresses for this memory are generated by a memory transfer controller 1220 which takes control for transfers to the FFT block 930, and by the weighting function controller 1205 which controls the addresses during the weighting function computation. The memory transfer controller 1220 controls memory addresses during transfers from the weighted overlap and add operation to the FFT operation, and for transfers from the output of the FFT to other circuitry. The address at the weighting function memory 1120 is thus multiplexed by 2:1 multiplexer 1222.

The FFT function 930 comprises a number of logical blocks utilized to implement a 32 by 32 decimation in time fast Fourier transform, which converts each of the QPSK modulated signals in the selected spectral 1.584 MHz band to baseband and provides time division multiple access signals as outputs for the baseband processing stage. The FFT function 930 includes an FFT function block 1240 which is a basic butterfly engine for conducting the multiplies and adds of the FFT. Data for the FFT is provided from the weighting function memory 1120 via a 2:1 multiplexer 1242 into an FFT memory 1245, which stores 32 bits each. The FFT is computed by providing these values to the FFT engine 1240 until the final computation is accumulated in the FFT memory 1245. Upon completion, an entire block of 32 by 32 values is transferred under control of the memory transfer controller 1220 to an output memory 1250.

The output memory 1250 then transfers its block of FFT data to a DSP interface control logic circuit 1255, which provides the output signals designated S_Data, Frame in serialized fashion. A 2:1 multiplexer 1252 employed at the address lines of the output memory 1250 control the transfers of the block of 32 values during transfer from the FFT memory 1245 and then during transfer to the DSP interface control logic 1255.

Accordingly, it will be understood that the memory transfer controller 1220 controls the transfer of memory contents of each major function block to the next stage and signals the function blocks when complete. The function blocks in the channelizer operate on blocks of data at a 72 kHz rate. The PROCESS/XFER signal is a 72 kHz signal controls the mode of the function blocks in the channelizer. When the signal is high, the function blocks process the input data. When the signal is low, the function blocks are idle while the memory transfer controller moves the memory contents from one block to the next. The process is as follows:

1.) The weighting function controller 1205 buffers 22 new data samples in internal data memory 1115. When signaled by the memory transfer controller 1220, the weighting function controller moves the new data samples into the external data RAM 1110.

2.) The weighting function multiplies the 320 data points by internally stored weights, divides the data into 32 sample blocks, and adds the blocks together. The 32 complex-valued outputs are placed in the weighting function memory 1120.

3.) The FFT function engine 1240 does an in-place computation of a 32 value complex FFT. The result is generated in the FFT memory 1245, and transferred to the output memory 1250.

4.) When signaled by the memory transfer controller 1220, the DSP interface logic 1255 serially transmits the data from output memory 1250 to the DSPs.

5.) When all of the function blocks have completed, the memory transfer controller 1220 moves the contents of the internal data memory 1115 to the external data RAM 1110, moves the contents of the weighting function memory 1120 to the FFT memory 1245, and moves the FFT memory 1245 to output memory 1250.

Figure 13:
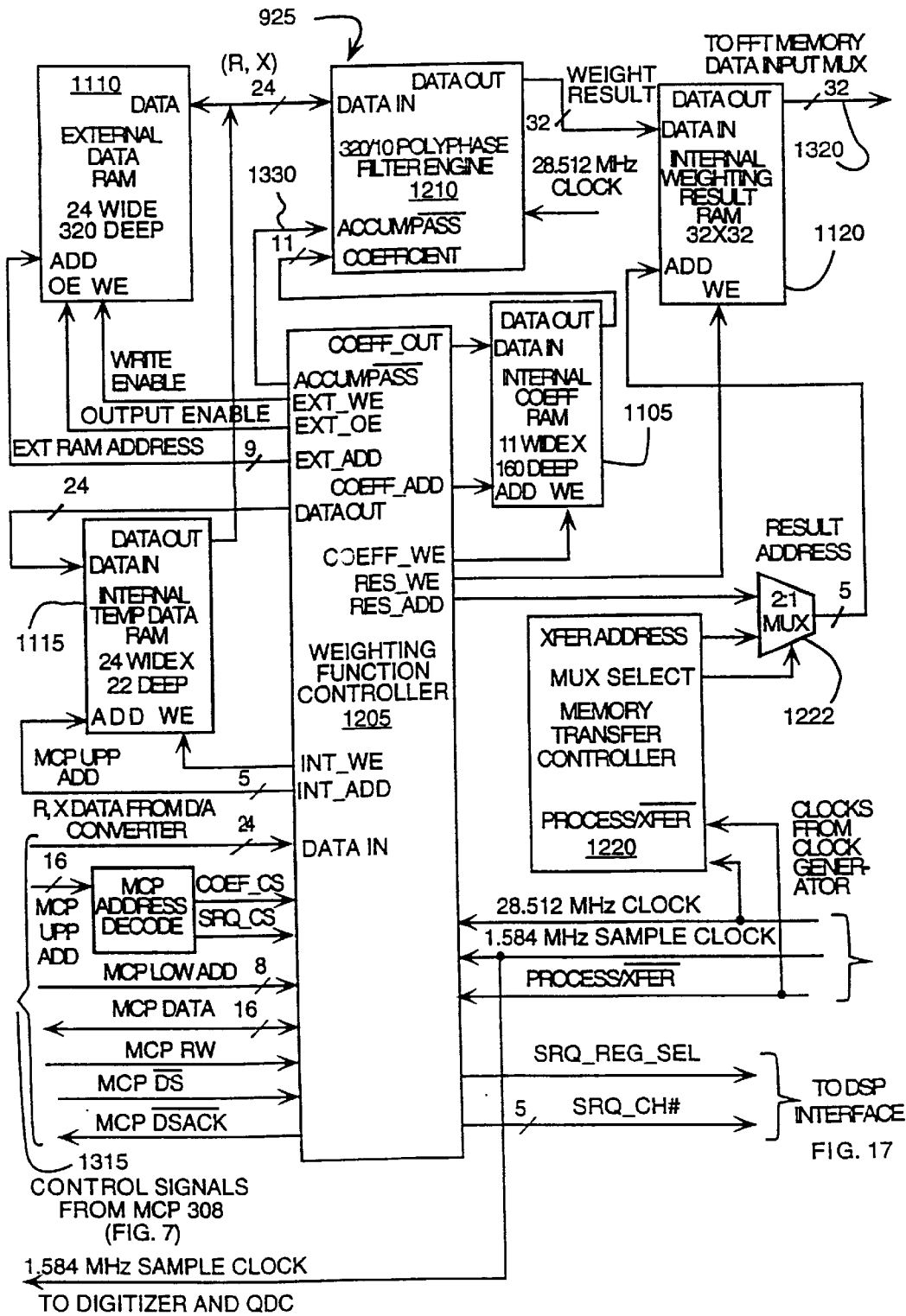
FIG. 13 is a detailed block schematic diagram of the weighted overlap and add filter in the channelizer of the preferred block receiver of FIG. 9.

FIG. 13 illustrates the logical blocks of the weighted overlap and add circuitry 925 in greater detail. The external data RAM 1110 forms a circular buffer 320 words deep. Every time a weighting block process is performed all 320 values are read from the RAM. During the memory transfer phase, 22 new values are written over the oldest values in the memory and the pointers moved to what is now the oldest data in the RAM. A new weighting block process begins at the oldest data then.

The preferred RAM 1110 is 24 bits wide×320 deep, with an access time at 28.512 MHz or better, such as a Motorola MCM56824AFN20, an 8k×24 fast static RAM with an access time of 20 nsec.

The purpose of the internal data RAM 1115 is to hold the data that arrives during a weighting block process. There are 22 new values which arrive at a constant rate of 1.584 Msample and are 24 bits wide (12×2 for R and X). Transfer of data into and out of this memory will be controlled by the weighting function controller 1205. Arriving data is first buffered by the weighting function controller to prevent collision in case a memory transfer is in process.

An internal coefficient RAM 1305 stores the tap weights to be used in the filter function. The filter function is 320 samples long and assumed to be symmetric about its center point. This results in only half of the values actually must be stored. The access rate of the RAM is also preferably 28.512 MHz.

In the preferred embodiment, at any time the master control processor 308 (FIG. 7) can write new coefficient values into the RAM 1305. This process is indicated by the MCP upper address bits (MCP UPP ADD) pointing to the channelizer (address decode will indicate) and the control bus being set in a state for a write operation. Coefficient values are first buffered in the weighting function controller and then written into the internal coefficient RAM. This facilitates provision of different filter functions, as desired.

The inventor believes that 11 bits of filter coefficient precision is sufficient to obtain acceptable ingress suppression in adjacent channels. The preferred memory size of the coefficient RAM 1305 is then 11 wide×160 deep.

The combination of weighting and folding results in a polyphase filter having the desired impulse response in the time domain. Each phase of the filter will have 10 taps and there will be 32 phases to create 32 results. Typical filter coefficients for the preferred polyphase filter are set forth in FIG. 15. A single phase of the filter will be computed at a time. The equation for the phases is shown below:

$$Y_0 = (w_0 \leftrightarrow d_n) + (w_{32} \leftrightarrow d_{n+32}) + (w_{64} \leftrightarrow d_{n+64}) + (w_{96} \leftrightarrow d_{n+96}) +$$
$$(w_{128} \leftrightarrow d_{n+128}) + (w_{160} \leftrightarrow d_{n+160}) + (w_{192} \leftrightarrow d_{n+192}) +$$
$$(w_{224} \leftrightarrow d_{n+224}) + (w_{256} \leftrightarrow d_{n+256}) + (w_{288} \leftrightarrow d_{n+288})$$

$$Y_1 = (w_1 \leftrightarrow d_{n+1}) + (w_{33} \leftrightarrow d_{n+33}) + (w_{65} \leftrightarrow d_{n+65}) + (w_{97} \leftrightarrow d_{n+97}) +$$
$$(w_{129} \leftrightarrow d_{n+129}) + (w_{161} \leftrightarrow d_{n+161}) + (w_{193} \leftrightarrow d_{n+193}) +$$
$$(w_{225} \leftrightarrow d_{n+225}) + (w_{257} \leftrightarrow d_{n+257}) + (w_{289} \leftrightarrow d_{n+289})$$

$$\vdots$$

$$Y_{31} = (w_{31} \leftrightarrow d_{n+31}) + (w_{63} \leftrightarrow d_{n+63}) + (w_{95} \leftrightarrow d_{n+95}) + (w_{127} \leftrightarrow d_{n+127}) +$$
$$(w_{159} \leftrightarrow d_{n+159}) + (w_{191} \leftrightarrow d_{n+191}) + (w_{223} \leftrightarrow d_{n+223}) +$$
$$(w_{255} \leftrightarrow d_{n+255}) + (w_{287} \leftrightarrow d_{n+287}) + (w_{319} \leftrightarrow d_{n+319})$$

where n is the present data starting address pointer

Other control signals for the weighting function controller 1205 provided by the master control processor 308 are provided on lines 1315. The designator "MCP" indicates a signal to or from the master control processor.

The logic internal to the weighting function controller 1205 is primarily involved with data transfer between the other functional blocks including the internal data RAM 1115, the external data RAM 1110, the filter engine 1210, the internal weighting result RAM 1120, and the internal coefficient RAM 1305. Once the computation of the filter function is complete, the memory transfer controller 1220 operating under control of the PROCESS/$\overline{\text{XFER}}$ signal controls selection of the addresses through the multiplexer 1222 to the internal weighting result RAM 1120, and then provides 32 bits of data output to the FFT memory on the lines 1320. As discussed, these processes take place at a 1.584 MHz sample rate, but internal computations are carried out at a clock rate of 28.512 MHz.

Figure 14:
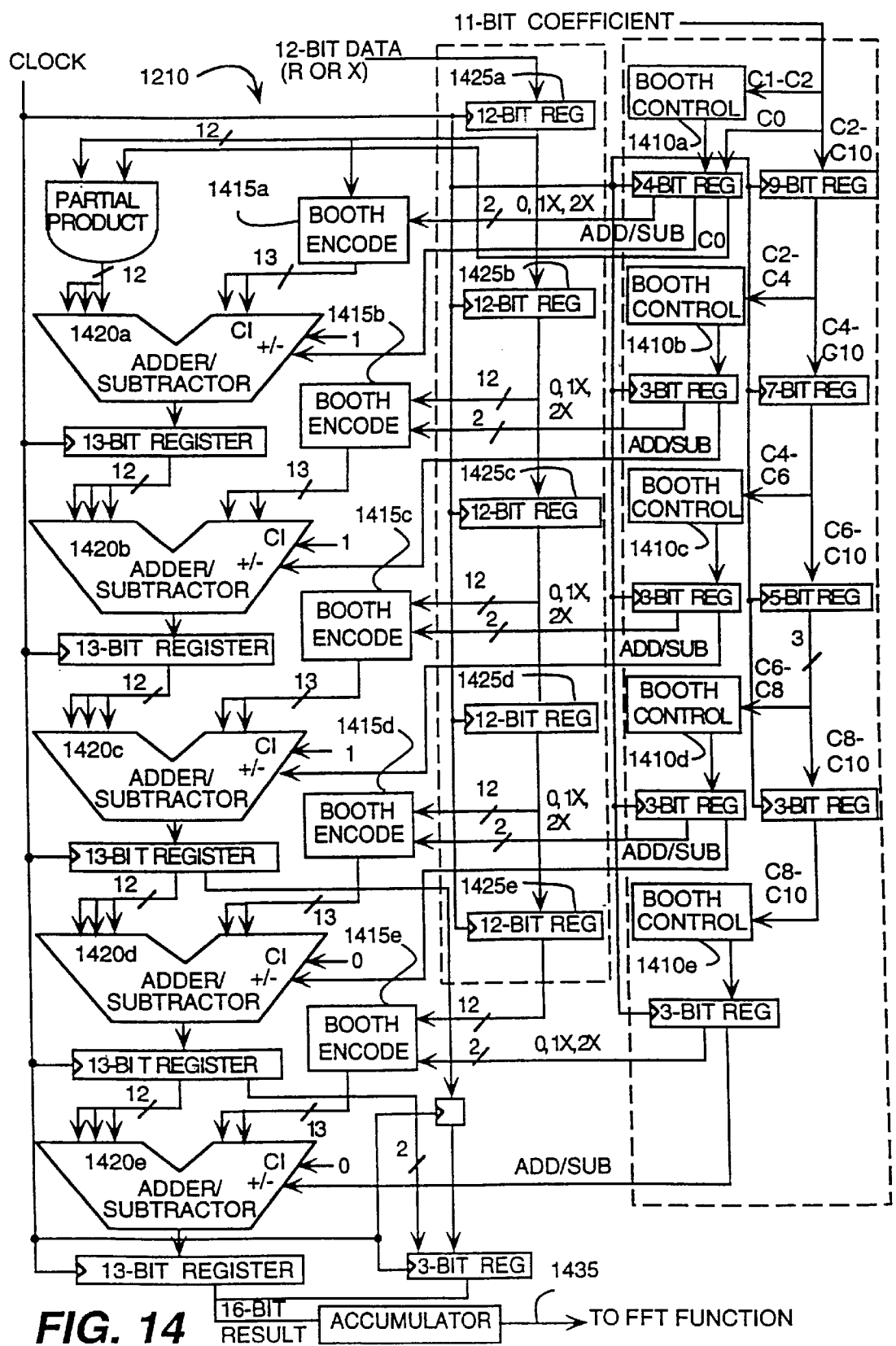
FIG. 14 is detailed block schematic diagram of the 320/10 polyphase filter engine employed to implement the weighted overlap and add filter in the channelizer of the preferred block receiver of FIG. 9.

Refer now to FIG. 14 for details of the 320/10 polyphase filter engine 1210 shown in FIG. 13 In particular, the preferred structure for computing the multiply and add operations illustrated generally in FIG. 11 are shown. Briefly, the structure in FIG. 14 is operative to compute the product of a data value R, X stored in the external data RAM 1110 with an 11 bit coefficient from the coefficient memory 1105 (which is the weighting operation), and sum the appropriate selected values to obtain a final filter value that is output to the internal weighting result RAM 1120.

In FIG. 14, there are five adders 1420a . . . 1420e that perform an 11 bit multiply using the Booth encoding method known to those skilled in the art, which allows two bits per adder stage plus one additional bit in the first stage. A Booth multiplier was employed in the preferred embodiment to minimize resources and latency, and to ease routing.

It will be understood that each of the multiplication/accumulation operations is actually two because the data values are complex, and the weights are purely real. In order to perform one complex weight operation every clock cycle, two multiplier/accumulators (MAC) are provided, one for the real value R and one for the imaginary value X.

The multiplier in FIG. 14 begins a new multiply on every clock cycle. Latency is 6 clock cycles which impacts the ACCUM/$\overline{\text{PASS}}$ signal to be described later. Each section of the multiplier is made up of a control section 1410, a Booth encoder 1415, and an adder 1420, as well as pipeline registers 1425, and is responsible for multiplying all the data bits by two of the coefficient bits. Five stages are employed, so there are five control sections 1410a . . . 1410e, five Booth encode blocks 1415a . . . 1415e, and five adder/subtractor units 1420a . . . 1420e.

The Booth control blocks 1410a . . . 1410e, which are replicated for each stage in the multiply operation, take in the two present coefficient bits and one less significant coefficient bit to determine the state of the control signals. The truth table for this control block is shown below:

TABLE 2

| C(i + 1) present coeff bit | C(i) present coeff bit | C(i − 1) prev. coeff bit | Operation | Add/Subtract control bit | 0x/1x/2x control bits |
|---|---|---|---|---|---|
| 0 | 0 | 0 | add zero | x | 00 |
| 0 | 0 | 1 | add 1x data word | 1 | 01 |
| 0 | 1 | 0 | add 1x data word | 1 | 01 |
| 0 | 1 | 1 | add 2x data word | 1 | 10 |
| 1 | 0 | 0 | subtract 2x data word | 0 | 10 |
| 1 | 0 | 1 | subtract 1x data word | 0 | 01 |
| 1 | 1 | 0 | subtract 1x data word | 0 | 01 |
| 1 | 1 | 1 | add zero | x | 00 |

The add/subtract control bit ADD/SUB is sent to the add/subtractor unit 1420 in the same section while the 0x/1x/2x control bits are passed on to the Booth encode block 1415. The Booth encode block takes in the data word and outputs either zero, one times, or two times the present data word. This Booth encode result is applied to the add/subtractor input and is scaled by a factor of four relative the other input to the adder/subtractor. The first section of the multiplier is slightly different because there is no previous result to accumulate with the Booth encoded result. A partial product is formed between the LSB of the coefficient and the data word to form one input while the other input is a special Booth encode subset. For this special subset, the previous bit is assumed to be zero because its impact has been computed via the partial product. The first section computes the multiplication result using the three LSB's of the coefficient, so only 4 more sections are needed to complete an 11 bit by 12 bit multiplier.

Still referring to FIG. 14, the elements in the dotted box 1430, including the Booth control logic 1410, is associated only with the coefficient which is common between the real and imaginary multiplier sections and as such one block only is needed to implement two multipliers.

The preferred weighting function multiplier 1210is fully synchronous using a clock of 28.512 MHz, resulting in a clock period of 35 nsec. The worst case timing occurs from a 12 bit coefficient register through a Booth encode block and then a 12 bit adder. The output of the multiplier is stored in an accumulator 1435, which accumulates the results from the weighting multiplication for 10 cycles of the 28.512 MHz clock in order to form a weighted/overlapped value.

The output of the accumulator 1435 is the WEIGHT RESULT (FIG. 13), made available at all times to the weighting result RAM 1120. The weighting function controller 1205 waits until a full 10 weighted data sample accumulation has taken place and then asserts the write-enable (WE) signal on the weighting result RAM 1120 such that the correct result is written. On the next clock cycle, the weighting function controller 1205 pulls the ACCUM/$\overline{\text{PASS}}$ 1330 (FIG. 13) signal low for one clock period which puts the accumulators in the pass mode and initiates a new accumulation. For the remaining 9 clock cycles the ACCUMIPASS line is held high. The process of passing for one clock and accumulating for 9 clocks is repeated 32 times.

The results of weighted and folded data is placed in the output memory 1120. The output memory contains 32 complex 16-bit values. During the weighting process, address and write-enable for this RAM are controlled by the weighting function controller 1205. Data is transferred into and out of the RAM 32 bits at a time. Upon completion of the weighting process, the transfer memory process is commenced and control of the address for this RAM is given to the memory transfer controller 1220. The contents of this RAM are then written into the FFT memory.

The weighting function controller 1205 handles all of the addressing and control during the weight computation process. Some of this addressing and control is given to the memory transfer controller 1220 during the transfer phase. In addition, the weighting function controller interfaces to the master control processor 308 allowing writes to the coefficient RAM and also the SRQ channel number register.

A weight computation process is initiated by a change of state in the PROCESS/$\overline{\text{XFER}}$ control line. The weighting function controller 1205 addresses the external data RAM 1110 to pull data out sequentially. Simultaneously, it will pull corresponding weight values from the coefficient RAM 1305 and make both available to the polyphase filter engine 1210. After 10 clock cycles, the accumulated result is written to the weighting result RAM 1120, which is addressed and controlled by the weighting function controller. After 32 results have been computed, the weighting function controller will sit in an idle state awaiting the indication for a change of state to the memory transfer phase.

While the weighted/folded data is being calculated, new data will be stored in the internal temporary data RAM 1115 The weighting function controller will also be responsible for buffering data for this RAM and controlling address and write-enable.

During this phase, the weighting function controller 1205 is responsible transferring the contents of the temporary data RAM 1115 to the external data RAM 1110. This process will transfer one 32 bit data word every two clock cycles such that 22 words takes 44 clock cycles. Control busses and address busses for both RAMs is controlled by the weighting function controller. During the phase of memory transfer, the weighting function controller keeps the write-enable (WE) signal for the weighting result RAM 1120 deasserted such that read-only is occurs from this RAM.

Concurrent with the internal to external data transfer, samples are arriving from the QDC 915 every 18 clock cycles. This means that two samples will arrive during the 44 clocks it takes to make the transfer. Since the internal data RAM can be accessed on every clock cycle, there is one out of every two available for the newly arriving data to be written into the internal data RAM.

As previously described, the weight function itself is downloadable from the master control processor 308. Also, the SRQ channel number is configured through this same interface. The weighting function controller 1205 has an address decode associated with it which will compare the current address bus with a chip address (hardwired on the board). Output of the address decode is chip selects for the coefficient RAM with the signal COEF_CS and the SRQ channel number register with the signal SRQ_CS. Concurrent assertion of these with a write state on the control bus of the MCP 308 initiates a write to either the RAM or the register. The result of double buffering the MCP data strobe line will be used to register the lower address and then generate a clock pulse or write enable for the memory selected. After completion of writing the data into memory, a data strobe acknowledge will be generated to complete the write cycle.

Fast Fourier Transform Operations

Figure 16:
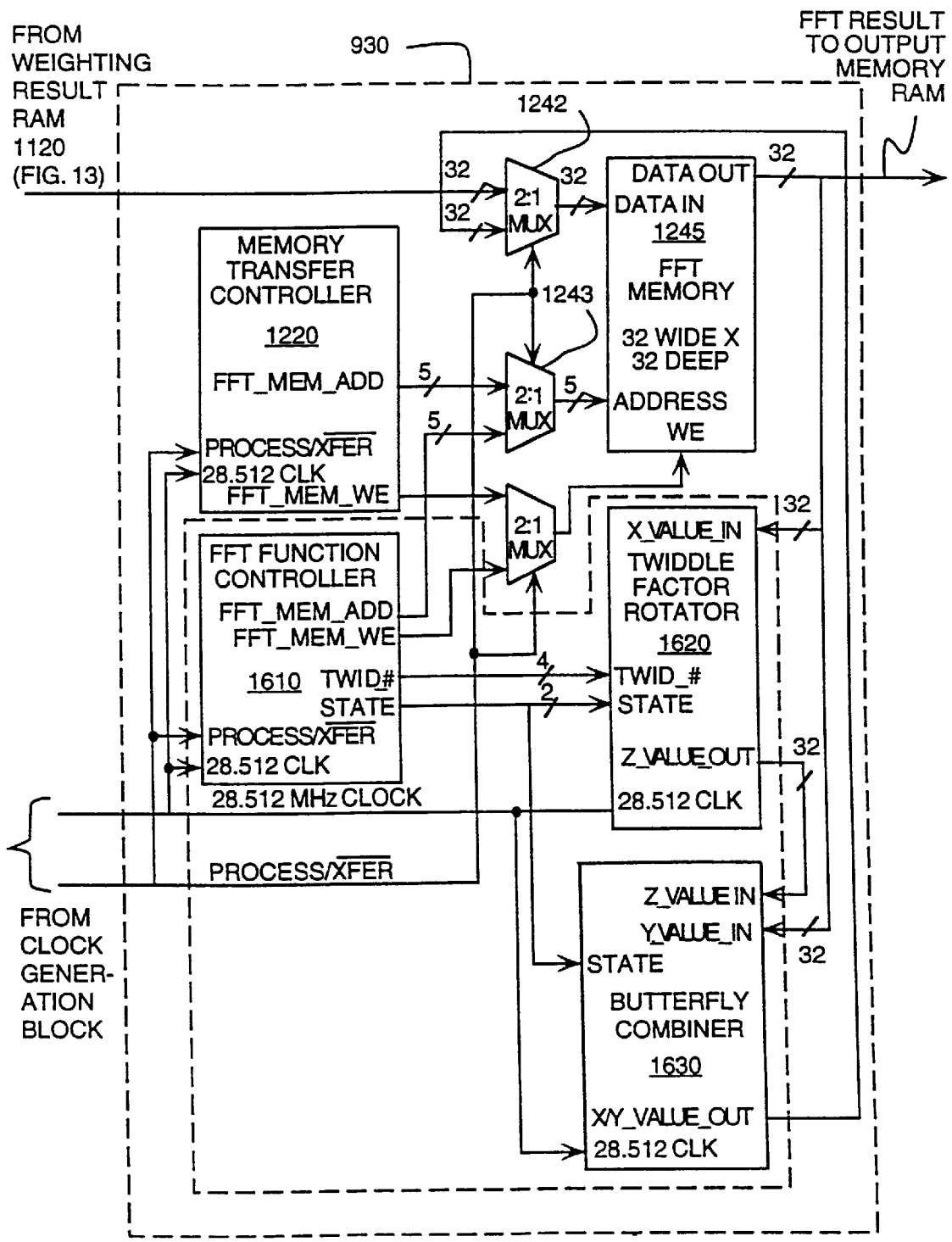
FIG. 16 is a detailed block schematic diagram of the fast Fourier transform (FFT) stage in the channelizer of the preferred block receiver of FIG. 9.

Turning next to FIG. 16, the FFT function 930 is implemented with a number of components illustrated generally in FIG. 12. These components include a memory transfer controller 1220 (which also controls memory transfer of the weighted overlap and add function 925), an FFT function engine 1240, and multiplexers 1242, 1243 that control the data and address, respectively, of an FFT memory 1245. The FFT function engine 1240 comprises an FFT function controller 1610, a twiddle factor rotator 1620, and a butterfly engine 1630. The circuitry in FIG. 16 operates to compute a 32 point FFT and is ultimately operative to down convert each of the 25 individual channels within the selected 1.584 MHz subband to DC. The size of the FFT in the preferred embodiment is 32 points, which allows use of a radix two butterflies in the computation, the structure of which is known to those skilled in the art. The engine implements a decimation in time FFT algorithm, utilizing the basic butterfly operators including complex vector rotation, scaling, and cross summations, in the manner as will be known to those skilled in the art.

Those skilled in the art will understand that the complex vector rotation is represented as a multiplication by a twiddle factor. For a 32 point FFT there are 16 distinct twiddle factors that are used. These have the standard form known to those skilled in the art. Any requisite scale factor is preferably introduced into the calculation in the twiddle factor. The scale factor is utilized to eliminate the possibility of overflow during an FFT calculation.

Those skilled in the art will appreciate the following standard definition of the discrete Fourier transform:

$$X(k\omega) = \sum_{n=0}^{n=N-1} x_n \times W_N^{kn}$$

If a sizable ingress tone is present in the digitized spectrum which overwhelmingly dominates the data, then the DFT of this becomes approximately:

$$X(k\omega) = \sum_{n=0}^{n=N-1} e^{+j2\pi\omega n/N} \times W_N^{kn} = \sum_{n=0}^{n=N-1} 1 = N$$

This shows that the DFT output can be N times the DFT input (for N=32) which will cause overflow assuming the maximum input and output values are both unity. In order to rectify this situation, the signal is preferably scaled by a factor of ½ through every butterfly. Since data will pass through 5 butterflies, there will be a scaling of ½ raised to the 5th power or ⅟₃₂. The result will be unity gain through the DFT.

Nominally the intended channels will be digitized such that their symbol values are 8 bits below full scale on the A/D converter. Since the DFT is unity gain, the signals will come out of the process with their symbol values at $2^-7$. Preferably, there are 16 bits of precision provided to the baseband processing stage, so a nominal signal amplitude will give 8 significant bits at the output of the channelizer.

This scale factor of ½ will be performed as a shift by one bit value and will be performed on both the X and Y arms of the butterfly.

The preferred FFT function 930 is made up of four functional blocks. The two blocks which comprise a butterfly computation engine are the twiddle factor rotator 1620 and a butterfly combiner 1630. Together they will perform one complete butterfly computation whose inputs and outputs come from and go to the FFT memory block 1245. The FFT function controller 1610 is responsible for stepping the butterfly engine through each butterfly and subsequently directing it through all 80 butterflies which make up a complete 32 point FFT.

In the preferred embodiment, FFT's are computed at a rate of 72 kHz. Using a clock of 28.512 MHz, there are 396 cycles in a single block process. Given the need to compute 80 butterflies, each butterfly may take 4 clock cycles for completion for a total of 320 clock cycles plus any latency in the process.

The FFT block 930, like the other processors in the channelizer has two processing modes or phases—a process phase and a transfer phase. During the process phase, a single FFT is performed. The input for the FFT is located in the FFT memory 1245 at the beginning of the process phase. By the end of the process, the output of the FFT is located in the same space to effect an "in place computation". During the transfer phase, the FFT output data is moved from the FFT memory to the output memory 1250 (FIG. 12). Meanwhile, input data is being moved from the weighting result memory 1120 to the FFT memory 1245.

During the process phase, the FFT function controller 1610 addresses and controls the FFT memory 1245. When the PROCESS/$\overline{\text{XFER}}$ control signal goes low, the 2:1 multiplexers 1242, 1243 switch state to allow the memory transfer controller 1220 to address the FFT memory 1245. Thirty-two values from the weighting result memory 1120 are transferred into the FFT memory 1245 simultaneously with 32 FFT results being transferred to the output memory from the FFT memory. The RAM's in the preferred Xilinx 4000 series FPGAs utilized to construct the preferred embodiment can be set up to read, then write on a single clock cycle such that the complete transfer can be made in 32 clock cycles plus any latency associated with it. There are 396 clock cycles total, with 320 and 32 cycles (minimum) being dedicated to the process and transfer phases. respectively. This allows 44 clock cycles to accommodate latency and buffer.

Still referring to FIG. 16, the twiddle factor rotator 1620 performs a complex vector rotation and a scale by ½. This complex vector rotation involves multiplies and adds. Using pipelining throughout the process, each functional block which makes up the butterfly combiner 1630 must perform its part within 4 clock cycles allotted. This means a fully parallel array multiplier does not need to be used. However, a bit serial multiplier requires 16 clock cycles to perform the multiplication. A hybrid approach will be more resource efficient than an array multiplier and use fewer clock cycles than the bit-serial approach is therefore preferred. The preferred hybrid approach performs four-nibble multiplications in parallel and then sums their results. The nibble multipliers have 4 clock cycles to perform a 4 bit×10 bit multiplication so they can use a bit serial approach. Normally, a multiplication of two complex numbers means performing 4 real multiplications and two real additions.

The FFT memory 1245 is 32 words deep and 32 bits wide. During the processing phase, data will be either read or written to the memory on any one clock cycle. The transfer phase will read and write data on the same clock cycle which may impact timing and registering data at the memory output.

The FFT function controller 1610 is responsible for generating all of the control signals employed during the FFT operations during the process phase. These control responsibilities are relinquished to the memory transfer controller 1220 during the transfer phase. The FFT function controller 1610 preferably comprises a finite state machine for generating appropriate control signals on a cyclical basis. During the process or computation phase, the preferred state machine cycles through 4 states, transitioning on edges of the 28.512 MHz clock. Upon completion of the 4 states making up a butterfly computation, the state machine cycles back around to state 0 and starts another butterfly computation.

Inasmuch as those skilled in the art will understand various methods and techniques for implementing a FFT transform engine with logic, no further discussion of the functions of the butterfly combiner 1630 and twiddle factor rotation 1620 will be necessary.

Figure 17:
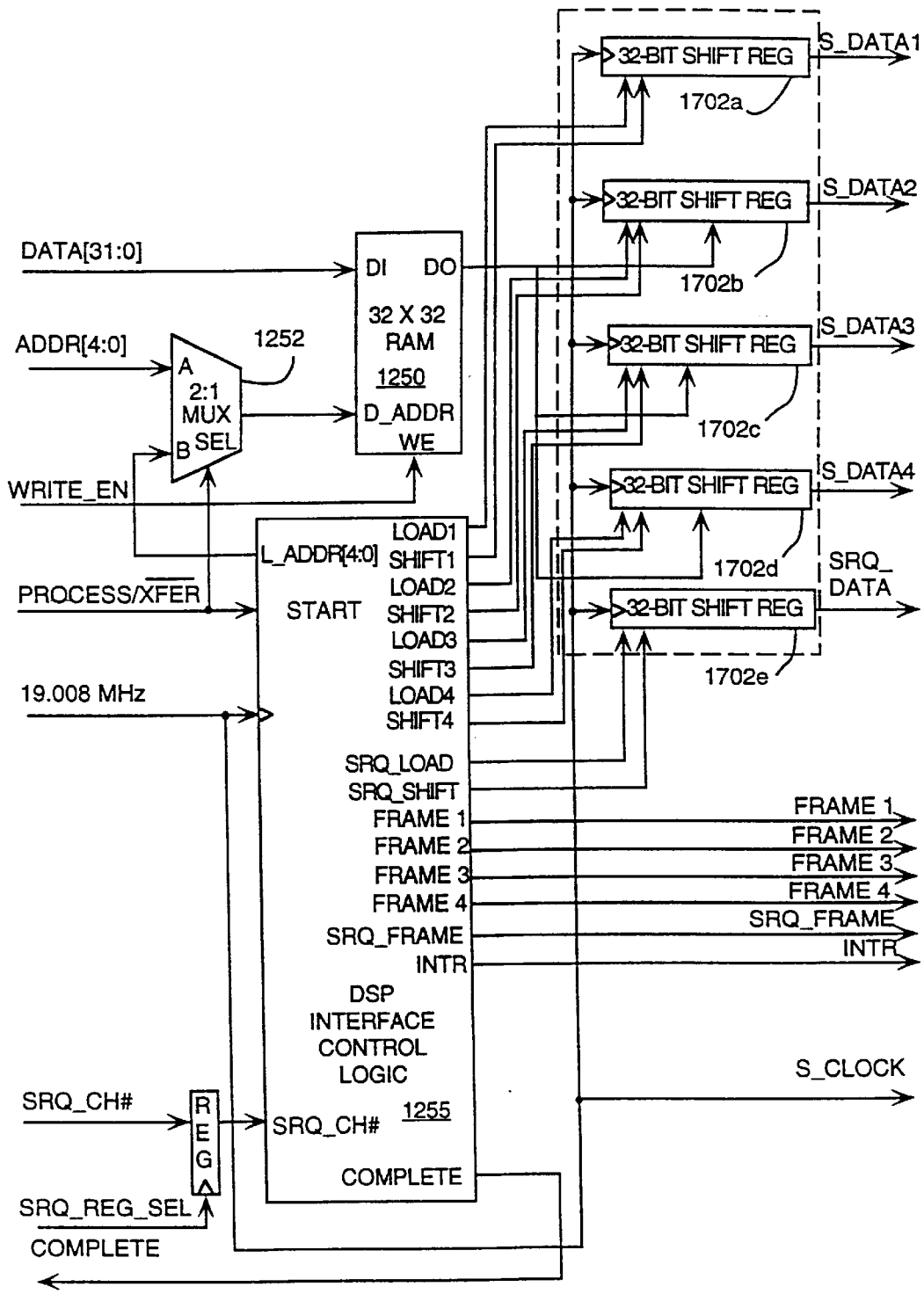
FIG. 17 is a detailed block schematic diagram of the interface logic employed between the block receiver stage and the baseband processing stage of the preferred block receiver of FIG. 9.

Turning now to FIG. 17, when the FFT computation is complete, the resulting in-phase and quadrature data for the 25 valid channels is transferred into the output data memory 1250. The data is serialized by transfer and shift operation into a bank of shift registers 1702. An address multiplexer 1252 selects addresses in the memory 1250 for storage of the FFT result and for output to the shift registers 1702. As discussed in greater detail below, the 16-bit data is serially transmitted to the ADSP-2171 digital signal processor 370 (FIG. 18) via the serial port interface (SPORT). Since the SPORT clock must be less than 20 MHz, a clock of 14.256 MHz is preferably used as the serial data clock because it is an integer divisor of the 28.512 MHz master clock and it can transfer six channels of 16-bit data at 72 kHz. There are five serial port interfaces provided by the channelizer: the signal SRQ_Data transfers the data for the service request channel, and the other four serial ports (S_Data1, S_Data2, S_Data3, and S_Data4) transfer 6 channels each to the four DSPs.

The output memory 1250 contains 32 16-bit real and imaginary values. The real and imaginary values are physically located at the same address. This memory is controlled and loaded by the memory transfer controller 1220 in of the channelizer. When the PROCESS/$\overline{\text{XFER}}$ signal is low, the address multiplexer 1252 to the output memory 1250 selects an address generated by memory transfer controller 1220, allowing the memory to be loaded from the FFT memory.

A finite state machine (not illustrated) controls the transfer of output RAM 1250 to the DSPs. When the PROCESS/$\overline{\text{XFER}}$ signal is high, the shift registers 1702 are loaded and the serial data transfer begins. This continues until all 25 complex values have been transferred. The data is transferred at a bit rate of 14.256 MHz.

A Service Request Channel Number (SRQ_Ch#) signal is latched into a 5-bit register 1702*e* when the signal SRQ_Reg_Sel is high. SRQ_Reg_Sel enables the 14.256 MHz clock input to the SRQ_Ch# register. The SRQ_Ch# indicates the channel that contains the service request information.

The state machine controls the load and clock enable inputs of the 4 shift registers 1702a, 1702b, 1702c, 1702d, and controls the data framing signals for the four serial ports, generates the addressing for the output memory RAM, and generates the DSP interrupt when the memory transfer is complete.

The block receiver interfaces to three ADSP2171 digital signal processors in the baseband processing stage via a three wire synchronous serial interface. The three signals include: transmit serial data, serial clock, and frame synchronization. As described below, each DSP 370 is driven by the same serial clock and separate serial data and frame synchronization signals.

Details of Baseband Processing Stage

The following discussion is found in application Ser. No. 08/497,555, filed Jun. 30, 1995, entitled "Plural Telephony Channel Baseband Signal Demodulator for a Broadband Communications System".

Figure 18:
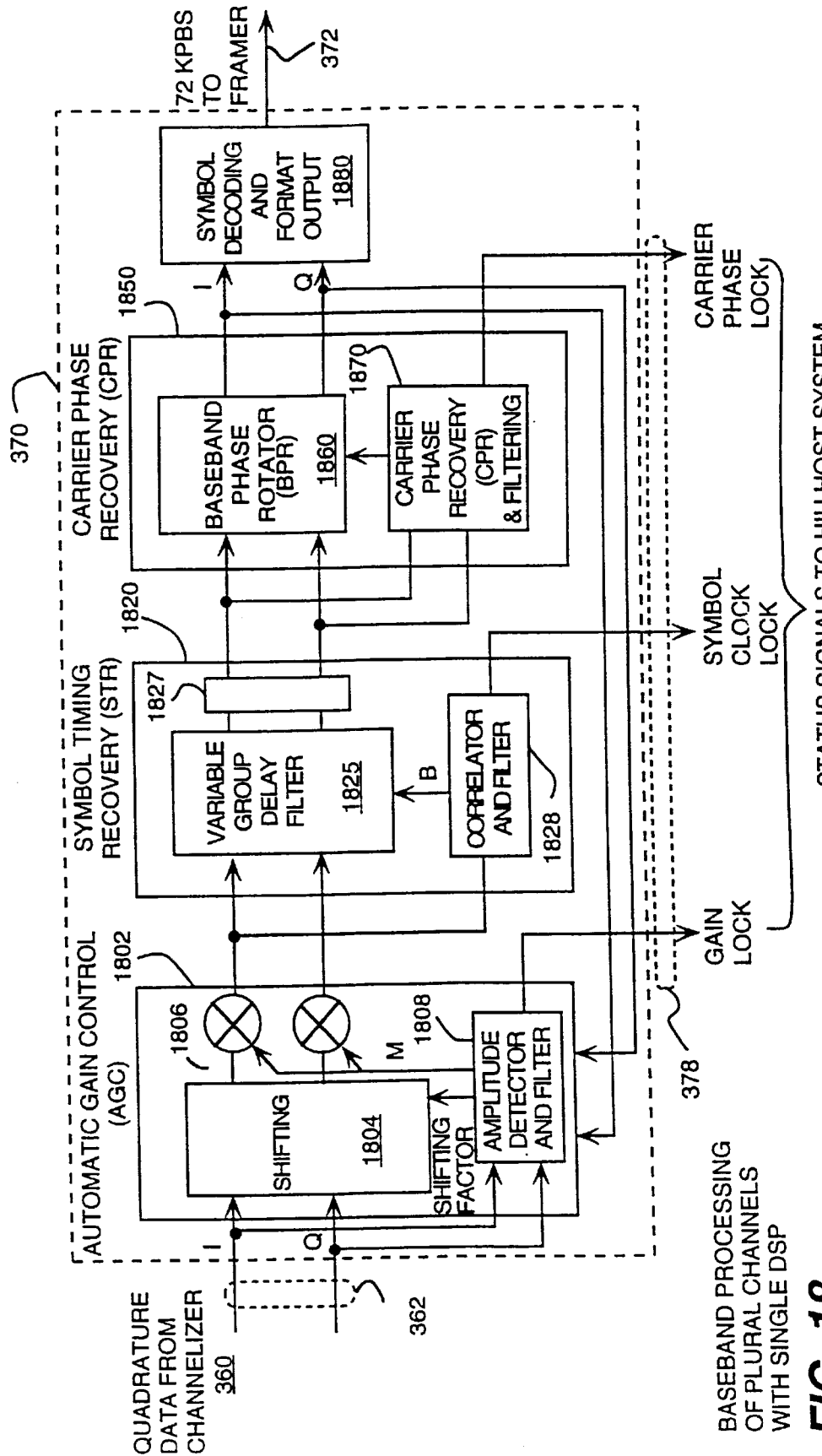
FIG. 18 is a block functional diagram illustrating the principal baseband processing methods carried out by the DSP in the reverse demodulator circuit of FIG. 8.

FIG. 18 illustrates the basic functions carried out within each of the DSPs 370 to provide for baseband processing of plural channels in the baseband processing stage 361. Briefly stated, each DSP carries out the functions of automatic gain control (AGC), symbol timing recovery (STR), carrier phase recovery (CPR), and differential phase decoding and formatting for each of six baseband DS0 channels. These functions are carried out on quadrature I and Q data values provided from the channelizer 360. All incoming I and Q data values are stored in the internal data memory of the preferred DSP 370. In addition, the sine and cosine values employed in the baseband phase rotator portion of carrier phase recovery and loop filter coefficients are stored in the internal program memory of the DSP.

In FIG. 18, the automatic gain control functional block 1802 comprises a shifting component 1804, multipliers 1806, and an amplitude detector and filter 1808. The amplitude detector and filter generates a multiplication factor M that is provided to the multipliers 1806 and a shifting factor that is provided to the shifting component 1804.

After the signals from the channelizer 360 are adjusted for gain by the AGC circuit 1802, they are provided to a symbol timing recovery (STR) function 1820. The STR function 1820 comprises a variable group delay filter 1825 and a correlator 1828 that generates a filter coefficient b that is provided to the variable group delay (VGD) filter 1825. The output of the variable group delay filter in the STR block to is downsampled by two and then provided to a carrier phase recovery (CPR) function 1850, which is operative to lock to the carrier frequency in a conventional phase lock loop fashion. The CPR function 1850 includes a baseband phase rotator (BPR 1860) that adjusts the phase difference between the phase of the input I and Q values and the phase of the QPSK carrier.

Also, the CPR function 1850 comprises a carrier phase recovery (CPR) function 1870, which is operative to detect and lock to the QPSK carrier and adjust for frequency variations that might occur between the receiver's local oscillator and the carrier oscillator.

The outputs of the CPR function 1850 are separate I and Q values at one sample per symbol rate from the baseband DS0 signal that are then provided to a symbol decoding and differential phase decoding function 1880 that is operative to derive the DS0 data, frame it, and format it appropriately as an output on line 372 at 72 kbits/sec to the framer circuit 375 (FIG. 8).

The arithmetic functions provided for the preferred DSP 370 in 1.15 fixed format, i.e. the numbers have one sign bit and 15 fractional bits; therefore, during processing numbers can range from $-1$ to $1-2^{-15}$. In order to perform the calculations for the functions inside DSP correctly without any overflow, at some points during processing the inputs or outputs of some of these functions may need to be shifted. The nominal amplitude level at different points of processing are summarized in Table 3 below:

TABLE 3

Nominal Amplitude level throughout processing

| Processing section | Nominal level |
|---|---|
| Shifter input | $2^{-7}$ |
| Shifter output | $2^{-3}$ |
| Multiplier output | $2^{-5}$ |
| AGC filter output, M | $2^{-2}$ |
| STR filter output, b | $2^{0}$ |
| Phase accumulator output in BPR | $2^{0}$ |

The preferred nominal input data level for all the functions succeeding the multiplier is $2^{-5}$.

The DSP 370 receives samples at 72 Ksamples/sec from the channelizer on line 362 through its serial port and performs five tasks. These tasks are as follows: carrier phase recovery, symbol timing recovery, automatic gain control, decoding and formatting the symbol decisions, and providing various information about each channel through host interface port 378 to the HIU processor (MCP 308, FIG. 7).

The symbol decisions are formatted and sent to the framer on line 372 by a second serial port. Each DSP is capable of performing the tasks for 6 channels; therefore, for all 24 channels, four DSP's are utilized.

Figure 19:
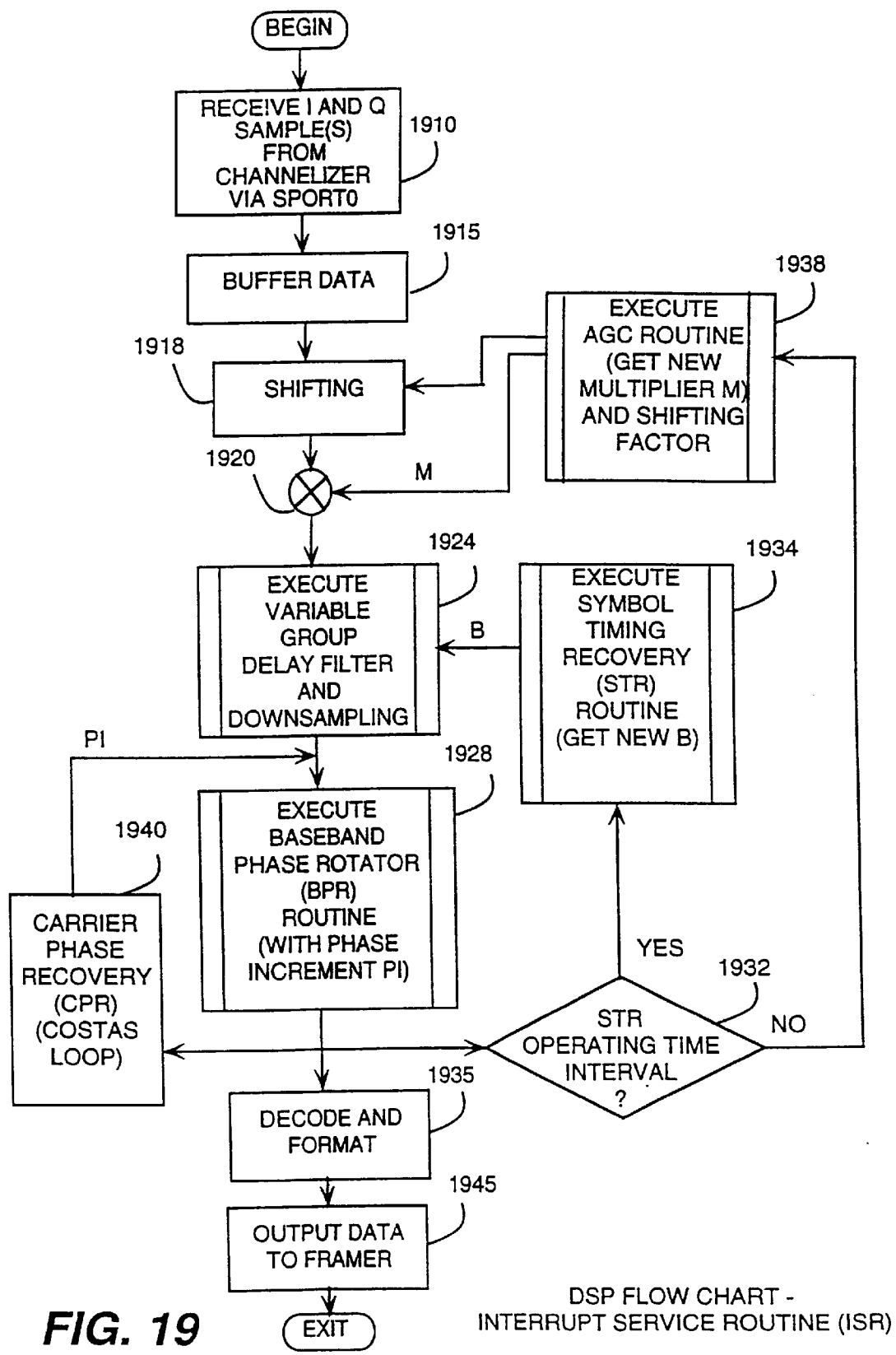
FIG. 19 is a flow chart illustrating the steps taken in the program for the DSP to carry out interrupt service routine (ISR) of the baseband processing method shown in FIG. 18.

FIG. 19 is a flow chart illustrating the sequence of operations taken by each DSP 370 to carry out the baseband processing functions described above. In particular, the flow chart illustrates the interrupt service routine (ISR) that is carried out in response to the interrupt signal INTR provided from the DSP interface control logic 1255 (FIG. 12, FIG. 17) when the FFT output memory is full, with data ready to be decoded. Those skilled in the art will understand that the steps shown in FIG. 19 are implemented as the software for the DSP, and is preferably stored in the internal program memory for the DSP. It will be understood that the steps described are taken for all six (6) DS0 channels being processed. Each described processing function is performed for all channels before processing of the next function, to save overhead in coding of the DSP.

Starting at step 1910, upon entry into the ISR a digital sample of the I and Q values is read from the channelizer for the six channels at the input port SPORT0. At step 1915, the data is buffered in a circular buffer.

At step 1918, the data values in the buffer are shifted by a shifting factor to provide for gain adjustment.

At step 1920, the data values in the circular buffer are multiplied by a multiplication factor M provided by an AGC routine described in greater detail below. The I and Q values after the AGC functions are then provided to steps involved in symbol timing recovery (1820 in FIG. 18).

At step 1924, a first step taken for symbol timing recovery is that of a variable group delay filter. This involves steps shown in greater detail below. After executing the group delay filter, the I and Q values are utilized in carrier phase recovery function (1850 in FIG. 18). The first step taken for carrier phase recovery is to execute a baseband phase rotator (BPR) routine 1928, utilizing a phase increment value PI provided from a carrier phase recovery (CPR) routine (1870 in FIG. 18).

After the BPR routine 1928, the inquiry is made at decision step 1932 whether it is time to execute the symbol timing recovery function (STR) and obtain a new value of the variable b. If so, the "yes" branch is taken to an STR routine 1934. If not, the "no" branch is taken and an AGC routine 1938 is executed to obtain a new multiplier value M.

Also after the BPR routine 1928, steps associated with carrier phase recovery (e.g. a Costas loop) 1940 are taken to obtain a new phase increment (PI) variable that is utilized in the BPR routine.

Finally after the BPR routine and any required routines of STR, AGC, or Costas loop, the data is decoded and formatted at step 1935. The data is output to the framer at step 1945, and the ISR exits, awaiting the next interrupt.

The foregoing general flow diagram may be broken down into a number of separate subroutines, which will be described next.

Automatic Gain Control (AGC) Functions

Figure 20:
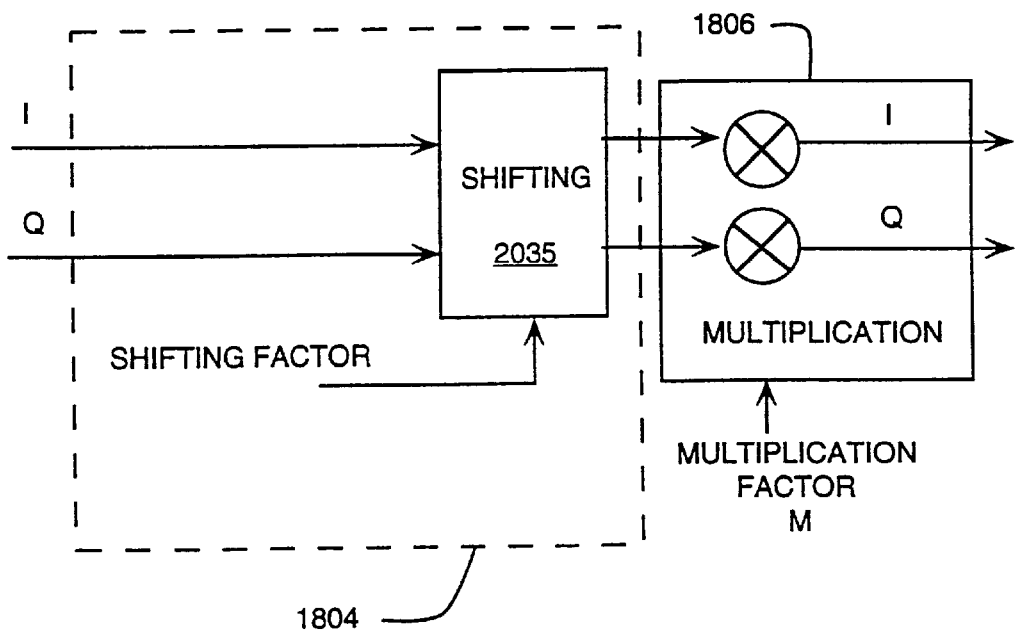
FIG. 20 shows the input multiplication functions utilized in the preferred baseband processing methods.

Turning next to FIG. 20, the automatic gain control (AGC) function 1802 comprises the basic step of shifting with a shifter 2035, and then multiplying the samples by a gain multiplying factor M that is derived periodically (every 10 symbol periods in the disclosed embodiment) with multiplier 1806.

The automatic gain control functions adjust the system gain by using a shifter and a multiplier. The shifter output amplitude level is preferably somewhere between 0.5 to 2 times the nominal input signal level. Preferably, further steps are taken for peak detection and filtering to eliminate any residual amplitude error by multiplying the output of shifting operation by the estimated multiplication factor M.

The incoming I, Q values from the channelizer are 16 bit words with the nominal value of $2^{-7}$–$2^{-8}$ for positive signals and $-2^{-7}$ for negative signals, but these signals may have higher or lower amplitudes depending on the amount of the transmitted power and the channel gain loss.

The shifting factor is determined by the AGC amplitude detector and filtering block 1808 (FIG. 18, FIG. 21), and determines how many positions (i.e., powers of 2) to shift the data. The system preferably starts with a nominal shifting factor in the middle of the range, and the shifting factor is automatically increased or decreased as necessary to increase or decrease the amplitude of the signal.

The output of the shifter function 2035 is the input to the multiplier 1806 (FIG. 18). The preferred multiplication factor in the DSP is:

$$0.67*2^{-2} \leq M \text{ (Multiplication factor)} \leq 1.5*2^{-2}$$

The initial value of the multiplication factor is $2^{-2}$.

The multiplication factor M is updated by the AGC amplitude detection and filtering function (1808 in FIG. 18). The residual amplitude error will be eliminated after AGC reaches the steady state.

Figure 21:
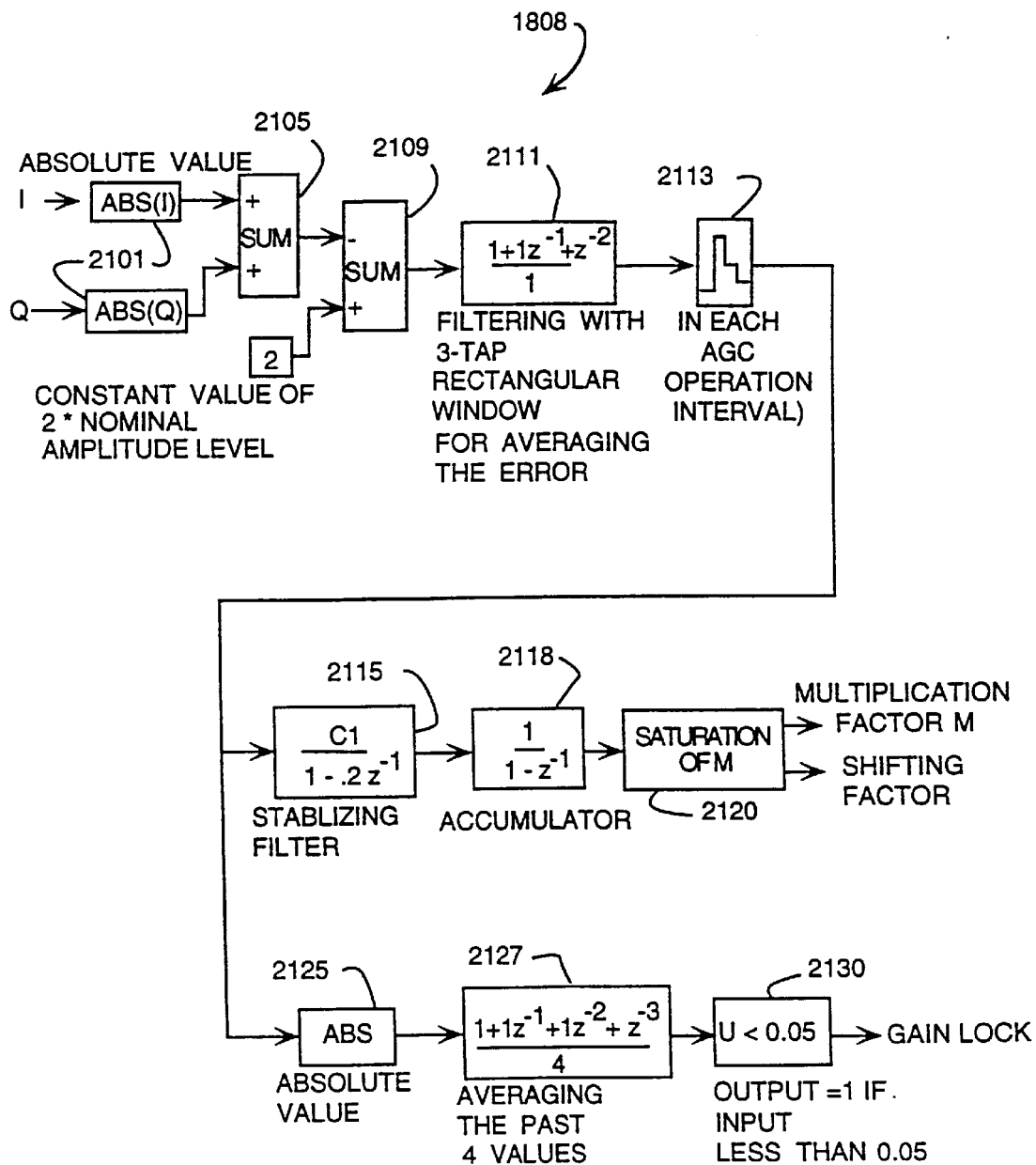
FIG. 21 shows the amplitude detection and filtering functions utilized in the preferred baseband processing methods.

FIG. 21 illustrates the steps taken to implement the program for the amplitude detection and filtering process 1808 described in connection with FIG. 18 (step 1938 in FIG. 19). When considering this figure, it should be understood that in every 10 symbol periods, one STR update and one AGC update take place. The STR update algorithm occupies the first 6 symbol periods and the AGC update algorithm occupies the other 4 symbol periods.

In determining the amplitude, at 2101 the absolute values of the in_phase (I) and quadrature signals (Q) from the multiplication 1806 (FIG. 20) are normalized to 1 by summing their values at 2105. Then, an amplitude error is determined at 609 by first subtracting the absolute values of the in_phase (I) and quadrature signals (Q) from 2 times the nominal amplitude level. The error term is then averaged at step 2111 over 3 past values using a 3 tap rectangular window to output an averaged error. The signal is used every 10 symbol period as an input to the stabilizing filter at step 2113.

The averaged error is input to a stabilizing filter at 2115. The gain of the stabilizing filter is C1=0.11 before symbol lock is detected for fast convergence of the amplitude level during the acquisition time. After deletion of symbol lock, the gain is changed to C1=0.05 to minimize the low amplitude jitter at steady state. The stabilizing filter output is accumulated at 2118 to generate the multiplication factor M by a saturation detection step 2120, and a shifting factor. The preferred nominal starting value of M is $2^{-2}$, or 0.25, and of the shifting factor is 4. The multiplication factor M is provided to the multiplication stage 1806 and the shifting factor is provided to the shifter 1804.

In operation, after the amplitude increases and passes an upper threshold of $1.5 \times 2^{-2} = 0.375$, the shifting factor will be increased by one, and the multiplier M will be divided by 2. The multiplier M is preferably constrained to be between 1.5 and 0.67 times the nominal value $2^{-2}$. It will be understood that each shift of one place with the shifting factor results in an effective multiplication or division by two.

Accordingly, the values of the multiplier M and the shifting factor are determined as follows:

| | |
|---|---|
| If M > 1.5 × $2^{-2}$ | → shifting factor = shifting factor + 1<br>M = M/2 |
| If M < 0.67 × $2^{-2}$ | → shifting factor = shifting factor − 1<br>M = M × 2 |
| If 0.67 × $2^{-2}$ < M < 1.5 × $2^{-2}$ | → shifting factor, M same |

If the shifting factor is less than 2, or greater than 6, the received amplitude is outside the 36 dB range allowed, and the shifting factor and M are returned to their nominal values.

Still looking at FIG. 20, a GAIN LOCK signal for the channel being processed is produced by steps starting at 2125. The GAIN LOCK signal is preferably generated during background processing in the preferred embodiment, as described in connection with FIG. 27. At step 2125, the absolute value of the average amplitude error is determined. At step 2127, the average of the absolute value of the past four amplitude error values is determined. At step 2130, this average is compared to a threshold value u, which corresponds to an amplitude error of about 2.5% of the ideal amplitude level. The initial value of the accumulator is $2^{-2}$.

The GAIN LOCK value is preferably updated once in the AGC operating time interval (or every 10 symbol periods). If the average exceeds the threshold value, the GAIN LOCK signal is true for the channel, and this signal is provided to the HIU processor as status information as to the channel. As described in greater detail below, if GAIN LOCK is not detected, an estimate of the amplitude value denominated $A_{rough}$ is reported to the HIU MCP 308, while if GAIN LOCK is detected, a more precise measure of amplitude denominated $A_{fine}$ is reported.

Symbol Timing Recovery (STR) Methods

Figure 22:
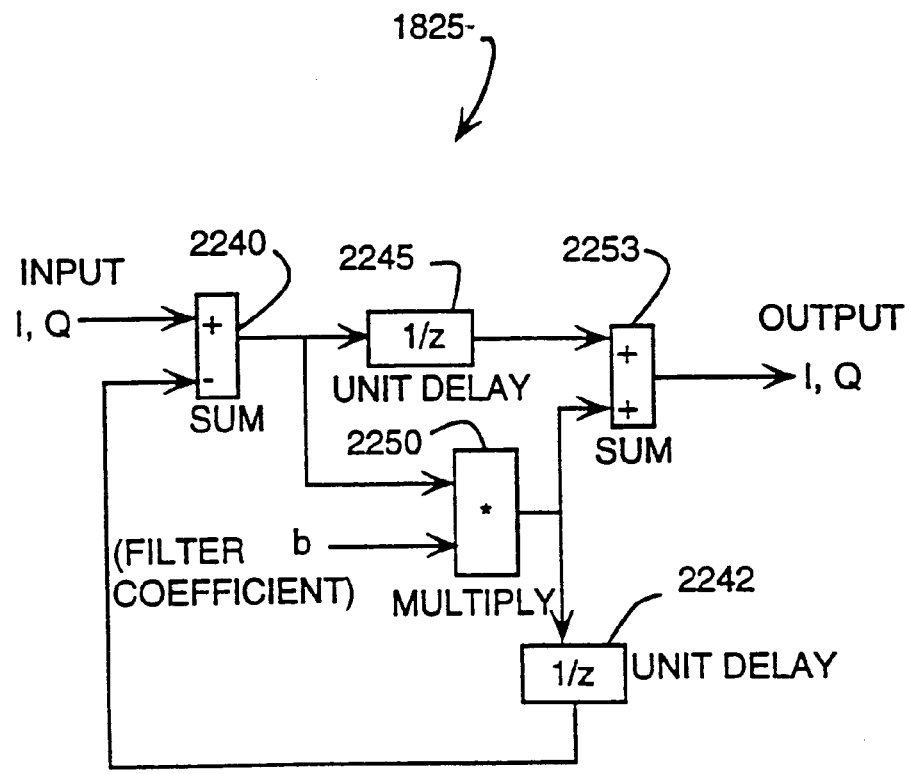
FIG. 22 shows the variable group delay (VGD) filter functions utilized in the preferred baseband processing methods.

Returning for a moment to FIG. 18, after the automatic gain control (AGC) processing 1802 comes the symbol timing recovery (STR) processing 1820. Turning next to FIG. 22, the first processing to occur within the STR stages is the variable group delay filter (VGDF) 1825.

First, it will be recalled that the STR methods involve the VGDF function 1825 and a correlation and filtering function 1828 that determines a filter coefficient b that is used to delay the incoming signal from the channelizer 360 such that the sampling would be at the symbol instants. Second, the STR methods are carried during a predetermined operating interval measured in symbol periods.

The STR operating time interval is defined as the time that STR algorithm is estimating the b value. Six (6) symbol periods inside every 10 symbol period interval is the STR operation time. The other 4 symbol period interval is the time for operation of the AGC (amplitude detection and filtering) algorithm, described above. During the STR time, the output of the AGC algorithm is held constant and equal to the last AGC filter output before the start of the STR operating time interval. During the AGC time, the output of the STR algorithm is held constant and equal to the last STR algorithm output before the previous STR operating time interval ended.

The symbol timing recovery (STR) function (1820 in FIG. 18)(1934 in FIG. 19) is operative to extract timing information in the form of a group delay, and the variable group delay filter to delay the input data (at 2 samples per symbol rate) such that the sampling will be at symbol instants.

The variable group delay filter 1825 is a first order allpass filter with a variable coefficient b. The transfer function for this filter is:

$$H(z)=(b+z^{-1})/(1+bz^{-1})$$

By changing the value of b, the filter introduces different group delays without changing the gain. In FIG. 22, the filter 1825 is implemented by summing the input I or Q value at 2240 with the fed-back value from a $z^{-1}$ unit delay 2242, subjecting the sum to a second $z^{-1}$ unit delay 2245, multiplying the sum with the filter coefficient b at 2250, and adding the operations of the multiplication results and the delayed sum at 2253.

Figure 23:
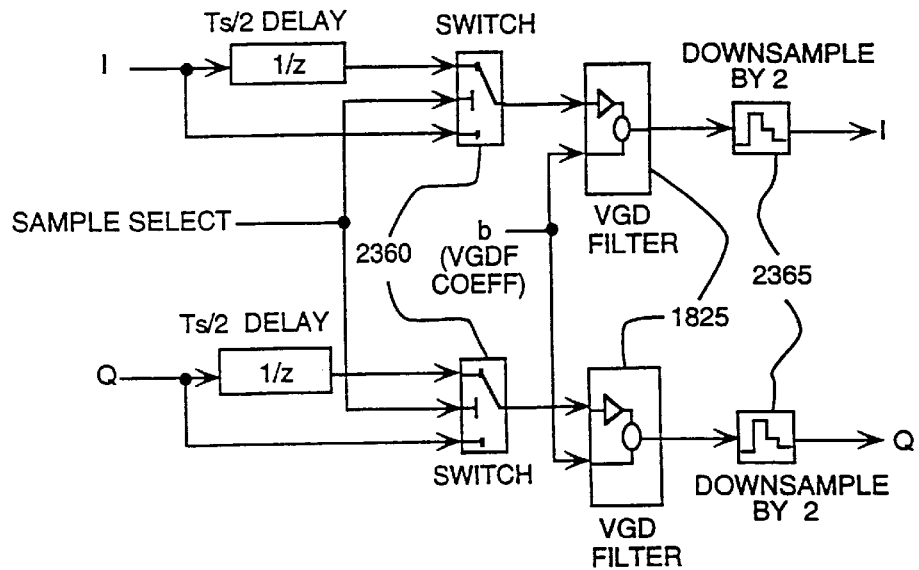
FIG. 23 shows the delay insertion, VGD filter, and downsampling functions utilized in the preferred baseband processing methods.

Referring now to FIG. 23, the VGD filtering is done on both in_phase (I) and quadrature input (Q) signals at 2 samples per symbol rate. A SAMPLE SELECT signal, generated by the symbol timing recovery function (FIG. 24), is employed at a switch 2360 to select whether the input signal to the variable group delay filter 1825 is delayed by half a symbol period or not. The switch is preferably implemented with selectable storage registers within the DSP. The output of the filter 1825 is then downsampled by 2 at step 2365 to reach the symbol rate.

In the preferred embodiment, a group delay for the coefficient b of b=0 corresponds to a delay of half a symbol period, while b=1 corresponds to a zero delay. Since b is the value of the pole, it must be less than 1, and for b<-0.045, the allpass filter shows phase nonlinearity. Thus, b is preferably limited by upper and lower bounds: -0.045≤b≤0.96. For this range of b, the group delay of the filter is almost constant in the band of interest. This range of b corresponds to a delay range of:

$$0.01 \times \text{Tsymb} \leq \tau \leq 0.55 \times \text{Tsymb}$$

where Tsymb is the symbol timing offset. If the symbol timing offset is outside this range, the SAMPLE SELECT signal will toggle its previous value to cause a delay (or advance, depending on the previous value of sample select) of Tsymb/2 to accommodate for all symbol timing offsets from zero to Tsymb. At the same time, the value of b will be changed such that the new value of b and the inserted Tsymb/2 delay (or advance) correspond to the same symbol timing offset:

$$\text{SAMPLE SELECT toggles} => 0.51 \times \text{Tsymb} \leq \tau \leq 1.05 \times \text{Tsymb}$$

The preferred initial value of b used for processing is b=0.6. This value corresponds to τ=0.133×Tsymb or τ=0.633×Tsymb (depending on whether the selected sample is $x_n$ or $x_{n-1}$). The initial value of b=0.6 is chosen to be somewhere close to the midpoint between b=-0.045 and b=0.96 to prevent the possibility of initial oscillation of the SAMPLE SELECT signal which may be due to initial noise from other control loops and also to decrease the acquisition time for all possible timing offset values.

Figure 24:
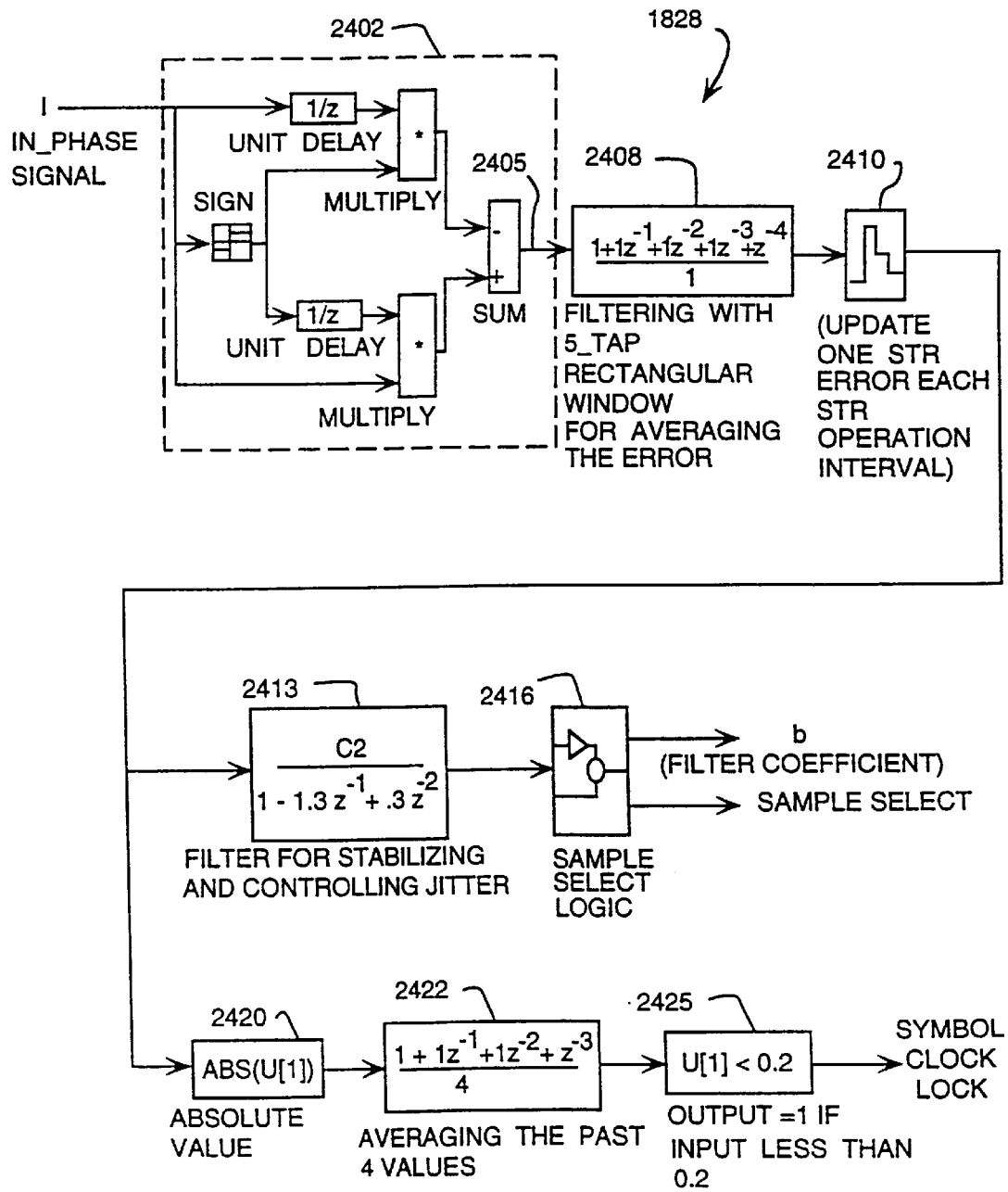
FIG. 24 shows the symbol timing recovery (STR) functions utilized in the preferred baseband processing methods.

The correlator function 1828 of the symbol timing recovery (STR) function 1820 is shown in FIG. 24. The method employed is a minimum variance error algorithm based on the work of Mueller and Müller. The known Mueller and Müller method works on one sample per symbol rate. The timing information is derived from the symmetry error of the sampled impulse response by extracting the correlation between every two consecutive sample values and their estimates. However, the present invention differs from the Mueller and Muller approach as follows: instead of IIR filtering the correlator output at the symbol rate, in the present invention the correlator output is averaged over a number of symbol periods (five in the preferred embodiment), and the IIR filtering is conducted at ⅙ of the symbol rate. This decreases the required processing power for STR functions such as IIR filtering, updating the value of the filter coefficient b, and generating the SAMPLE SELECT signal since they now may be effected six times more slowly.

The correlator 1828 uses the new in_phase symbol $I_n$, and the previous in_phase symbol $I_{n-1}$ to generate an error signal at line 2405 that is related to the timing offset between the symbol clocks in the transmitter and receiver. The correlator performs the following calculations shown at the block 2402 to generate the error signal:

$$E(n) = I_n \times \text{sign}(I_{n-1}) + I_{n-1} \times \text{sign}(I_{n-1})$$

This error will be averaged at step 2408 with a 5 tap rectangular window to reduce the effect of noise from other control loops on the symbol timing recovery loop during acquisition time. This filtering is done at the symbol rate by averaging a block containing 5 past input error values E(n-5) . . . E(n-1). At the next STR operation interval, the window slides over the next block of past inputs. Therefore, one averaged output is produced once in each STR operation time interval (i.e., every 10 symbol periods), as shown at step 2410.

The averaged error then is sent to a two-pole IIR filter at step 2413 for loop stabilization and timing jitter control. The gain C2 of this filter is set to C2=0.08 during the first 4 milliseconds for fast convergence of the loop during acquisition time. After the first 4.2 milliseconds, the gain value is set to C2=0.03 to reduce the timing jitter at steady state. The output of the IIR filter 2413 is then sent to a sample select logic 2416 to determine the coefficient value b for the variable group delay filter and the SAMPLE SELECT signal. A summary of the operations of IIR filter and sample select logic is as follows:

u=input to the sample select logic b=output of the sample select logic to be sent to the VGD filter
e_str=averaged STR error input to the IIR filter
SAMPLE SELECT=output of the sample select logic 2416

$$u(n)=C2 \times e\_str(n)+1.3 \times b(n-1)-0.3 \times b(n-2)$$

If $(u_n \leq -0.045)$ OR $(u_n \geq 0.96) \Longrightarrow$ toggle SAMPLE SELECT signal
Else $\Longrightarrow$ SAMPLE SELECT(n)=SAMPLE SELECT(n-1)
If $u_{n-1} \leq -0.045 \Longrightarrow b_n = u_n + 0.8$
Elseif $u_n \geq 0.96 \Longrightarrow b_n = u_n - 0.95$
Else $\Longrightarrow b_n = u_n$ The bottom blocks 2420, 2422, 2425 in FIG. 24 are used for generation of a symbol timing lock signal SYMBOL CLOCK LOCK. This signal is generated by determining the absolute value of the error values out of the downsampler 2410 at step 2420, averaging the absolute value of the past 4 error values at step 2422, and comparing the average at step 2425 to a threshold value. If at step 2425 the absolute value of this averaged error is less than 0.2, the timing offset is approximately within 5 percent of the symbol period, which indicates that the symbol timing is locked. The initial output value of the sample select logic 2416 to the variable group delay filter is b=0.6, and SAMPLE SELECT is initially set to zero.

Carrier Phase Recovery (CPR) Methods)

Figure 25:
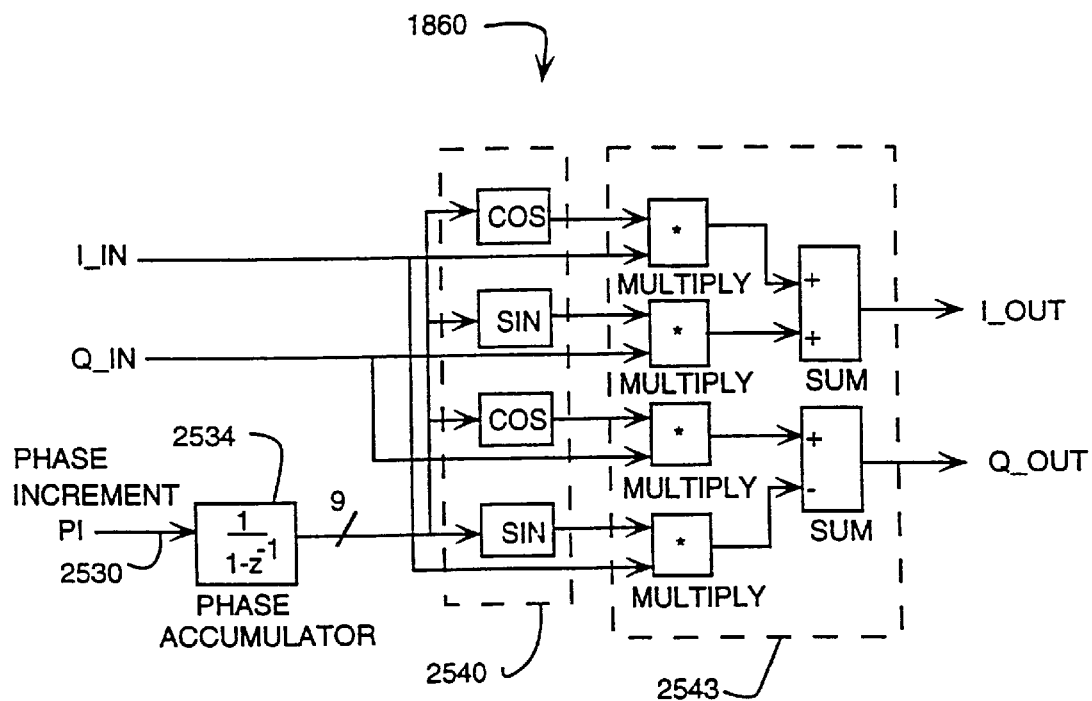
FIG. 25 shows the baseband phase rotator (BPR) functions utilized in the preferred baseband processing methods.

Turn next to FIG. 25 for a discussion of the carrier phase recovery (CPR) processes (1850 in FIG. 18)(1940 in FIG. 19), which comprises a baseband phase rotator process (BPR) 1860 and a phase lock loop 1870. The carrier phase recovery 1850 takes the residual carrier phase from the complex baseband signal by estimating the residual phase using a phase lock loop (also known as a Costas loop) and rotating the phase of the complex waveform with the baseband phase rotator (BPR).

The baseband phase rotator 1860 receives a phase increment (PI) value at 2530 from the phase lock loop and accumulates the phase increments at step 2534 to generate the residual carrier phase values at the symbol rate. This value is then quantized to 9 bits to form an address for a sine and cosine table 2540 that is stored in the program memory of the preferred DSP. The phase resolution is defined by:

$$\text{Phase resolution} = 2\pi \times \text{LSB} = 2\pi \times 2^{-9} = 0.012272 \text{ radians}$$

This resolution results in a maximum symbol error of −44.2 dB and an rms symbol error of about −63 dB. The number of sine and cosine points stored in the program memory is 640, which corresponds to 1.25 cycles of a sine waveform, $1.25 \times 29 = 640$. Since $\cos \theta = \sin(\pi/2 + \theta)$, the address for the cosine values are obtained by adding 512/4=128 to the address of the sine values. The sine and cosine values are used to rotate the complex waveform by estimated residual carrier phase by the following calculations carried out in steps 2543:

$$I_{out} = I_{in} \times \cos(\text{PHASE}) + Q_{in} \times \sin(\text{PHASE})$$

$$Q_{out} = Q_{in} \times \cos(\text{PHASE}) - I_{in} \times \sin(\text{PHASE})$$

As shown in FIG. 18, the phase-rotated I and Q are provided to the phase lock loop function 1870.

Figure 26:
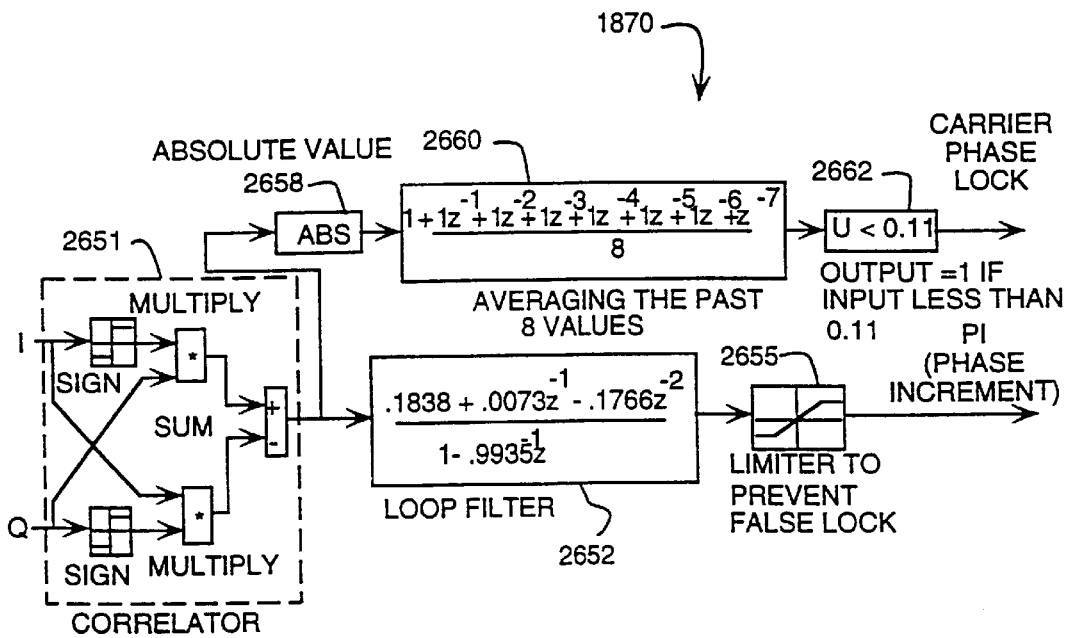
FIG. 26 shows the phase lock loop and carrier phase lock (CPR) detection functions utilized in the preferred baseband processing methods.

Turning now to FIG. 26, the phase lock loop function 1870 is operative to determine when the system is locked to the carrier, indicated by the signal CARRIER PHASE LOCK, and to generate the phase increment signal PI. The in_phase I and quadrature Q components from the BPR 1860 are input to the phase lock loop at the symbol rate to produce an error term by step 2651 which is passed on to a loop filter 2652. The output of the loop filter is the phase increment value PI to be used in baseband phase rotator.

A limiter block 2655 is used to prevent a false lock. If the carrier phase error is such that the phase increment value goes beyond 90 degrees for QPSK, a symbol that represents a point on the constellation may rotate to another point on constellation and be detected falsely as a correct decision. To prevent this false lock for QPSK modulation techniques, the phase increment value must be limited to some threshold value which is less than 90 degrees. The threshold value used in the preferred embodiment is ±30 degrees, which corresponds to a 3 kHz offset of the local oscillator with the reference frequency:

$$\pi/6 \text{ radians} = 2\pi \times 3 \text{ kHz/Symbol Rate.}$$

The estimated error values from steps 2651 are sent to the loop filter 2652 to generate a phase increment value. The bandwidth of the closed loop transfer function of the loop filter is about 1 kHz, which means that loop can track a phase jitter with a frequency below 1 kHz. Further, the absolute value of the error values from step 2651 is determined at step 2658 and averaged at step 2660 over the past 8 values. This average is compared at step 2662 with a threshold value of 0.11, which corresponds to a phase error of 12.7 degrees. If the averaged error is below this threshold, the carrier phase is deemed locked. A lock indication signal CARRIER PHASE LOCK is then generated and passed to the HIU host system through the host interface port. The phase increment output PI of the phase lock loop is input to the baseband phase rotator section at the symbol rate.

Decoding and Formatting

The final stage of the baseband processing is symbol decoding, differential phase decoding, and formatting, shown at 1880 in FIG. 18 (1935 in FIG. 19). Symbol decoding of course entails demodulating the QPSK modulated DSO signal and determining the instantaneous values of the signal. As will be recalled from prior discussion, the I and Q input at the modulator are encoded by differential phase encoding to eliminate the phase ambiguity of the received symbols. Therefore, the received I and Q must be differentially phase decoded. First, the output of the BPR process 1860 are mapped to binary decisions, A and B. For QPSK, the mapping is a simple operation:

If $I_{BPR} > 0 \Longrightarrow A=1$
If $I_{BPR} \leq 0 \Longrightarrow A=0$
If $Q_{BPR} > 0 \Longrightarrow B=1$
If $Q_{BPR} \leq 0 \Longrightarrow B=0$ The differential encoder takes the present and previous values of A and B and maps them into binary symbol decisions $I_{out}$ and $Q_{out}$. The truth table for the mapping function of the differential decoder is shown in Table 4 below:

TABLE 4 mapping function of the differential decoder

| $A_{n-1}$ | $B_{n-1}$ | $A_n$ | $B_n$ | $I_{out}$ | $Q_{out}$ |
|---|---|---|---|---|---|
| 0 | 0 | 0 | 0 | 0 | 0 |
| 0 | 0 | 0 | 1 | 1 | 0 |
| 0 | 0 | 1 | 0 | 0 | 1 |
| 0 | 0 | 1 | 1 | 1 | 1 |
| 0 | 1 | 0 | 0 | 0 | 1 |
| 0 | 1 | 0 | 1 | 0 | 0 |
| 0 | 1 | 1 | 0 | 1 | 1 |
| 0 | 1 | 1 | 1 | 1 | 0 |
| 1 | 0 | 0 | 0 | 1 | 0 |
| 1 | 0 | 0 | 1 | 1 | 1 |
| 1 | 0 | 1 | 0 | 0 | 0 |
| 1 | 0 | 1 | 1 | 0 | 1 |
| 1 | 1 | 0 | 0 | 1 | 1 |
| 1 | 1 | 0 | 1 | 0 | 1 |
| 1 | 1 | 1 | 0 | 1 | 0 |
| 1 | 1 | 1 | 1 | 0 | 0 |

The values of $I_{out}$ and $Q_{out}$ are preferably obtained by a 16-word look up table located in program memory of the DSP. Each word is formatted as a 3 bit words. The MSB corresponds to $I_{out}$, the next bit corresponds to $Q_{out}$, and the LSB is zero or can be used as a status bit. The presence of the third bit is inevitable since the minimum word length for the preferred DSP circuit's serial ports is 3.

FIG. 27 is a flow chart of background processing steps taken in the program for the DSPs 370. It will be understood from the discussion above in connection with FIG. 19 that the telephony channel data processing carried out by the DSPs is done as an interrupt service routine (ISR), to maintain continuity of time-critical data flow for the telephony channels. On the other hand, certain processing steps are not time-critical and can be carried out in "spare" DSP CPU cycles, that is, when the ISR is not being executed. Non-time-critical steps are considered "background" processing.

As previously described, incoming signals from the channelizer are 16 bit words with the nominal value of $2^{-7}$–$2^{-8}$ for positive signals and $-2^{-7}$ for negative signals.

However, these signals may have higher or lower amplitudes depending upon the amount of transmitted power and channel gain variations due to environmental factors. As long as the absolute value of the signal amplitude is within ±18 dB from the nominal amplitude value, the incoming signal is considered reliable. This detected signal amplitude is reported to the MCP 308 in the preferred embodiment. If the signal amplitude is too low or high, the MCP will transmit a command to a CIU to cause the transmitter power to increase or decrease, as desired, to improve signal quality and fully utilize the available dynamic range.

The background processing steps to detect signal amplitude is shown in FIG. 27. The first step taken at 2702 is to obtain I and Q data samples from the BPR function 1860 (FIG. 18). At step 2705, a signal denominated SYMBOL ERROR is derived from I and Q according to the following equation:

$$\text{SYMBOL ERROR} = 1/N \times \sum_{1}^{N} [(A_{nominal} - |I| + A_{nominal} - |Q|)/2]$$

The value of $A_{nominal}$ is a nominal signal amplitude value, while N is an averaging window size that can be varied as desired.

At inquiry step 2710, the value of SYMBOL LOCK is examined to determine whether there is symbol lock. Symbol lock is determined in the preferred embodiment by comparing the value of SYMBOL ERROR to a predetermined threshold value. If the SYMBOL ERROR is less than the threshold, there is symbol lock, while if SYMBOL ERROR is greater than the threshold, there is no symbol lock.

If symbol lock is not detected, the "no" branch is taken to step 2718, and the AGC loop gain is set to a high value (0.11) and the STR loop gain is set to a high value (0.08) for faster acquisition. At step 2720, a rough estimate $A_{rough}$ of the amplitude is calculated and sent to the MCP.

If symbol lock is detected, the "yes" branch is taken from inquiry 2710 to step 2725. The ACTC loop gain is set at a lower value (0.05) and the STR loop gain at a lower value (0.03) for reducing the steady state jitter of the loop filter output. A more accurate (fine) amplitude calculation $A_{fine}$ is affected at 2730, and the signal amplitude is ready to be reported to the MCP.

For a rough amplitude detection at 2720, The approximated amplitude is determined by the following:

$$A_{rough} = S \times \frac{1}{N} \times \sum_{1}^{N} [(|I| + |Q|)/2]$$

$A_{rough}$ is a rough estimate of the amplitude level, while N is an averaging window size which can be varied as desired, and S is a scaling factor. After symbol lock is detected, the more accurate calculation of the amplitude at 2730 is determined according to the following equation:

$$A_{fine} = \frac{1}{N} \sum_{1}^{N} \left( \frac{1}{M} \times 2^{-5} \right) \times 2^{-(shifting\ factor)}$$

The value of $1/M \times 2^{-5}$ is obtained in the preferred embodiment by use of a 64-word look-up table (not separately shown) that is addressed by the shifted version of M. Since the nominal value of M is $2^{-2}$, M is shifted right by 11 such that the 6 least significant bits form an address for the look-up table. The look-up table result is shifted by the shifting factor to give the actual amplitude level of the incoming signals.

Again, it should be understood that the amplitude estimations are done only as background processing and do not affect the data path in the disclosed embodiment.

FIG. 28 illustrates the timing of the various routines of the shifter, multiplier, VGDF, BPR, phase lock loop, STR, and symbol decoding. Taking in conjunction with the flow chart of FIG. 19, those skilled in the art will be enabled to program the preferred DSP utilized in the disclosed embodiment to carry out the invention.

While there has been shown and described the preferred embodiments of the invention, it will be evident to those skilled in the art that various modifications and changes may be made thereto without departing from the spirit and scope of the invention as set forth in the appended claims and equivalents thereof.

What is claimed is:

1. A system for coupling telephony signals modulated on a carrier in a predetermined spectral subband of a broadband communication network from a subscriber to a telephony network interface, comprising:

a tuner for tuning to and selecting the predetermined spectral subband;

a block channelizer for collecting a group of telephony signals from said tuner and providing time division multiple access (TDMA) sampled signals corresponding to the modulated telephony signals at baseband;

a baseband demodulator for demodulating the TDMA sampled signals and deriving demodulated telephony signals; and an output interface for coupling said demodulated telephony signals to a telephony network, wherein the baseband demodulator comprises:

an input port for receiving a serial data stream comprising a plurality of digital signal samples representing a plurality of QPSK-modulated DS0 telephony channels at baseband;

an automatic gain control (AGC) stage for adjusting the gain of the digital signal samples for each of the DS0 telephony channels;

a symbol timing recovery (STR) stage coupled to the AGC stage for extracting timing information for each of the QPSK-modulated DS0 telephony channels from the digital signal samples and delaying the sampling of the digital signal samples at a decoding stage to a time such that the sampling will be at optimized symbol instants;

a carrier phase recovery (CPR) stage coupled to the STR stage for locking the demodulator to the frequency of the carrier for each of the QPSK-modulated DS0 telephony signals; and a symbol decoding stage for sampling the digital signal samples and providing a digital signal output corresponding to the demodulated DS0 telephony channels.

2. The system of claim 1, wherein said block channelizer comprises:

a block lowpass filter operative, and a block fast Fourier transform (FFT) stage responsive to filtered signals from said block lowpass filter for frequency translating each of said modulated information signals into said baseband modulated telephony signals.

3. The system of claim 1, wherein the broadband communication network is a cable television (CATV) network, wherein the frequency said carrier is in a predetermined first band of frequencies, and further comprising equipment for providing television program signals to subscribers in a predetermined second band of frequencies.

4. The system of claim 1, wherein said telephony network interface comprises a CATV headend.

5. A method of processing telephony signals communicated in an upstream frequency spectral band from subscribers in a broadband communication system, comprising the steps of:

modulating upstream telephony signals on single carrier per channel, the carriers for each channel being coherently harmonically related;

selecting a predetermined spectral subband in said upstream frequency spectral band containing a contiguous plurality of telephony signal channels;

tuning to the center frequency of said selected predetermined spectral subband;

downconverting said selected spectral subband to a lower center frequency;

digitizing said selected spectral subband to obtain a plurality of digital signal samples representing said selected spectral subband;

block processing all channels within said selected spectral subband to derive separate digital baseband signals representing said contiguous plurality of telephony signal channels; and demodulating said separate digital baseband signals to provide individual demodulated telephony signals, wherein block processing all channels within said selected spectral subband comprises the steps of:

block filtering said plurality of digital signal samples to effect a half Nyquist filter matched to a half Nyquist filter at a subscriber; and downconverting each of said channels to baseband with a digital fast Fourier transform (FFT) operation.

6. The method of claim 5, further comprising the step of coupling the demodulated telephony signals to a telephony network.

7. A system for coupling telephony signals modulated on a carrier in a predetermined first band of frequencies in a cable television (CATV) network from a subscriber to a telephony network interface, comprising:

a tuner for tuning to and selecting the predetermined spectral subband;

a block channelizer for collecting a group of telephony signals from said tuner and providing time division multiple access (TDMA) sampled signals corresponding to the modulated telephony signals at baseband;

a baseband demodulator for demodulating the TDMA sampled signals and deriving demodulated telephony signals;

an output interface for coupling said demodulated telephony signals to a telephony network;

equipment for providing television program signals to subscribers in a predetermined second band of frequencies; and a frequency agile modulator located at the subscriber operative to change the frequency at which telephony signals are communicated from a first frequency in the first band of frequencies to a second frequency in the first band of frequencies in response to a command received from a control device.

8. The system of claim 7, wherein the frequency agile modulator comprises a quadrature phase shift keying (QPSK) modulator operative at selectable carrier frequencies varying in discrete increments.

* * * * *